US005448053A

United States Patent [19]
Rhoads

[11] Patent Number: 5,448,053
[45] Date of Patent: Sep. 5, 1995

[54] METHOD AND APPARATUS FOR WIDE FIELD DISTORTION-COMPENSATED IMAGING

[76] Inventor: Geoffrey B. Rhoads, 363 SW. Tualatin Loop, West Linn, Oreg. 97068

[21] Appl. No.: 171,661

[22] Filed: Dec. 20, 1993

Related U.S. Application Data

[63] Continuation-in-part of Ser. No. 24,738, Mar. 1, 1993.

[51] Int. Cl.$^6$ ............................................. G01J 1/20
[52] U.S. Cl. ................................. 250/201.9; 356/121
[58] Field of Search .................. 250/201.9, 216, 205; 356/121; 382/29, 43

[56] References Cited

U.S. PATENT DOCUMENTS

| | | | |
|---|---|---|---|
| 3,921,080 | 11/1975 | Hardy | 328/133 |
| 4,136,954 | 1/1979 | Jamieson | 356/349 |
| 4,141,652 | 2/1979 | Feinleib | 250/201.9 |
| 4,399,356 | 8/1983 | Feinleib et al. | 250/201 |
| 4,438,330 | 3/1984 | Hardy | 250/201.9 |
| 4,471,448 | 9/1984 | Williams | 364/525 |
| 4,518,854 | 5/1985 | Hutchin | 250/201 |
| 4,666,298 | 5/1987 | Protz | 356/121 |
| 4,682,025 | 7/1987 | Livingston et al. | 250/201 |
| 4,725,138 | 2/1988 | Wirth et al. | 356/121 |
| 4,737,621 | 4/1988 | Gonsiorowski et al. | 250/201 |
| 4,967,063 | 10/1990 | Wang et al. | 250/201.1 |
| 5,093,563 | 3/1992 | Small et al. | 250/201.9 |
| 5,198,653 | 3/1993 | Shen et al. | 250/201.9 |

OTHER PUBLICATIONS

Primot, *Application of Wavefront Sensing Techniques to Restoring of Images Degraded by Atmospheric Turbulence*, European Space Agency Technical Translation dated May, 1991, of doctoral thesis submitted May 9, 1989 to the University of Paris-Sud, 263 pages.

Primot et al., "Deconvolution From Wave-Front Sensing: A New Technique for Compensating Turbulence-Degraded Images," J. Opt. Soc. Am. A, vol. 7, No. 9, Sep. 1990, pp. 1598–1608.

Rhoads, "Linear Digital Imaging *Preliminary Draft* With Specific Comments on the Hubble Space Telescope," Vancouver, Washington, Sep. 9, 1990, 25 pages.

Stark, *Image Recovery: Theory and Application*, Chapter 1, Rushforth, "Signal Resotration, Functional Analysis, and Fredholm Integral Equations of the First Kind," Academic Press, Jan. 1987, pp. 1–25.

Huang, *Picture Processing and Digital Filtering*, Sections 2.4–2.5, Springer-Verlag, Jan. 1979.

Roddier, "The Effects of Atmospheric Turbulence in Optical Astronomy," Progress in Optics XIX, North–Holland, Jan. 1981, pp. 283–377.

Cowie et al., "Atmospheric Isoplanatism and Astronomical Image Reconstruction on Mauna Kea," vol. 5, No. 7, Jul. 1988, J. Opt. Soc. Am. A, pp. 1015–1022.

Fried, "Anisoplanatism in Adaptive Optics," J. Opt. Soc. Am., vol. 72, No. 1, Jan. 1982, pp. 52–61.

Charnotskii, "Anisoplanatic Short-Exposure Imaging in Turbulence," J. Opt. Soc. Am. A, vol. 10, No. 3, Mar. 1993, pp. 492–501.

Labeyrie, "High-Resolution Techniques in Optical Astronomy," Progress in Optics XIV, North–Holland, Jan. 1976, pp. 49–87.

(List continued on next page.)

Primary Examiner—David C. Nelms
Assistant Examiner—Que T. Le
Attorney, Agent, or Firm—Klarquist Sparkman Campbell Leigh & Whinston

[57] ABSTRACT

An imaging system for measuring the field variance of distorted light waves collects a set of short exposure "distorted" images of an object, and applies a field variant data processing methodology in the digital domain, resulting in an image estimate which approaches the diffraction limited resolution of the underlying physical imaging system as if the distorting mechanism were not present. By explicitly quantifying and compensating for the field variance of the distorting media, arbitrarily wide fields can be imaged, well beyond the prior art limits imposed by isoplanatism. The preferred embodiment comprehensively eliminates the blurring effects of the atmosphere for ground based telescopes, removing a serious limitation that has plagued the use of telescopes since the time of Newton.

21 Claims, 40 Drawing Sheets

OTHER PUBLICATIONS

Shapiro, "Propagation-Medium Limitations on Phase-Compensated Atmospheric Imaging," J. Opt. Soc. Am., vol. 66, No. 5, May 1976, pp. 460–477.

Hardy, "Active Optics: A New Technology for the Control of Light," Proceedings of the IEEE, vol. 66, No. 6, Jun. 1978, pp. 651–697.

Bates et al., "Deblurring Should Now be Automatic," Image and Signal Processing in Electron Microscopy, May 1987, 10 pages.

Ghiglia, "Systematic Approach to Two-Dimensional Blind Deconvolution by Zero-Sheet Separation," J. Opt. Soc. Am. A, vol. 10, No. 5, May 1993, pp. 1024–1036.

Schulz, "Multiframe Blind Deconvolution of Astronomical Images," J. Opt. Soc. Am. A, vol. 10, No. 5, May 1993, pp. 1064–1073.

Muller et al., "Real-Time Correction of Atmospherically Degraded Telescope Images Through Image Sharpening," Journal of the Optical Society of America, vol. 64, No. 9, Sep. 1974, pp. 1200–1210.

Greenwood, "Power Spectra Requirements for Wave-Front-Compensative Systems," J. Opt. Soc. Am., vol. 66, No. 3, Mar. 1976, pp. 193–206.

Hardy, "Real-Time Atmospheric Compensation," J. Opt. Soc. Am., vol. 67, No. 3, Mar. 1977, pp. 360–369.

Wang, "Optical Resolution Through a Turbulent Medium with Adaptive Phase Compensations," J. Opt. Soc. Am., vol. 67, No. 3, Mar. 1977, pp. 383–389.

Wallner, "Minimizing Atmospheric Dispersion Effects in Compensated Imaging," J. Opt. Soc. Am., vol. 67, No. 3, Mar. 1977, pp. 407–409.

Pearson et al., "Adaptive Optical Techniques for Wave-Front Correction," Chapter 8, Jan. 1979, pp. 245–341.

Tyler, "Turbulence-Induced Adaptive-Optics Performance Degradation: Evaluation in the Time Domain," J. Opt. Soc. Am. A, vol. 1, No. 3, Mar. 1984, pp. 251–262.

Greenwood, "Bandwidth Specification for Adaptive Optics Systems," J. Opt. Soc. Am., vol. 67, No. 3, Mar. 1977, pp. 390–393.

Beckers et al., "National Optical Astronomy Observatories (NOAO) Infrared Adaptive Optics Program, I: General Description," SPIE vol. 628, Advanced Technology Optical Telescopes III, Jan. 1986, pp. 290–297.

Gaffard et al., "Adaptive Optics for Optimization of Image Resolution," Applied Optics, vol. 26, No. 18, Sep. 15, 1987, pp. 3772–3776.

Nisenson et al., "Partial Atmospheric Correction with Adaptive Optics," J. Opt. Soc. Am. A, vol. 4, No. 12, Dec. 1987, pp. 2249–2253.

Smithson et al., "Quantitative Simulation of Image Correction for Astronomy With a Segmented Active Mirror," Applied Optics, vol. 27, No. 8, Apr. 15, 1988, pp. 1615–1620.

Welsh et al., "Performance Analysis of Adaptive-Optics Systems Using Laser Guide Stars and Slope Sensors," J. Opt. Soc. Am. A, vol. 6, No. 12, Dec. 1989, pp. 1913–1920.

"Conference Report, Netherlands Meeting Highlights Adaptive Optics," Laser Focus World, Jun. 1990, pp. 51–52.

Roddier et al., "One-Dimensional Spectra of Turbulence-Induced Zernike Aberrations: Time-Delay and Isoplanicity Error in Partial Adaptive Compensation," J. Opt. Soc. Am. A, vol. 10, No. 5, May 1993, pp. 957–965.

Gezari et al., "Speckle Interferometry: Diffraction-Limited Measurements of Nine Stars With the 200-Inch Telescope," The Astrophysical Journal, Apr. 1, 1972, pp. L1–L5.

Knox, "Image Retrieval From Astronomical Speckle Patterns," J. Opt. Soc. Am., vol. 66, No. 11, Nov. 1976, pp. 1236–1239.

Weigelt, "Modified Astronomical Speckle Interferometry 'Speckle Masking,'" Optics Communications, Apr. 1977, vol. 21, No. 1, pp. 55–59.

Barnett et al., "Photon Noise Limitations on the Recovery of Stellar Images by Speckle Interferometry," Optics Communications, vol. 21, No. 1, Apr. 1977, pp. 60–62.

Fienup, "Reconstruction of an Object from the Modulus of its Fourier Transform," Optics Letters, vol. 3, No. 1, Jul. 1978, pp. 27–29.

Fried, "Probability of Getting a Lucky Short-Exposure Image Through Turbulence," J. Opt. Soc. Am., vol. 68, No. 12, Dec. 1978, vol. 68, No. 12, Dec. 1978, pp. 1651–1658.

Fienup, "Space Object Imaging Through the Turbulent Atmosphere," Optical Engineering, vol. 18, No. 5, Sep.–Oct. 1979, pp. 529–534.

(List continued on next page.)

OTHER PUBLICATIONS

Fienup, "Phase Retrieval Algorithms: A Comparison," Applied Optics, vol. 21, No. 15, Aug. 1, 1982, pp. 2758–2769.

Weigelt et al., "Speckle Interferometry, Image Reconstructions by Speckle Masking, Speckle Spectroscopy, Multiple-Mirror Interferometry," SPIE vol. 556 International Converence on Speckle, Jan. 1985, pp. 238–247.

Aitken et al., "Phase-Gradient Stellar Image Reconstruction," Optics Communications, vol. 56, No. 6, Jan. 15, 1986, pp. 379–383.

Paxman et al., "Optical Misalignment Sensing and Image Reconstruction Using Phase Diversity," J. Opt. Soc. Am. A, vol. 5, No. 6, Jun. 1988, pp. 914–923.

Ayers et al., "Know-Thompson and Triple-Correlation Imaging Through Atmospheric Turbulence," J. Opt. Soc. Am. A, vol. 5, No. 7, Jul. 1988, pp. 963–985.

Borgnino et al., "Polychromatic Transfer Functions in Stellar Speckle Interferometry," J. Opt. Soc. Am. A, vol. 6, No. 2, Feb. 1989, pp. 244–251.

Guan et al., "Deblurring Random Time-Varying Blur," J. Opt. Soc. Am. A., vol. 6, No. 11, Nov. 1989, pp. 1727–1737.

Glindemann et al., "Object Fitting to the Bispectral Phase by Using Least Squares," J. Opt. Soc. Am. A, vol. 10, No. 5, May 1993, pp. 1056–1063.

Fried, "Least-Square Fitting a Wve-Front Distortion Estimate to an Array of Phase-Difference Measurements," J. Opt. Soc. Am., vol. 67, No. 3, Mar. 1977, pp. 370–375.

Hudgin, "Wave-Front Reconstruction for Compensated Imaging," J. Opt. Soc. Am., vol. 67, No. 3, Mar. 1977, pp. 375–378.

Hudgin, "Optimal Wave-Front Estimation," J. Opt. Soc. Am., vol. 67, No. 3, Mar. 1977, pp. 378–382.

Herrmann, "Least-Squares Wave Front Errors of Minimum Norm," J. Opt. Soc. Am., vol. 70, No. 1, Jan. 1980, pp. 28–35.

Southwell, "Wave-Front Estimation from Wave-Front Slope Measurements," J. Opt. Soc. Am., vol. 70, No. 8, Aug. 1980, pp. 998–1006.

Hogge, "Effects of Using Different Wavelengths in Wave-Front Sensing and Correction," J. Opt. Soc. Am., vol. 72, No. 5, May 1982, pp. 606–609.

Schmutz, "Hartmann Sensing at Adaptive Optics Associates," SPIE vol. 779, Jan. 1987, pp. 13–17.

Cho et al., "Optimal Observation Apertures for a Turbulence-Distorted Wave Front," J. Opt. Soc. Am. A, vol. 6, No. 11, Nov. 1989, pp. 1767–1775.

Noll, "Zernike Polynomials and Atmospheric Turbulence," J. Opt. Soc. Am., vol. 66, No. 3, Mar. 1976, pp. 207–211.

Muller et al., "Roll Deconvolution of Space Telescope Data: Inverse Filtering of Two Speckle Interferograms," SPIE vol. 556, International Conference on Speckle, Jan. 1985, pp. 270–273.

Martin et al., "Astronomical Image Reconstruction Via Space Slit Aperture Telescope," SPIE vol. 643, Infrared, Adaptive, and Synthetic Aperture Optical Systems, Jan. 1986, pp. 189–193.

Sica, "Use of a Sharpness Criterion in Correcting Images Degraded by Random Distortion," J. Opt. Soc. Am. A, vol. 5, No. 9, Sep., 1988, pp. 1492–1501.

Roddier et al., "Diffraction-Limited Imaging of Unknown Objects Through Fixed Unknown Aberrations Using Interferometry," J. Opt. Soc. Am. A, vol. 7, No. 10, Oct. 1990, pp. 1824–1832.

Lewitt, "Multidimensional Digital Image Representations Using Generalized Kaiser-Bessel Window Functions," J. Opt. Soc. Am. A, vol. 7, No. 10, Oct. 1990, pp. 1834–1846.

"Lasers Target Galileo Probe," Laser Focus World, Feb. 1993, p. 15.

Davis, "Lasers Create Guide Stars, Monitor Atmosphere," Laser Focus World, Feb. 1993, pp. 111–114.

"Adaptive Optics Offered to Amateur Astronomers," Laser Focus World, Mar. 1993, p. 15.

Sasiela et al., "Transverse Spectral Filtering and Mellin Transform Techniques Applied to the Effect of Outer Scale on Tilt and Tilt Anisoplanatism," J. Opt. Soc. Am. A, vol. 10, No. 4, Apr. 1993, pp. 646–660.

Jankevics, "Wide Field of View Adaptive Objects," SPIE's 1991 International Symposium on Optical Applied Science and Engineering, Jan. 1991, 11 pages.

Sawchuk, "Space-Variant Image Restoration by Coordinate Transformations," J. Opt. Soc. Am., vol. 64, No. 2, Feb., 1974, pp. 138–144.

Sica, "Image-Sharpness Criterion for Space-Variant Imaging," J. Opt. Soc. Am., vol. 71, No. 10, Oct., 1981, pp. 1172–1175.

November, "Measurement of Geometric Distortion in a Turbulent Atmosphere," Applied Optics, vol. 25, No. 3, Feb. 1, 1986, pp. 392–397.

Field Angle Multiplexing Beam Splitter, 56

FIG. 6A

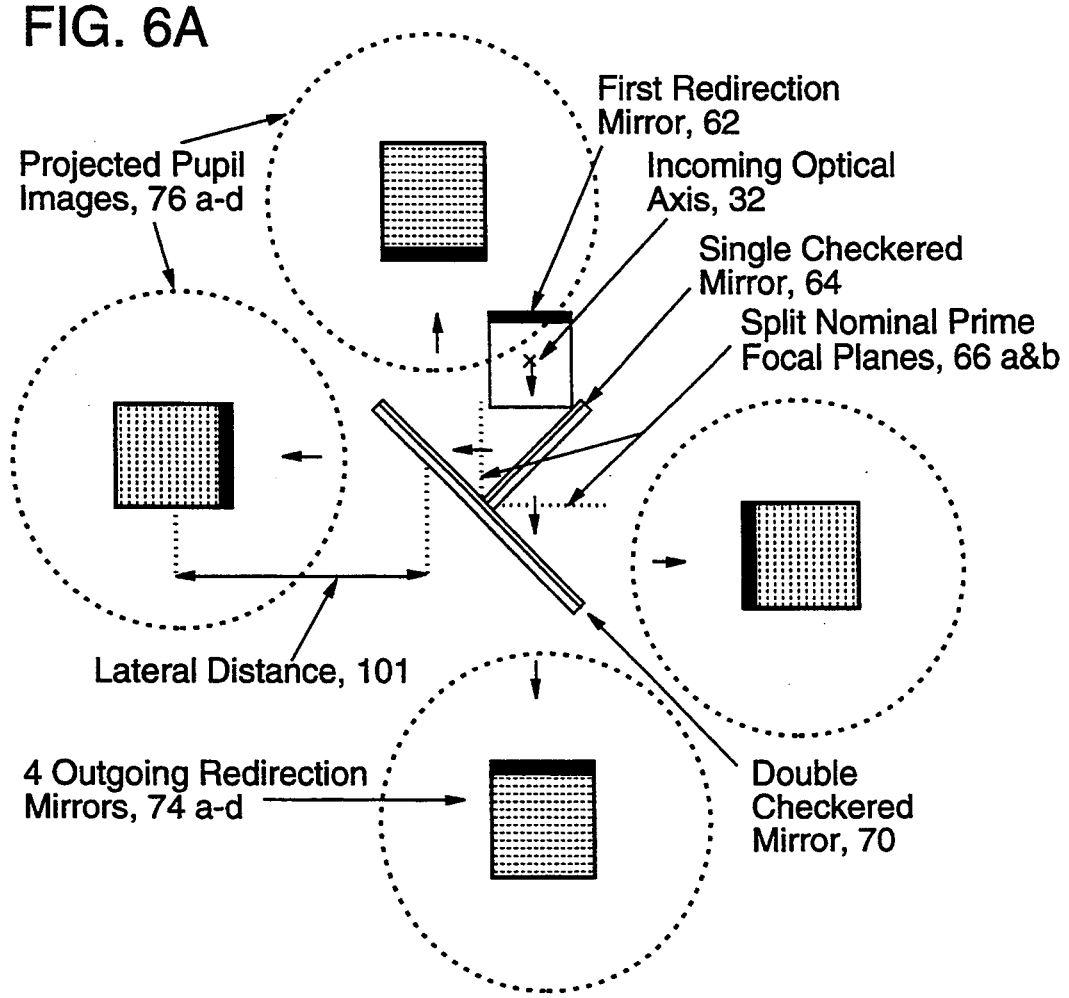

- Projected Pupil Images, 76 a-d
- First Redirection Mirror, 62
- Incoming Optical Axis, 32
- Single Checkered Mirror, 64
- Split Nominal Prime Focal Planes, 66 a&b
- Lateral Distance, 101
- 4 Outgoing Redirection Mirrors, 74 a-d
- Double Checkered Mirror, 70

FIG. 6B

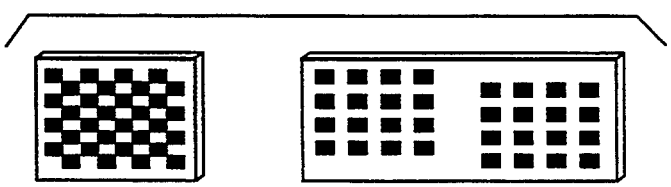

Single Checkered Mirror, 64

Double Checkered Mirror, 70

Front Views: glass flats with deposited silver, aluminum, or other appropriately reflective material

FIG. 6C

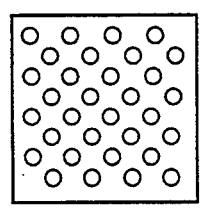

For 2X design only: Sub-aperture Arrays, 73 a&b (larger scale)

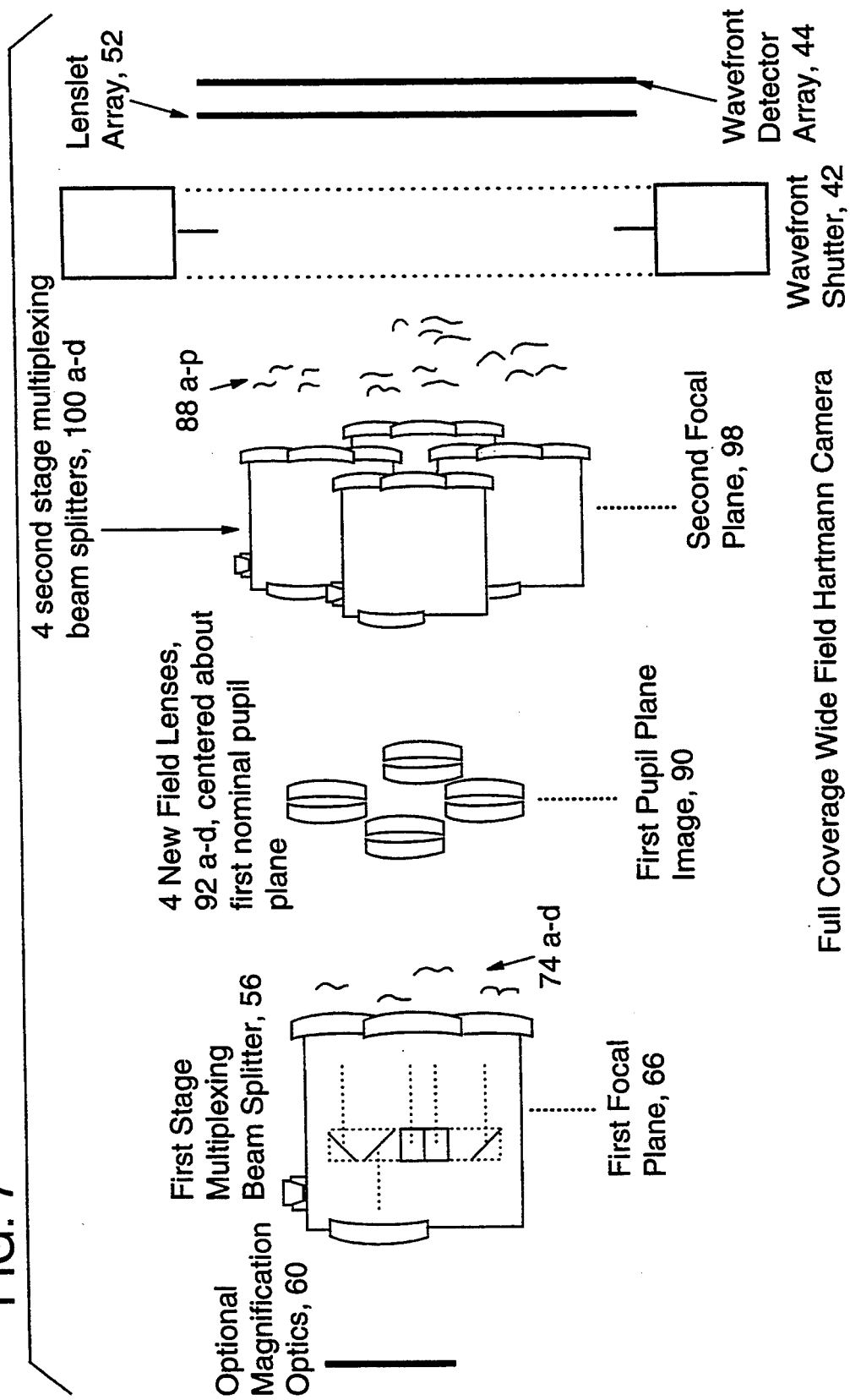

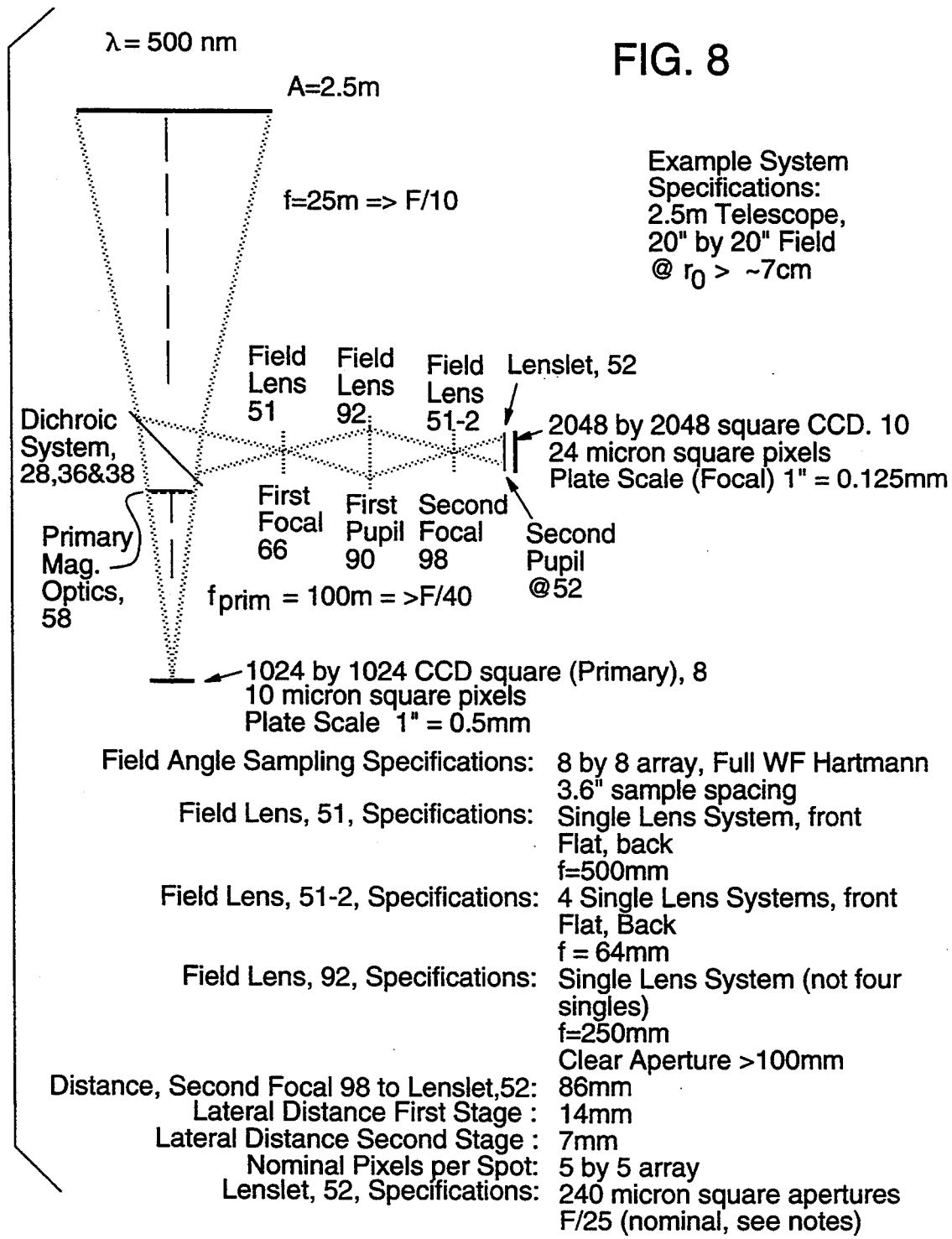

FIG. 8A

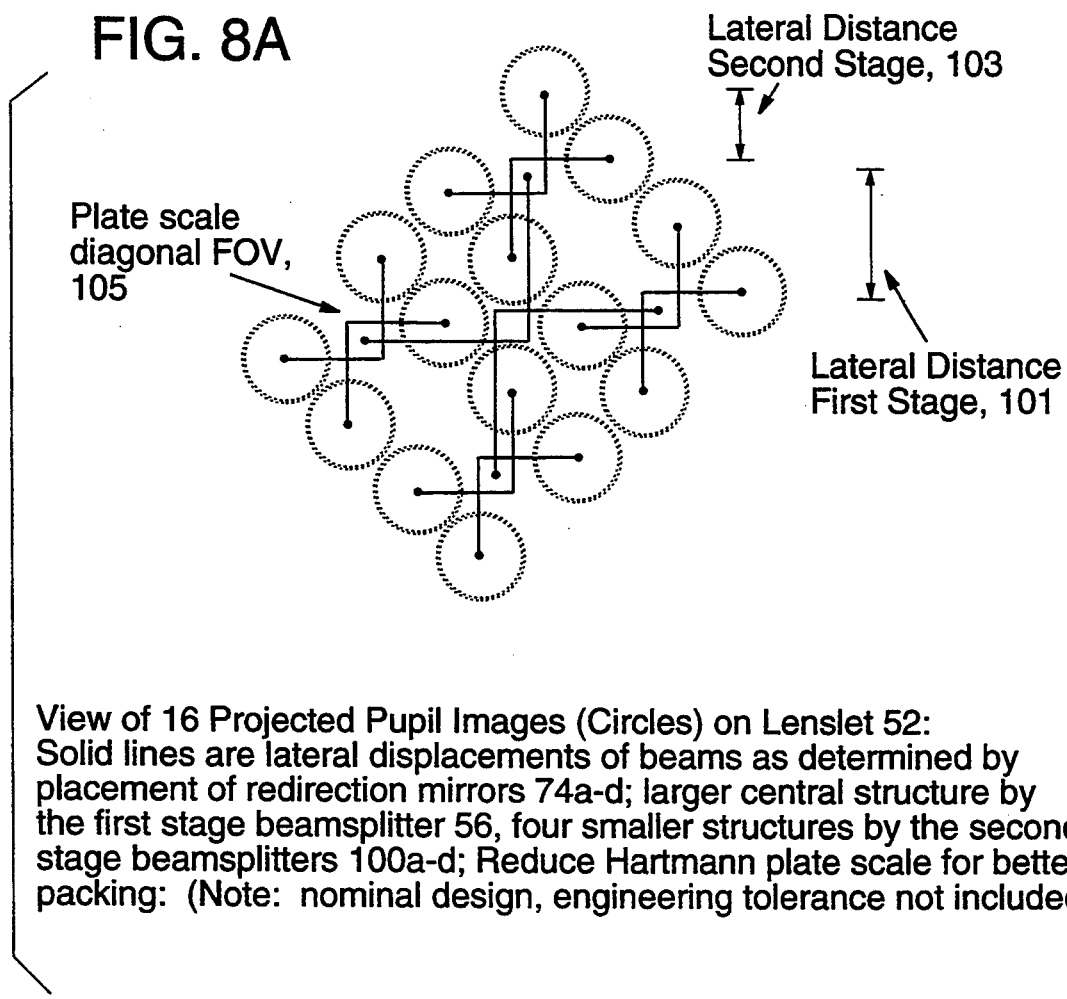

View of 16 Projected Pupil Images (Circles) on Lenslet 52: Solid lines are lateral displacements of beams as determined by placement of redirection mirrors 74a-d; larger central structure by the first stage beamsplitter 56, four smaller structures by the second stage beamsplitters 100a-d; Reduce Hartmann plate scale for better packing: (Note: nominal design, engineering tolerance not included)

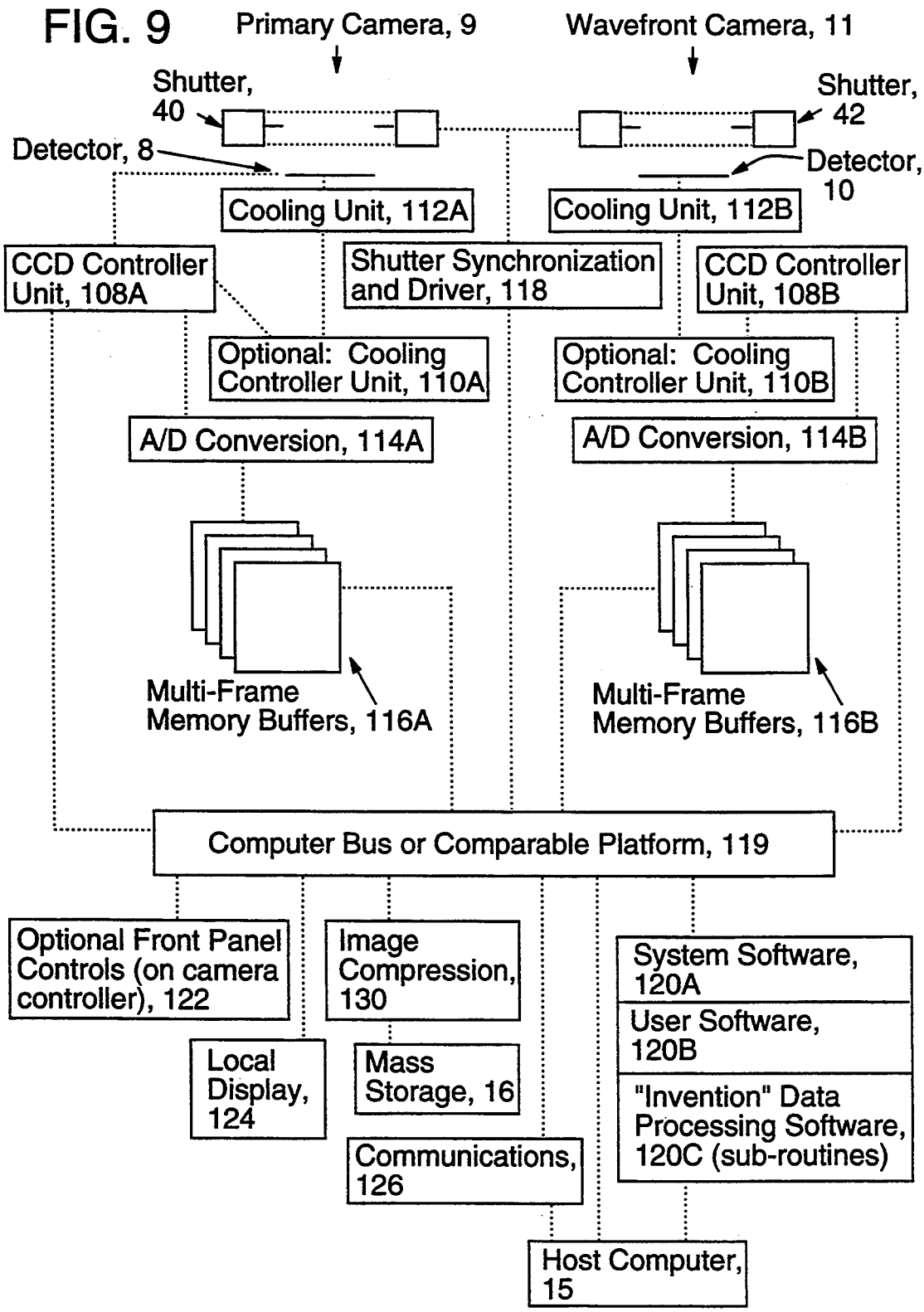

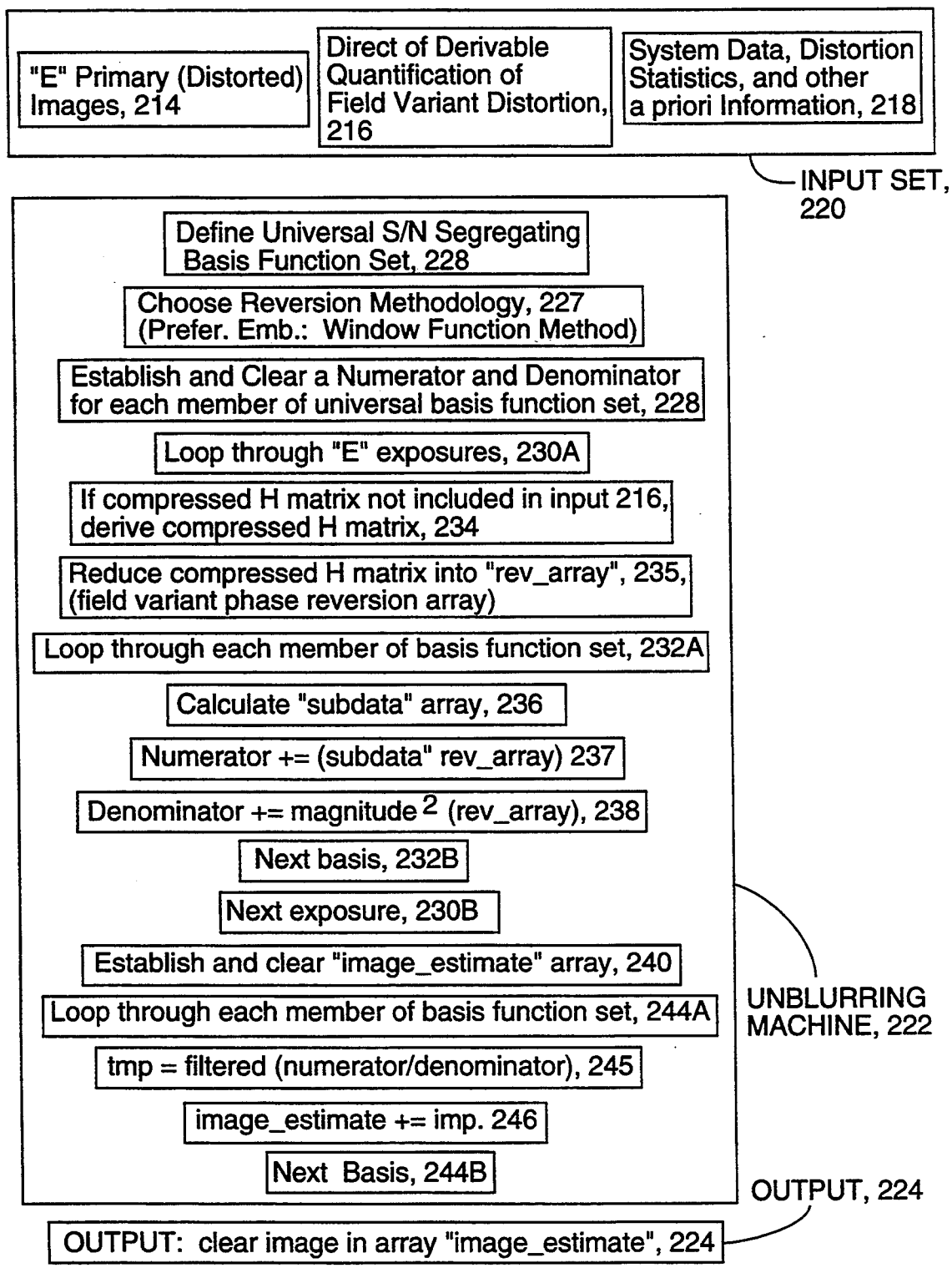
FIG. 10  Processing Methodology: Weighted Average on (generally over-determined) S/N Segregating Basis Functions

FIG. 11

$$v_{avg} = \frac{\sum_{e}^{E} v_e^* w_e}{\sum_{e}^{E} w_e}$$

$w \sim $ (signal to noise ratio)$^2$

FIG. 11A

1) $ab = c$ ; a, b and c complex; a object, b transform, c data
2) $a = c/b$ ; => possible divide by zero or extremely small values

---

3) $c_e$, $e=1$ to $E$ ; multiple data realizations

4) $b_e = P_e s_e$, $e=1$ to $E$; multiple transforms, p is unit mag phase, s is magnitude 5) $w \sim s^2$ ; s goes as signal, noise ~ constant across E 6) $a_{avg} = \dfrac{\sum (c_e p^*/s_e) \overset{*}{e} s^2}{\sum s_e^2} = \dfrac{\sum (c_e b_e^*)}{\sum s_e^2}$ ; avoids difficulty of calculating p*, complex conjugate of p, or division by small entities until...

7) Choose E such that $< \sum s_e^2 > \quad >$ threshold, function of a;

E cleanly defined, therefore; brackets are ensemble average; a is implicitly a basis function, and thus the threshold is a function of a (e.g. frequencies near DC and frequencies near diffraction limit)

Primary Beam Spectral Sensitivity Function

Potential Wavefront Beam Spectral Sensitivity Function (Monochromatic beacon @ Xnm as alternative)

FIG. 14

350: Computer Program or sub-routine: MAIN
352: Declaration, Files, User Variable Input, etc.
354: Allocate and clear (zero) 32 by 33 array of complex numerator and real denominator:

(356) int nreal [32][32][128][256] -- > 64 Megabytes
        (358) int nimag [32][32][128][256] -- > 64 Megabyte
        (360) int denom [32][32][128][256] -- > 64 Megabytes
        Total -- > 192 Megabytes 362A: Loop through E exposures
364: Run global wavefront sub-routine (several choices)
366A: Loop through 32 by 32 array of data subzones
368: Clear (zero) 256 by 256 "subzone_array" (370) (int or float)
370: Add current subzone data (as per loop 362 & 366) into subzone__array 370
372: 2D FFT subzone_array 372 => (374) uv_array_real [128][256], uv_array_imag [128][256]
376: Run local wavefront sub-routine (if needed) = > (378) rev__array_real [128] [256], rev_array_imag [128] [256]
380A: Loop through the 128 by 256 UV plane elements
382: [RE,IM] (384) = uv_array [ ] [ ] * rev_array [ ] [ ]  (complex multiply)
386: Mag (388) = RE*RE + IM*IM   (explicitly : (RE,IM): squared)
390: Convert to int if using float
392: NREAL[ ][ ][ ][ ]+= RE; NIMAG[ ][ ][ ][ ]+= IM;DENOM[ ][ ][ ][ ]+= MAG;
380B: Next UV plane element
366B: Next data subzone
362B: Next exposure
393: Allocate and clear (394) image_estimate [1024] [1024]
396A: Loop through 32 by 32 array of data subzones
398A: Loop through the 128 by 256 UV plane elements
400: uv_array_real [ ] [ ] = (float) NREAL [..]/ (float) DENOM [..]
     uv_array-imag [ ] [ ] = (float) NIMAG [..]/ (float) DENOM [..]
398B: Next UV plane element
401: Filter uv_array (complex multiply by OTF, e.g.)
402: 2D Inverse FFT uv_array => subzone_array [256] [256]
404A: Loop through 256 by 256 space elements
406: If inside 1024 by 1024 solution (see figure 15B),
     image_estimate [... offset (408) ...] += subzone_array [ ] [ ]
404B: Next space element
410: Optional post filter 412: Clear image output = > image_estimate [1024] [1024] (see border considerations in text)

FIG. 17

Wavefront Distortion Processing Methodology Overview

Step 1: Calibration
1A) Macro-Calibration: generally performed outside main program 350 in figure 14; i.e. as a stand alone program which outputs a calibration file; performed as needed; keep track of gross properties of spot images, i.e. nominal spot centers and spot relationships to field angle and pupil locations.

1B) Micro-Calibration: either performed inside main program 350, figure 14 "in parallel" to the steps listed in figure 14; or as often as needed as an external program: basically "fine tunes" estimates of null positions (zero slope positions) of the spots.

Step 2: Global Wavefront Sub-routine, 364, figure 14

Basically turns spot data into H matrix estimate. Can further function as pre-loading rev_array or otherwise performing processing which will speed up the operation of the local sub-routine, since the local routine will be a higher computational overhead routine.

Step 3: Local Wavefront Sub-routine, 376, figure 14

Performs final calculation of rev_array if not already done so in global wavefront sub-routine.

FIG. 18    Wavefront CCD,10
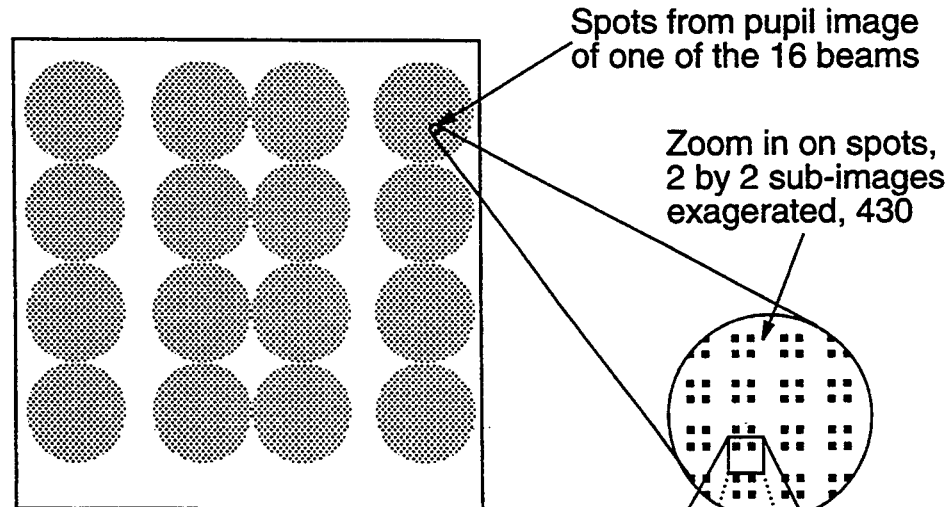
Spots from pupil image of one of the 16 beams
Zoom in on spots, 2 by 2 sub-images exagerated, 430
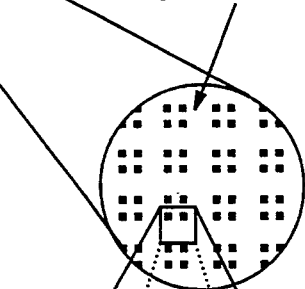
Zoom in on zero slope iso-brightness profiles (nominal) 5 by 5 pixels per spot (cross-talk inevitable) 432
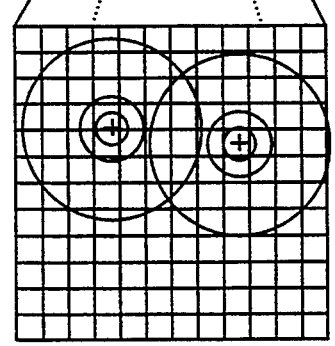
+  Spot null position (zero slope) 434
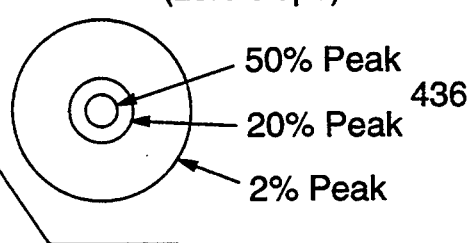
50% Peak
20% Peak   436
2% Peak
FIG. 18A
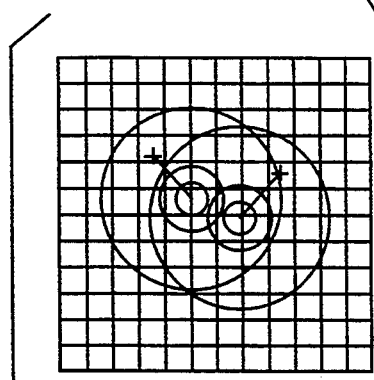
In-operation spot cross-talk and potential overlap (design for average > X% non-overlapping, say 99.9%)

FIG. 19  Global Wavefront Sub-Routine Processing Steps

500: Input - Digital Image of spots (e'th exposure) Calibration Structure

502A: Loop through 8 by 8 field angles

504: Update spot null positions if micro-calibration used

506A: Loop through good spots

508: Find nearest peak to current null position

510: Perform local centroid sub-routine = > xcenter, ycenter

512: gradx [current] = xcenter - x_null
grady [current] = ycenter - y_null

514: If farther than "threshold", increment "warning1"

516: Optional: sub-routine "remove_COG_bias"

506B: next good spot

518: run sub-routine "least squares wavefront estimation" (prior art) => phase [ ] [ ] defined on pupil support 519: Optional: run sub-routine "wavefront_est_refine" (see advanced processing sections)

520: Optional: run sub-routine "least squares scintillation estimation" = > complex_phase [ ] [ ] replacing phase [ ] [ ]

522A: Filtering, or "smoothing", phase function on pupil support

524: run sub-routine "reinterpolate_to_standard" => std_phase [ ] [ ] [ ] [ ] (complex)

522B: Filtering, or "smoothing", phase function on pupil support

502B: next field angle

526: Output loop 502 - > 8 by 8 array (526) std_phase [ ] [ ] [ ] [ ]

528A: Loop through 32 by 32 data subzones

530: run sub-routine "interpolate_local_pupil" => (532) local_pupil, [ ] [ ]

534: run sub-routine "find_psf (local_pupil)" => (536) local_psf [ ] [ ] [256] [256]

528B: next data subzone

538: Optional (reversion method specific): run sub-routine "further_wavefront_data_reduction"

FIG. 19A

Local Centroid Processing steps

470: Input - 3 by 3 array of brightness values
 center pixel offset

472: find lowest brightness value of the 3 by 3 array => low (474)

476: clear numerator_xcenter, numerator_ycenter
 clear denominator

480A: loop through 3 by 3 array

482:  numerator_xcenter += px [ ] * (v[ ] - low)
 numerator_ycenter += py [ ] * (v [ ] -low)
 denominator += (v [ ]-low)

480B: next array

484: return - xcenter = x_offset + numerator_xcenter/denominator
 ycenter = y_offset + numerator_ycenter/denominator

FIG. 19B

Sub-routine find_psf ( ) processing steps

440: Input - complex pupil function defined over some explicit support

442: resample onto 128 by 128 square grid (or higher, then downsample
 @ right before return)

444: autocorrelate into 256 by 256 grid

446: 2D FFT into spatial domain

448A: loop through 256 by 256 spatial elements

450: psf [ ] [ ] = square root ( $re^2 + im^2$ )

448B: next spatial element

452: return psf

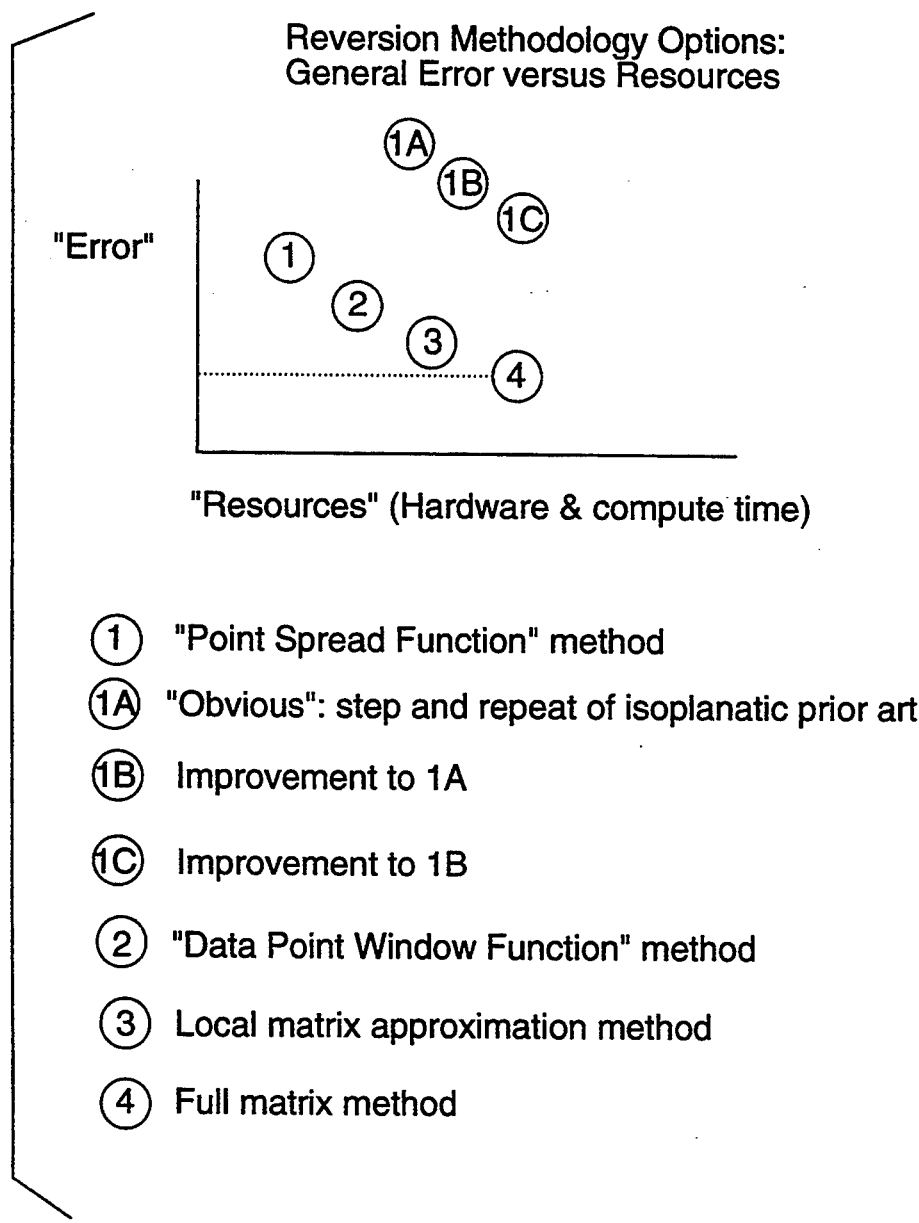

FIG. 21

Point Spread Function method of creating "rev _array"
Sub-routine 538, figure 19, "further_wavefront_data_reduction"

547: Input - array 536, local_psf [32][32][256][256]

548: Allocate and clear global_rev_array_real[32][32][128][256]
Allocate and clear global_rev_array_imag[32][32][128][256]
global_rev_array, 549

550A: Loop through 32 by 32 data subzones

552: 2D FFT (space to frequency) local_psf[current] = >
global_rev_array[current], 549

554A: Loop through 128 by 256 UV points

556: global_rev_array_imag[current] = -global__rev_array_imag[current]

554B: next UV point

550B: next data subzone

FIG. 21A

Sub-routine 376, figure 14, "local wavefront sub-routine"
(Point Spread Function method)

558: assign pointer rev _array_real - > global_rev_array_real[current]
asssign pointer rev_array_imag - > global_rev_array_imag[current)

128 by 128 sections (1A) "Obvious" step and repeat of isoplanatic prior art (1B) step and repeat "sweet spot" (using isoplanatic methods)

(1C) Use "smooth" sweet spot, post-filter final image

Data (1) "Point Spread Function" method

FIG. 23

Data Point Window Function method of creating "rev_array"
Sub-routine 538, figure 19, "further_wavefront_data reduction"

559: Input - array 536, local_psf[32][32][256][256]

560: Allocate and clear global_window_array[32][32][256][256]
global_window_array, 561

562: Allocate and load 64 by 64 bilinear array weight[64][64] (563)

564: Extend indexing on 32 by 32 data subzones to 40 by 40
"virtual subzones" (565)

566A: Loop through 40 by 40 virtual subzones

568: If current (as per loop 566) outside 32 by 32 actual, use nearest
actual psf inside loop 570

570A: Loop through 32 by 32 window sites on array 561

571: If current window site center not within psf halo of current
virtual subzone @ loop 566, return to 570A for next window site 572A: Loop through 64 by 64 of weight array 563

574: If outside psf halo, continue 572A

576: global_window_array[win_offset - win_current] += weight[current] *
local___psf[psf__offset + psf_current]

572B: next weight element

570B: next window site

570B: next virtual sub-zone

577: 2D FFT all 32 by 32 global_window_array = > assign same name
= > global_window_array_[32][32][128][256]
= > global_window_array_imag[32][32][128][256]

FIG. 23A

Sub-routine 376, figure 14, "local wavefront sub-routine"
(Data Point Window Function method)

580: assign pointer rev_array_real - > global_window_array_real[current]
assign pointer rev_array_imag -> global_window_array_imag[current)

FIG. 24B local_psf[32][32][256][256], 536

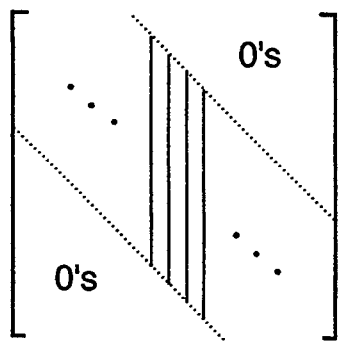

H matrix

Multiple band aspects of 2D images ignored for graphical simplicity: local_psf array is essentially columns of H; they implicitly "change slowly"; but...

better solutions (less noise) are had by using rows, i.e., data point window functions Interpolation function (e.g.)

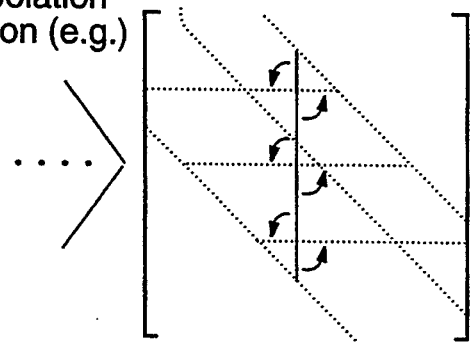

Calculating rows of H from the more easily calculated columns

Processing steps of figure 23, essentially rotate local_psf onto H rows, or global_window_array, 561 (with bilinear weight function; "smoother" functions certainly can be used)

FIG. 25

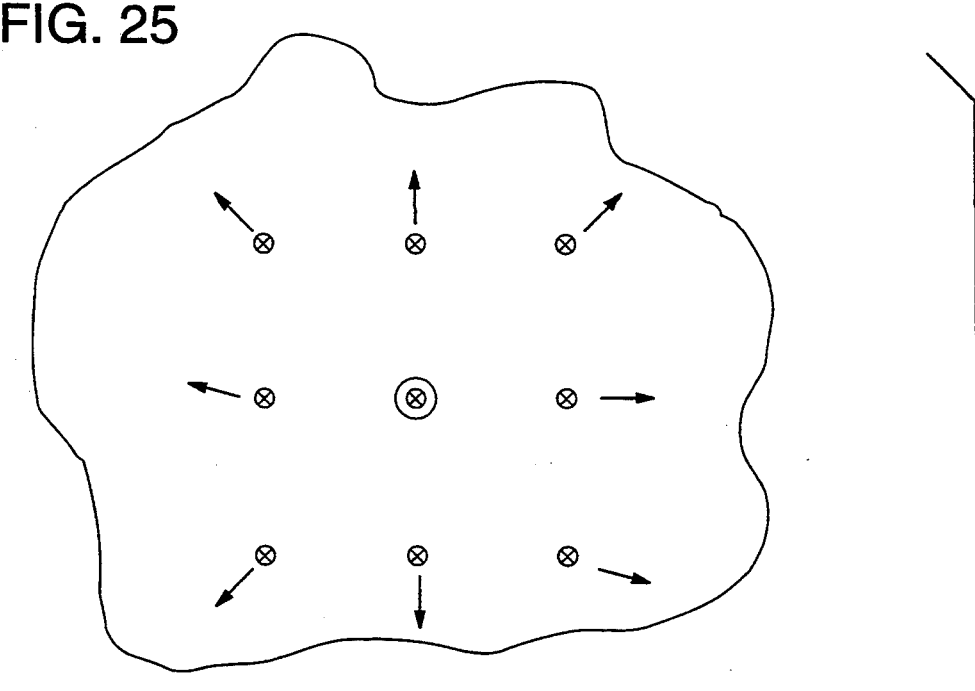

Frequency domain representation of simplified local (subscript n) matrix equation 11. By placing an all 1's vector in G, the inverse of the local rev_array is (theoretically) found. The trick is not to solve for the inverse, which involves the nasty nulls again, but to merely find a simple numeric relationship of the phase reversion in light of the quite narrow banding in $\mathcal{H}$. Solutions 1 and 2, figure 20, only use the diagonal of $\mathcal{H}$, whereas solution 3 would exploit the small but non-negligible width of the band in order to create yet a better approximation for the true field variant rev_array.

FIG. 26B
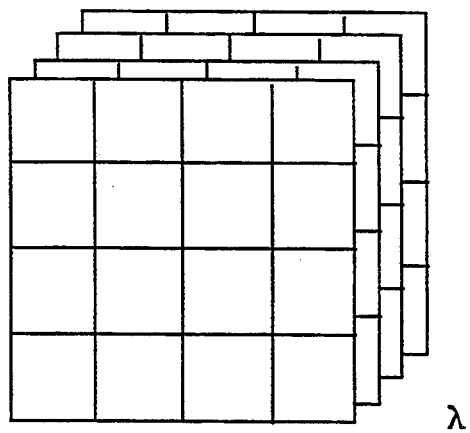
Current Object Estimate, 610
(Polychromatic)
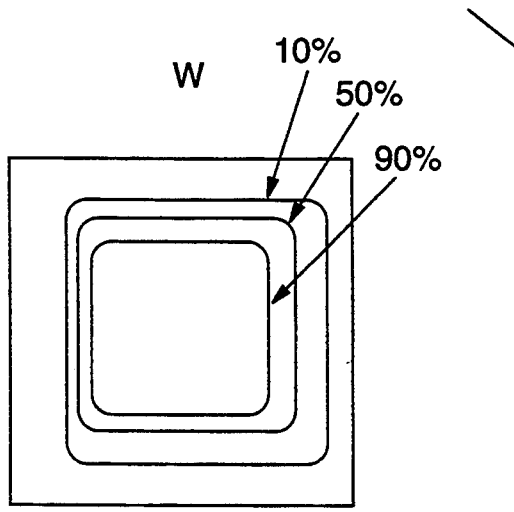
Actual (slightly asymmetric and trapezoidal in full WF design) spatial filtering profile, 612
Fourier Transform ⇩
$W_\lambda$
$$f = \sum_m \sum_\lambda f_{m,\lambda}$$
- - - -
Measured Slopes ⇩
$$\text{Measured\_Phase} = \sum_m \sum_\lambda f_{m,\lambda} \cdot ((e^{-iks_m} \cdot \text{Pupil}) \circledast W_\lambda)$$

FIG. 27

Wavefront Estimate Refinement Sub-Routine, 519, figure 19
"wavefront_est_refine"

Step 620: Input - an array of absolute phase [ ] [ ] already processed from the spots by sub-routine 518

Step 621: Allocate and clear new_phase [ ] [ ] 622 and tmp_phase [ ] [ ] 623

Step 624: If not performed yet: allocate and load w_lambda [ ] 625 table e_shift [ ] 626 table Step 628: run sub-routine "load_f_lambda" 629

Step 630A: Loop through lambda planes

Step 632A: Loop through m

Step 634: tmp_phase [current] = phase [current] * e_shift [current]

Step 636: new_phase [current] = f_lambda [ ] * (tmp_phase [ ] @ w-lambda [ ])

Step 632B: next m

Step 630B: next lambda

Step 638A: step phase indices

Step 640: phase [ ] - = alpha * (new_phase - phase)

Step 638B: next phase index

Step 642: Output: "enhanced" phase estimate phase [ ] [ ]

FIG. 28

Step 700A: Loop through 8 by 8 field angles

Step 702: calculate pupil estimate

Step 704: apply spot crosstalk correction

Step 706: Van Cittert loop A: predicted spots - actual spots
return to step 702 if above threshold
(can include beyond zernike tip-tilt)

Step 708: Van Cittert loop B: predicted pupil - actual pupil
return to step 702 (see figure 27)

Step 700B: next field angle

Step 710: finish main program 350

Step 712: Refine object estimate?, if yes, go to step 700A

Step 714: Is it part of multispectral set? If yes, refine spectral?
if yes, go to step 700A Step 716: Less error clear image

FIG. 31

Process Flow for removing Scintillation

800: Step through each sub-aperture distorted image

802: Perform global registration of distorted image to reference image, using peak on cross-correlation 804: Remove lenslet fixed distortion, if known 806: Perform low pass filtering to both reference image and distorted image, generally in the 5-10" FWHM Guassian 808: Subtract filtered distorted image from filtered reference image, call result difference image 810: The negative of difference image divided by filtered reference image is general estimate of anisopianatic scintillation function 812: Add difference image to distorted image to produce "normalized" distorted image for this sub-aperture 814: Loop back to step 800

FIG. 35A
FIG. 35B
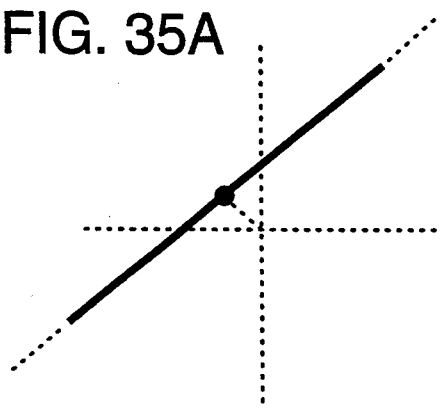
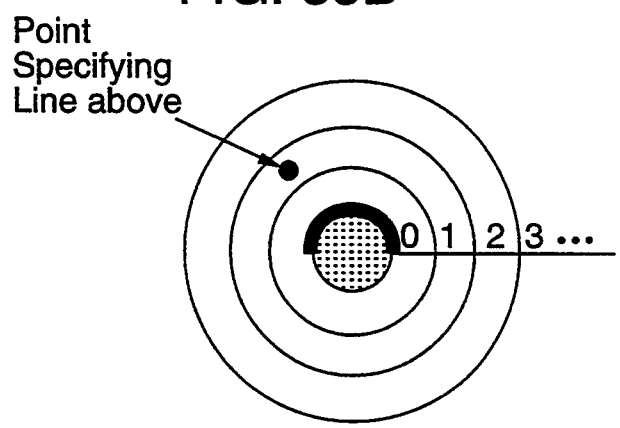
Point Specifying Line above
FIG. 35C
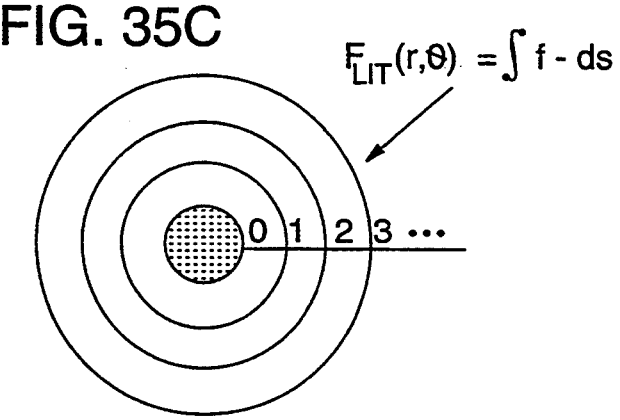
$$F_{LIT}(r,\theta) = \int f \cdot ds$$
FIG. 36A
FIG. 36B
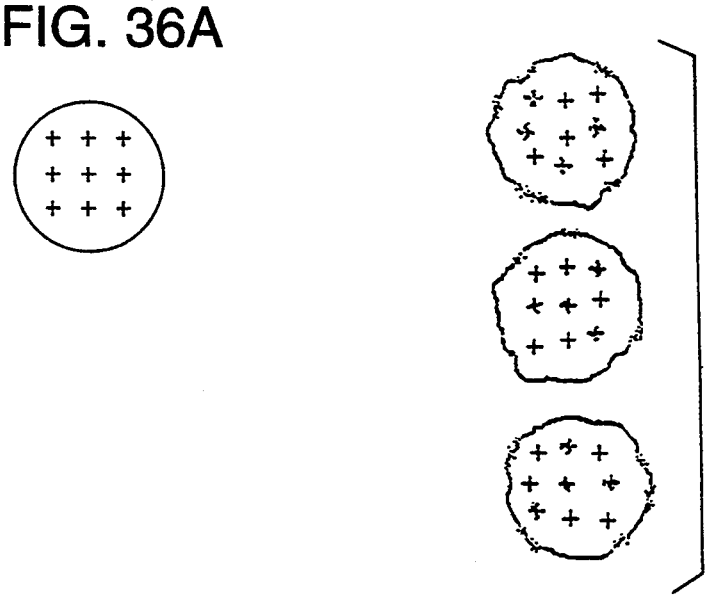

FIG. 37

900. Gather 'E' short exposures of object

902: Calibrate with dark frames and flat fields, if necessary

904: Choose one exposure as master x-y offset, perform gross registration of all other exposures to the master; resample accordingly 906: Average all registered exposures together, call "standard image"

908: Filter average image with guassian, call "standard filtered image"

910: Step through each exposure

912: Filter using same filter as used on "standard filtered image"

914: Obtain current "difference image" by subtracting 912 from 908

916: Add difference image to original exposure, call "scintillation-corrected exposure"

918: Sub-routine: determine geometric distortion

920: Spatially filter out very high frequencies on found distortion

922: Apply reverse distortion to s/c exp of 916, call "undistorted image"

924: Create "weighting image", measure of local contrast

926: Loop through all pixels in current exposure: accumulate weighted average into numerator and denominator for each pixel 928: Complete loop begun with step 910

930: Loop through all pixels of weighted average

932: Divide numerator by denominator to obtain pixel value

934: Complete loop begun at step 930

936: Resulting image is "optimal estimate" (i.e. "clearer" image)

938: Post-filter any procedural error/noise

METHOD AND APPARATUS FOR WIDE FIELD DISTORTION-COMPENSATED IMAGING

RELATED APPLICATION DATA

The present application is a continuation in part of application Ser. No. 08/024,738, filed Mar. 1, 1993, the disclosure of which is incorporated by reference.

FIELD OF THE INVENTION

The present invention relates to the imaging of objects which have been distorted or blurred, and more particularly relates to a method and apparatus for creating clear wide field images after first characterizing and then compensating for the distortion. The distortion is characterized by being both spatially and time variant.

BACKGROUND AND SUMMARY OF THE INVENTION

The limitations on imaging system performance imposed by a turbulent media, most simply described as 'blurring,' are well known, particularly in applications using medium to large aperture telescopes in the open atmosphere. These limitations have not only led to a variety of system solutions that will be discussed as prior art, but have played a major role in the decision to launch space based telescopes and have led to serious postulations of lunar based observatories.

For a large aperture telescope—generally greater than a 10 centimeter diameter for the visible light region—which is otherwise constructed to a precision commonly referred to as "near diffraction limited," the overall ability to resolve objects obscured by a turbulent atmosphere is limited by the turbulence rather than by the instrument. For the visual band of light once more, it is quite typical for a 1 meter aperture telescope to have ten times worse resolving power due to the turbulence, while a 10 meter aperture telescope can be 100 times or more worse than its innate "diffraction limit." The exact numbers for any given telescope on any given night are a function of many variables, but this general level of degradation is widely recognized. As importantly, this atmospheric blurring directly leads to a loss in effective sensitivity of these large aperture imaging systems, which either renders dim objects just too dim to be seen or forces greatly extended exposure times, ultimately limiting the number of objects that can be imaged during a given length of usage time.

The prior art for addressing this problem and trying to alleviate it can be generally categorized into the following well known areas: 1) Telescope Placement; 2) Adaptive Optics Systems; and 3) Speckle Interferometric Systems. It would not be unfair to say that the system disclosed herein is best summarized as a fundamental expansion to the third category, though this is only in a most general sense.

Regarding the first category, that of simply finding locations of minimal turbulence, the placement of telescopes at high elevations has been known and practiced since Isaac Newton's era. This typically adds some expense, but more critically, it is well known that this only goes a small way toward reaching diffraction limited performance, and moreover, imaging performance is still quite subject to the varying atmospheric conditions of a given site. The space age has brought about the "obvious" solution of launching telescopes above the atmosphere; though at considerable expense and complexity.

The second category of adaptive optics has been well known for decades and has seen significant physical realizations over the last two decades. A brief technical summary of such a system is that after a telescope primary mirror has collected the light waves emanating from a given object, it splits the light wave into two "beams." One beam goes into an instrument known as a wavefront sensor and the other beam enters an ordinary imaging system or camera. The wavefront sensor derives information about the phase distortion (caused by the atmosphere) of the incoming light wave and in less than hundredths or even thousandths of a second, sends control signals to mirror actuators which advance and retard primary beam mirror surfaces in cancelling opposition to the incoming phase distortion. There are two critical problems with these systems, however. First, they are expensive to build and expensive to maintain. Second, they can only increase the resolving power within an extremely small angle about the nominal central (paraxial) ray of the telescope, typically on the order of 2 to 10 arc seconds in the visible band. This "tunnel vision" is technically referred to as the "isoplanatic patch." It arises due to the fact that the phase distortion of a three dimensional media such as the atmosphere changes rapidly as a function of field angle.

The third category of speckle interferometry was begun and developed roughly contemporaneously with adaptive optics systems, i.e. over the last two decades. The guiding principle of these systems is to take a large number of short exposure images of an object, thereby "freezing" the phase distortion (in time) of a given single exposure, and ultimately deriving the fourier magnitude and the fourier phase of the object being imaged through mathematical operations on the accumulated set of exposures. The state of the art of these techniques now includes the addition of a wavefront sensor to an overall system, which provides additional information to the computational operations, allowing for a smaller number of short exposures to be gathered to achieve a given level of precision and also simplifying the overall process. Though these speckle systems can be less expensive than adaptive optical systems, they too are limited by "tunnel vision" of the isoplanatic patch. Moreover, since they do not account for the field variance of the distortion, they suffer from higher noise and error levels, which in turn affect their effective sensitivity, accuracy, and throughput (number of images needed for a given level of accuracy).

The expense and limited performance of the collective prior art has accordingly limited its application and hampered its broader acceptance. A novel aspect of the system disclosed herein is that it will quantify and compensate for the field variant complex phase distortion across an arbitrarily wide field of view, at a cost much less than a comparable adaptive optics system, and with a throughput and accuracy much better than speckle interferometric systems. In so doing, it can also provide advantages over these prior art systems even in applications where the object of interest is contained within the so-called isoplanatic patch; most notably in cost per image at a given accuracy (error and signal to noise ratio).

Just as adaptive optics systems have recently employed "artificial beacons" to assist in the imaging of very dim objects, so too can the systems described herein utilize various forms of this concept as described herein. Artificial beacons can be employed when the brightness of an object under study is insufficient or inappropriate to provide photons to a wavefront sensor. The beacons are generally laser beams directed along a close line of sight to the object, generating backscatter photons which will undergo largely similar phase distortions as the photons from the object under study, and thus they can be used to deduce the phase distortions applicable to the object photons.

The preferred embodiment of the system disclosed herein is a large telescopic imaging system used in the open atmosphere. This is chosen as an important and tangible example of obtaining clear images through a general field variant distorting media. It should be evident that other physical instruments, subject to distorting mechanisms other than an atmosphere, can also produce sets of digital images and corresponding sets of field variant distortion estimates, thereby being capable of utilizing the claimed methods of processing these sets of digital data into a single clear image.

BRIEF DESCRIPTION OF THE DRAWINGS

FIG. 6A is a schematic view of the mirrors in the mirror sub-unit of FIG. 6, as seen by the incoming light beam.

FIG. 6B is a front view of the two checkered mirrors of the FIG. 6 embodiment.

FIG. 6C is a schematic drawing of the field stop sub-apertures which can be used in a 2X wide field Hartmann embodiment.

FIG. 7 is a schematic view of a wide field Hartmann camera according to one embodiment of the invention, called the "full" wide field Hartmann camera.

FIG. 8 is a schematic drawing of the optical train of one embodiment of the invention, along with a list of critical example specifications which are used throughout the disclosure in order to further explain detailed design issues.

FIG. 8A is a schematic drawing of the 16 round pupil images as they would appear at the lenslet plane in front of the wavefront detector, with the lateral displacements of the beamsplitters overlaid.

FIG. 9 is a hardware and computer system block diagram of an illustrative embodiment.

FIG. 10 is an overview of the processing methodology used in an illustrative embodiment.

FIG. 11 is a representation of a generic weighted average operation.

FIG. 11A is a logical step overview of the critical role that the weighted averaging operation can play in mitigating the traditional difficulties involved with image estimation based on inversions.

FIG. 14 is a diagram showing a processing methodology according to an illustrative embodiment of the invention.

FIG. 17 is a processing step overview of illustrative methods which determine image plane distortions based on Hartmann spot data.

FIG. 18 is a schematic which takes a closer look at the image data derived from the full wide field Hartmann camera, showing two levels of zooming in, culminating in a general look at nominal spot brightness overlap and crosstalk.

FIG. 18A looks at "in operation," i.e. turbulent conditions, spot crosstalk and overlap.

FIG. 19 is a detailed description of the processing step of the global wavefront sub-routine, which is a sub-routine in the main program of the illustrative embodiment.

FIG. 19A is a description of the processing steps involved in a local centroiding sub-routine.

FIG. 19B is a description of a sub-routine which estimates the point spread function from a complex pupil function.

FIG. 20 is an intuitive graph which illustrates the relation between "obvious" applications of prior art methods (1A) to six novel methods of this invention (1,2,3,4,1B,&1C).

FIG. 21 is detailed description of the processing steps of the point spread function method of creating "rev_v_array," a critical array used in the main program.

FIG. 21A is a description of the local wavefront sub-routine, corresponding to the point spread function method.

FIG. 23 is detailed description of the processing steps of the data point window function method of creating "rev_array," an array used in the main program.

FIG. 23A is a description of the local wavefront sub-routine, corresponding to the data point window function method.

FIG. 24B graphically provides further insight into the operation of the processing steps of FIG. 23, shown as they might affect the H matrix in equation 1 of the text.

FIG. 25 is a schematic with extended explanatory text in the figure, outlining the rationales of refining the methods of determining rev_array for use in the main program reversion process.

FIG. 26B schematically outlines the framework in which the effects of the spatial filtering are mitigated by the processing methodology of FIG. 27.

FIG. 27 is a preferred embodiment of the processing methodology which can mitigate the errors that would otherwise have been introduced by the spatial filtering of the sampling apertures of FIGS. 26A and 26B.

FIG. 28 is a general overview of other refinements to the data processing.

FIG. 31 is a process flow chart for largely removing the effects of scintillation in a distorted image.

FIGS. 35A–35C are graphics which help explain one mode of finding the geometrical distortion between a given distorted image and a reference image.

FIG. 36 is a graphic explaining the basics of how a single detector system can manifest a changing distortion and focus on a given object.

FIG. 37 is the process flow of removing the higher order distortion effects of a single detector system.

DETAILED DESCRIPTION

Figure 1:
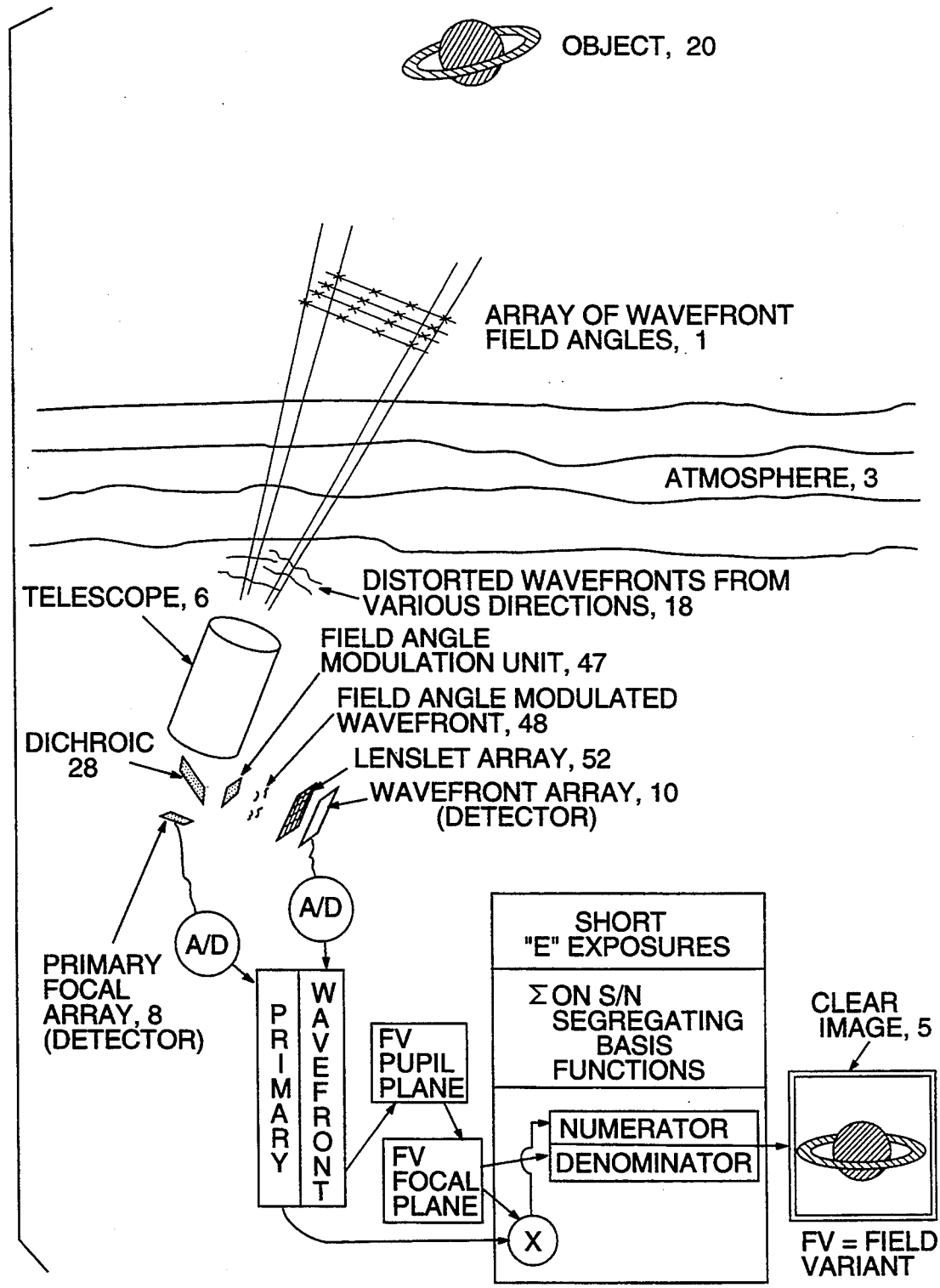
FIG. 1 pictorially summarizes some of the principal components of a system according to a preferred embodiment of the present invention.

The disclosure begins with a general description of the aggregate of parts of the system and then will discuss each part in detail. FIG. 1 contains a schematic summary of the central aspects of the preferred embodiment. The physical entities are enumerated and the process flow will be described in the text. In FIG. 1, an object 20 is being imaged by a telescope 6 with an atmosphere 3 distorting the light wavefronts 18 emanating from the object, where the distortion on the wavefronts appreciably vary depending on which point of the object the wavefront originates. This variance according to field angle has been termed "field variance" and lies at the core of the novelty of many aspects of this invention relative to the prior art. The current invention recognizes that the incoming light wavefronts can be seen as arriving from a grid of field angles 1—or more generally, from a functional steradian space. The grid spacing, or equivalently, the appreciable frequencies of the field variance, is intimately connected to the statistical characteristics of whatever atmospheric conditions prevail. The invention therefore will explicitly measure and/or estimate the wavefront distortion as a function of field angle, using this estimate in subsequent data processing methodologies which create a clear image 5 of the object 20. The preferred embodiment does this by first utilizing the common methods used in adaptive optics systems and speckle systems incorporating paraxial wavefront sensors. The primary beam of the telescope 6 is split into two beams by a dichroic 28, where a narrow visual band beam falls on a primary detector 8, while a generally wider band light beam enters a wavefront sensing sub-system, called a "wide field wavefront camera" in this disclosure in order to summarize the overall difference from the prior art. The light beam which is split by the dichroic 28 and sent toward the wide field wavefront camera first encounters a field angle modulation unit 46. Several variants of this unit will be disclosed. The basic function of this unit is to effectively separate the identities of the various field angle directions, though the term "modulate" is the more appropriate term since later image processing methods better view this function in that mathematical context. A field angle modulated wavefront 48 emerges which then falls on a standard lenslet array 52, producing what is commonly known as Hartmann spot images on a wavefront array 10. The outputs of the arrays 8 and 10 are digitized and sent to image storage areas labelled primary and wavefront in the figure. The wavefront data is first processed into an estimate of the field variant complex wavefront which exists at the pupil plane of the telescope. From there, it is further processed into a field variant focal plane estimate, stored either as a point spread function, itself a function of the wavefront field angle grid 1, or as its UV plane conjugate. Much of what has taken place here utilizes basic techniques of prior art systems, but further involves the field angle modulation unit 46 and the use of the "FV" in front of the "pupil plane" and "focal plane," indicating novel processing methodologies which explicitly deal in field variant frameworks. A further novel aspect of this invention is then depicted inside the dashed box, where reference is made to the use of signal to noise segregating basis functions. As will be seen in the more detailed descriptions of the disclosure, a clear image 5 will be constructed by using a generally overdetermined set of basis functions which nevertheless provide for a common ground for individual "speckle exposures" to be compared and processed together in a weighted average sense. It is interesting to note that these basis functions can reduce to the "trivial" case of the global fourier coefficients in imaging systems which are "field invariant," whereas much more involved engineering considerations lead to their specification in field variant systems such as that of the invention. The dashed box in FIG. 1 thus describes how some set of E exposures, typically 1 to 50 for brighter objects, are first transformed into these new basis functions, the field variant focal plane distortions are likewise transformed into this same set of basis functions (with certain extra considerations as the detailed disclosure will show), a weighted average on the individual components is derived which ultimately leads to a summed denominator and a summed vector product in the numerator (a weighted average operation generally has this form). After E exposures are cycled through, the numerator is divided by the denominator—over all basis functions—and out comes the clear image 5 of the object 20. The importance of these elements and processing steps drawn in FIG. 1 will become more clear as the disclosure moves into more detailed levels of description.

Figure 2:
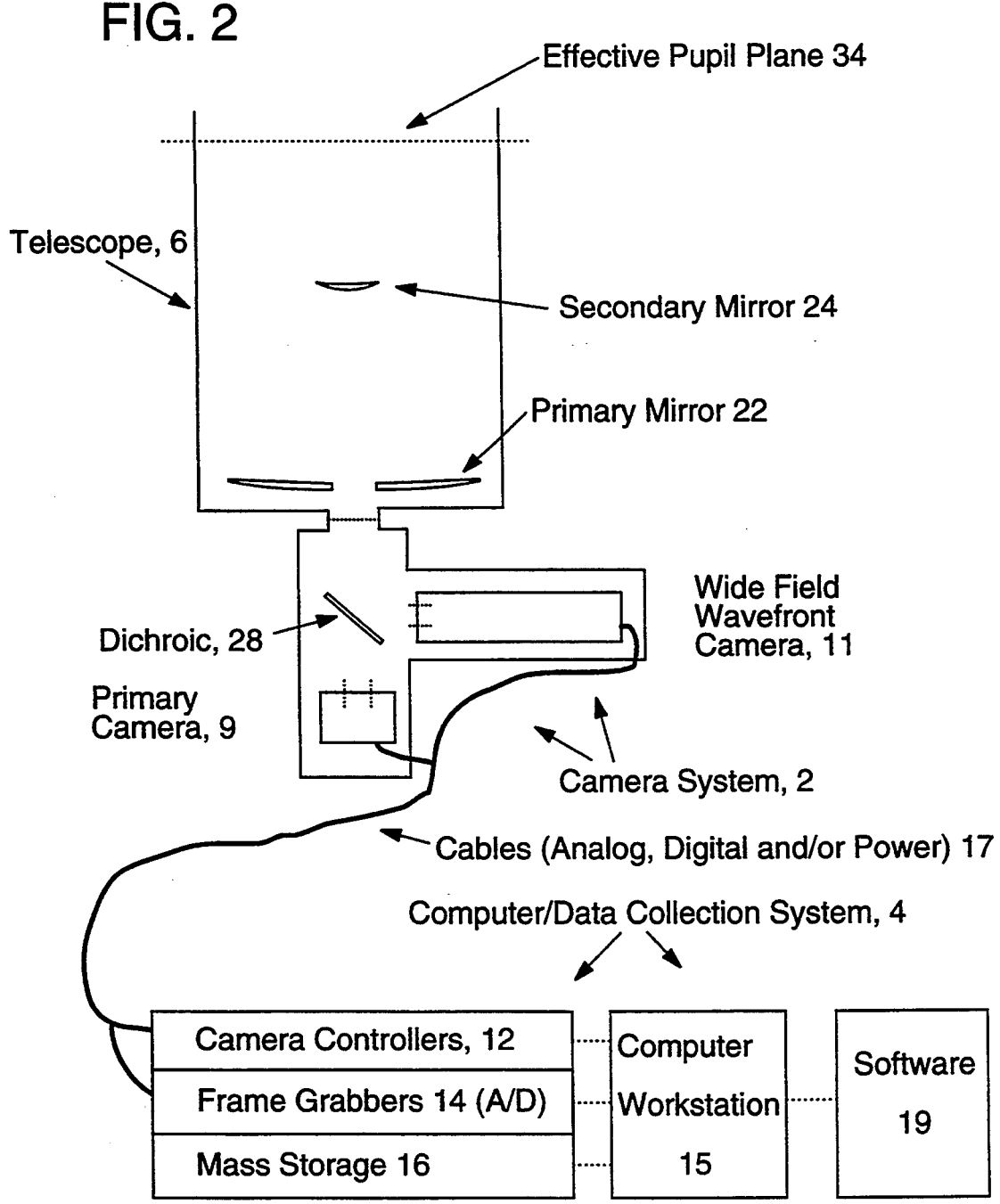
FIG. 2 is a schematic overview of the physical components of the preferred embodiment.

FIG. 2 has an overview of the physical systems and sub-systems of the preferred embodiment. It is perhaps most convenient to split the physical components of the system into those elements which attach directly to the telescope and those which are part of an operating station. This disclosure concisely refers to this distinction as the camera system 2 and the computer/data-collection system 4. The camera system 2 is attached to a large aperture telescope 6 with two electronic cameras inside, the primary camera 9 and the wide field wavefront camera 11. These two cameras, in conjunction with camera controllers 12 and image digitizing systems (framegrabbers) 14, are capable of collecting a series of synchronized short exposure "digital images." Anywhere from one to several thousand exposures will be gathered depending on a wide range of variables, where the larger numbers of digital images are often compressed and sent to mass storage 16, or otherwise processed "on the fly" if that is computationally economical. The exposure times (the length of time the "shutter is open") for both cameras (which will be synchronized, incidentally) are typically on the order of one thousandth of a second up to as long as a tenth of a second or longer still, depending on many variables. It is well known in telescope design theory that the light waves (18, FIG. 1) are collected by a large telescope primary mirror 22, reflected to a secondary mirror 24, and exit the main telescope assembly as a panchromatic light beam converging toward a nominal focal plane (exit beam not drawn). This emerging beam is then split by a dichroic 28 which passes a narrow spectral band beam into the primary camera 9 and a broader band beam into the wide field wavefront camera 11 (further details will be described later, see FIG. 12A). During a given exposure, the primary camera 9 in conjunction with the camera controller 12 and the frame grabbers 14 digitizes a wide field 'distorted' image of the object in the narrow band of interest (typically 10–50 nanometers wide), while the wide field wavefront camera 11 is explicitly designed, as will be described in the preferred embodiment of this sub-system, to gather complex phase information about the effective pupil plane 34 across an array of field angles, not merely along the paraxial field angle. This wavefront beam is first measured by the electronic array (10, FIG. 1) and converted to a digital image just as is the case for the primary camera previously described. As is well known in the art of wavefront sensing, the optics in the wavefront camera 11 are designed with the location of the effective pupil plane in mind (i.e. conjugated to the lenslet array 52, FIG. 1). Rounding out the items in FIG. 2 are the cables which electronically attach the camera system 2 to the computer system 4, and then the computer workstation 15 which essentially oversees and controls the operation of the entire system, as well as performing all or some of the data processing methodologies described later on. The commercially available options for configuring items 12, 14, 15, and 16 are vast, and thus the block diagrams of these items are left in a general form. Typical components which are implicitly contained in the computer workstation 15 are viewing monitor(s), disk drives, links to array processors or supercomputers if needed, keyboards and other input devices, printers, etc. etc. Finally, the generic element of software 19 is depicted, encompassing both commercially available user programs, compilers, data analysis packages, AND, programs which embody aspects of this invention which may either be on their own or incorporated into larger system operating software platforms (all as is well known in the art of software engineering).

Figure 3:
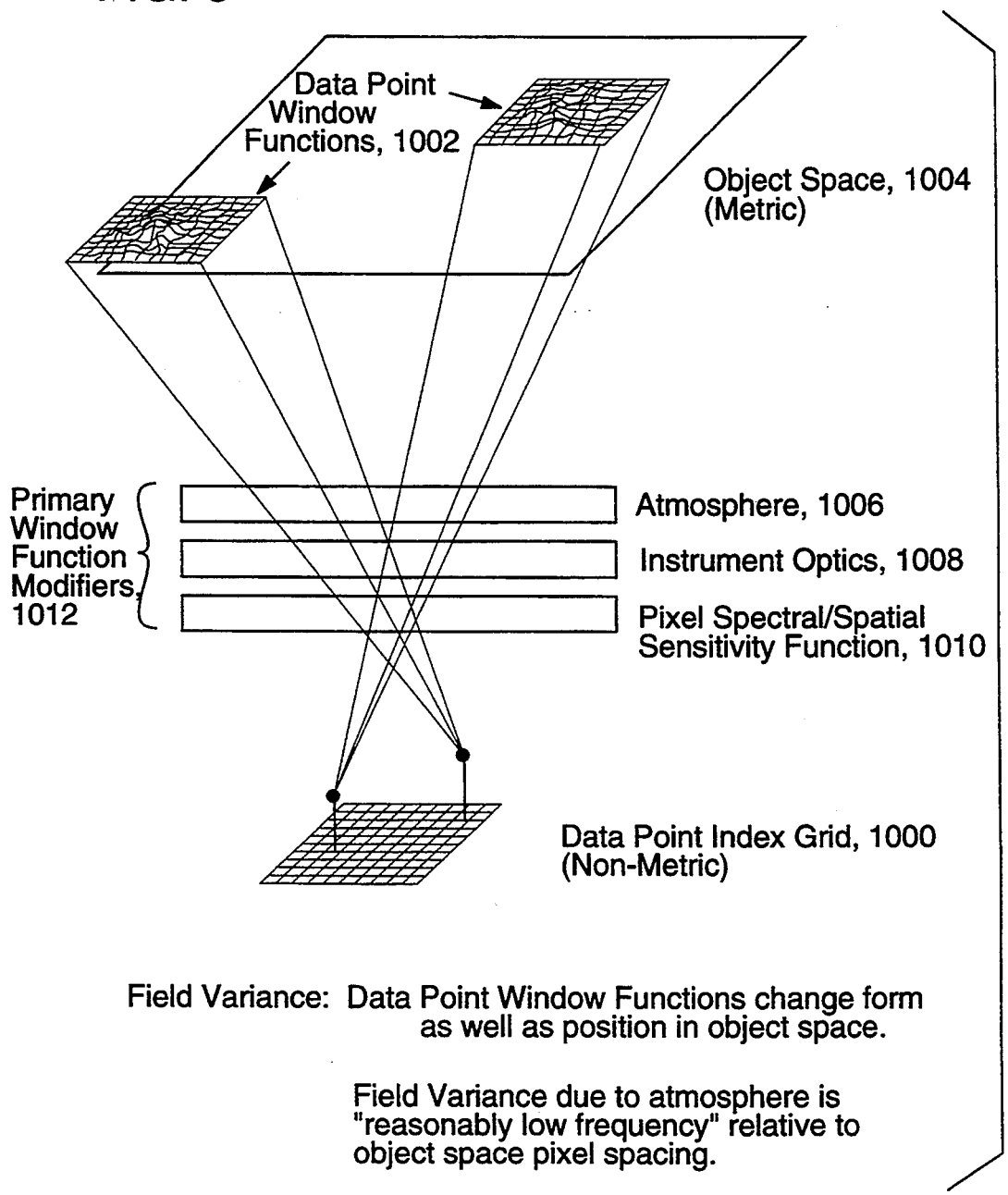
FIG. 3 is a graphic representation of some of the mathematical foundations which are used to generate specific implementations of the processing methodology.

As mentioned in the discussion surrounding FIG. 1, the physical system in FIG. 2 will collect "E speckle exposures" in order to obtain one clear image 5. E was mentioned as being, typically, anywhere from 1 to 50 for brighter objects. An "exposure" in this case refers now to two distinct synchronized digital images, one each deriving from the primary camera 9 and the wide field wavefront camera 11. The pixel size or pixel extent of the two cameras need not be the same. Using current technology, it would not be untypical that these exposures would be gathered at a rate of one per second, thus the data gathered for one clear final image 5 will take anywhere from a second to a few minutes. For applications where an object changes its intrinsic appearance at a time rate comparable to this rate or faster than this rate, special faster image capture systems would be needed in order to avoid time based blurring of the final clear image 5. For a given exposure, the digital image information gathered by the wide field wavefront camera 11 is first processed by the computer workstation 15 into a field variant estimate of the complex phase of the light waves 18, FIG. 1 as they pass the pupil plane of the telescope 34; this is to say that the "field variant pupil function" is being measured—precisely as conceived in prior art systems, only now it is explicitly a function of field angle as well. The field variant estimate of the complex pupil function is then combined with a priori knowledge of the telescope optics, such as the boundary of the pupil (its "support," including annular considerations), the magnification ratios applicable at the primary detector array 8, and also possibly combined with knowledge of the microspatial sensitivity profile of pixels on the electronic array 8, and together a field variant estimate of the data point window function is derived. The data point window function is the weighted field of view that each data point, or "pixel," has on the object space. The significance of the data point window function and how it is derived will be explained in the processing section, but briefly, it is a function which is in general much more useful in the correction of field variant imaging problems (as opposed to using the point spread function) and it will play a central role in the data reduction steps of the system. A simple schematic of the data point window function is depicted in FIG. 3, outlining its key properties. FIG. 3 in many ways epitomizes a generalized digital imaging system, only that here the additional window function modifier of the atmosphere greatly broadens and complicates the resulting window functions. The elements of this drawing begin with an index grid of data points 1000, where this is in general a non-metric entity even though so many applications treat it in a metric fashion; the grid is of intuitional and practical convenience, corresponding to the nominal locations of pixels on a detector array. Each data point has a weighted spectral sensitivity function 1002 on a metricized object space 1004. The shapes and positions of these window functions are determined by some set of modifiers or optical transfer functions 1012, where the major ones listed here labelled are the atmosphere 1006, the overall instrument optics 1008, and the physical pixel spectral/spatial sensitivity function 1010. Two particular window functions corresponding to two random data points (pixels) are drawn with projections onto object space which cross each other in deference to the inverting properties of typical imaging optics. The object plane itself is drawn as a square region corresponding to the nominal geometrical projection of the primary detector 8 onto object space. This is purely as an intuitional aid as well. One subtlety alluded to by one of the data points in FIG. 3 will be given more detailed consideration later, and that is that data points near the edge of the detector have their window functions extend beyond the geometric projection of the detector. Another item to note is that the window functions are themselves smaller square regions than the entire object space. This is in reference to a technique for economizing on computational resources, whereby only a smaller region which contains some large amount—say 99%—of the integrated volume of the function is utilized in processing stages. For the purposes of this general summary, it is enough to understand that the primary goal of the specific preferred embodiment of the invention is to measure these field variant window functions for each exposure, and to use them at the multiplication stage of the dashed box in FIG. 1 as well as directly in the calculation of the denominator in that dashed box. Highly refined procedures which will be outlined go even a few steps beyond this.

Figure 13:
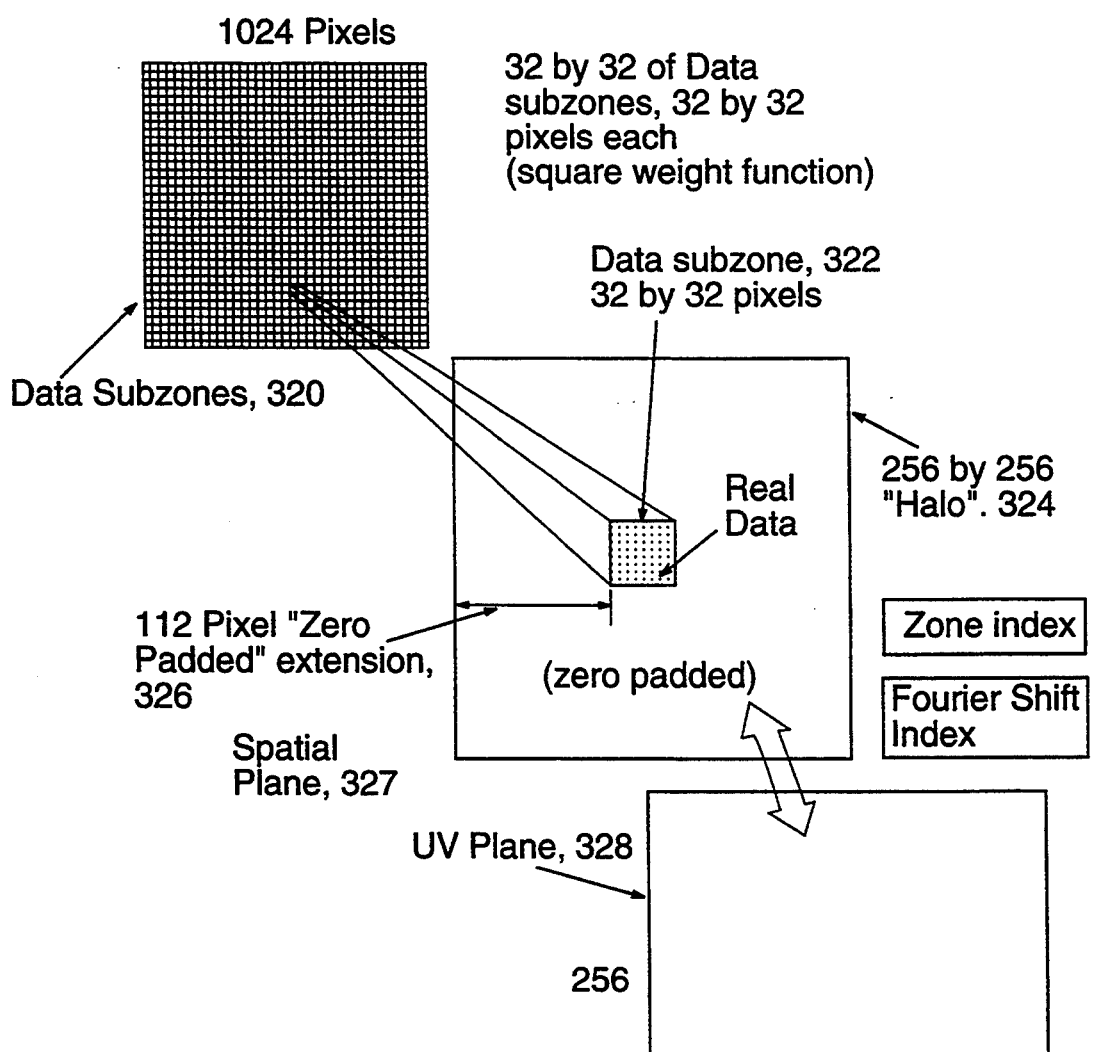
FIG. 13 is a schematic representation of the illustrative embodiment of the overdetermined basis functions used in the processing methodology.

In order to better understand what signal to noise segregating basis functions are and why they are used, we can briefly skip ahead to FIG. 13 which has a simplified schematic depicted of the overdetermined basis functions used in the preferred embodiment, with one in particular blown up. This figure shows that the final image estimate is broken down into a generally dependent (overdetermined) set of basis functions which maintain generally "knowable" signal to noise characteristics. Singular value decomposition techniques perform a more precise method of segregating the image into an independent set of basis functions, unique to each atmospherically distorted wavefront; whereas here, we merely want to approximate this segregation in a simpler, computationally efficient manner which is not unique to each exposure, hence the use of overdetermination. The purpose of this step is so that each individual primary image exposure can separate out its unique signal to noise components into a common framework so that it can add its own properly weighted estimate to an averaged final image estimate. The basis functions chosen for the preferred embodiment are, effectively, the global fourier components AS CONTRIBUTED BY local data regions. [Computational efficiency will show that we don't need to use absolute global fourier coefficients, however, hence only the 256 by 256 local fourier components]. In this manner, a given exposure with a given local region which has a global "null" frequency will add no weight to a final image estimate, while another local region with a good signal to noise ratio on that frequency will add a proportionally high weight to a final object estimate. This separation and weighting of signal to noise properties is the essence of utilizing signal to noise segregating basis functions and has long been practiced in the far more intensive SVD matrix methods.

FIG. 13 shows the primary detector plane 8 segmented into small square regions of pixels which approximate a field invariant region, where one such region is projected outward. The basis functions are then defined in object space and wind up being the much wider region of UV plane coefficients (fourier coefficients) that would result as if the smaller square segments were "zero padded" well beyond their actual extent all the way to the 256 by 256 borders. This effective zero padding can extend as far as the extent of the entire object estimate if necessary, though a smaller region generally suffices for much the same reasons that the window functions 1002 FIG. 3 are smaller. This choice of basis functions effectively represents "the contribution of this small quasi-isoplanatic segment" to the overall object estimate. Engineering refinement details can lead to a minimization of the errors inherent in the quasi-isoplanatic approximation to any level required by overall system specifications; that is to say, the data sub-regions can get as small as one pixel if the error criteria demand it and the computational overhead is acceptable. The choice of an overdetermined set of basis functions is a convenience and is generally dictated by the fact that reasonable levels of turbulence lead to an ever increasingly difficult task of using a "full independent" set of basis functions and still adequately separating the signal to noise levels for generic atmospheric conditions. This just illustrates the point that normal engineering considerations and refinement drive the system by system choices of what exact basis functions to use, and that the exact choice of basis functions themselves is not a central aspect of the invention. The recent article "Multidimensional digital image representation using generalized Kaiser-Bessel window functions" written by Robert Lewitt, Journal of the Optical Society of America A, vol 7, No. 10 is just one of many published articles which illustrate both the wide range of choices of inherent basis functions which could be utilized, AND, the degree of analysis which can go into choosing a proper set. [Unfortunately, the window functions in the title are not at all the same as the ones used in this paper. This will be discussed later, and has no bearing on the point made here.] Though this article is ostensibly written for a much different image processing problem, it nevertheless is representative of the extent and quality of refinement that can be applied toward the use of basis functions in the service of this invention. In plain English, there is certainly room for refinement.

Continuing with FIG. 13, each exposure is in turn broken down into these data segments, the segments are stepped through, the frequency domain representation of the local window function—as determined by the processing of the wide field wavefront sensor data—is multiplied by the frequency domain representation of the data in the segment, and the result is accumulated into three image estimate data planes: the real numerator, the imaginary numerator, and the magnitude denominator. [FIG. 1 treats the complex numerator as one entity.] FIGS. 11 and 11A concisely describe the rationale behind these data planes, showing them to be complex components of a typical weighted averaging process. The more detailed discussion surrounding FIGS. 11 and 11A will show that the adverse theoretical and practical effects of null components, which are quite well known in the art of image restoration, is entirely removed at this point due to the cancellation of potential divisions by zero by an equal multiplication of that zero in the service of the weighted average. In brute force deconvolution terms, the acquired signal component would require a division by the magnitude of the transforming component (which could easily be a zero, see step 2 FIG. 11A). Whereas the weighted average operation requires a weighting entity which is proportional to the square of the signal to noise ratio, which nicely works out to be approximately the square of the magnitude of the transforming component as well in a typical white noise, uniform statistics imaging systems. The remainder of FIG. 11A merely outlines how to square the magnitude of the division in order to exactly cancel the squared magnitude of the multiplication. It is also important to note that this same result can happen with other basis functions where a division by an attenuated component (basis function) can be precisely offset by the signal to noise metric of that very same in the service of the weighted average: it is not unique to fourier formulations of the problem. In many ways, this whole weighted average process is a very fortuitous relationship, in that the very randomness of the atmosphere and the concomitant roaming of nulls in the localized UV plane insures that all local UV plane points eventually get a healthy batch of reasonable signal to noise levels which can readily translate into a weighted average. [Whereas static systems can have nulls stuck at the same place no matter how ninny data realizations are made].

Finishing up with FIG. 13 and FIG. 1, then, all exposures are processed in this manner, an overall image estimate is represented as the accumulated real and imaginary numerators and magnitude denominators, each segment is then stepped through where the division of the complex numerators by the single denominator takes place to give a local UV plane estimate, then this estimate is either directly added to the accumulating final image UV plane estimate, or alternatively, is fourier transformed into the spatial domain and added into the accumulating final object estimate in that domain. After all segments are cycled through, the result is a clear image 5, FIG. 1 with a Strehl ratio approaching 1.0 and a signal to noise ratio determined by a wide range of variables including all the aforementioned design issues. The overall Strehl ratio performance is also a function of which design trade-offs are chosen and what the prevailing seeing conditions are.

Now that the general description of an illustrative system is completed, it will be more readily apparent how and why the sub-components function as they do. These items will now be described in detail.

THE CAMERA SYSTEM 2, FIG. 1

Figure 4:
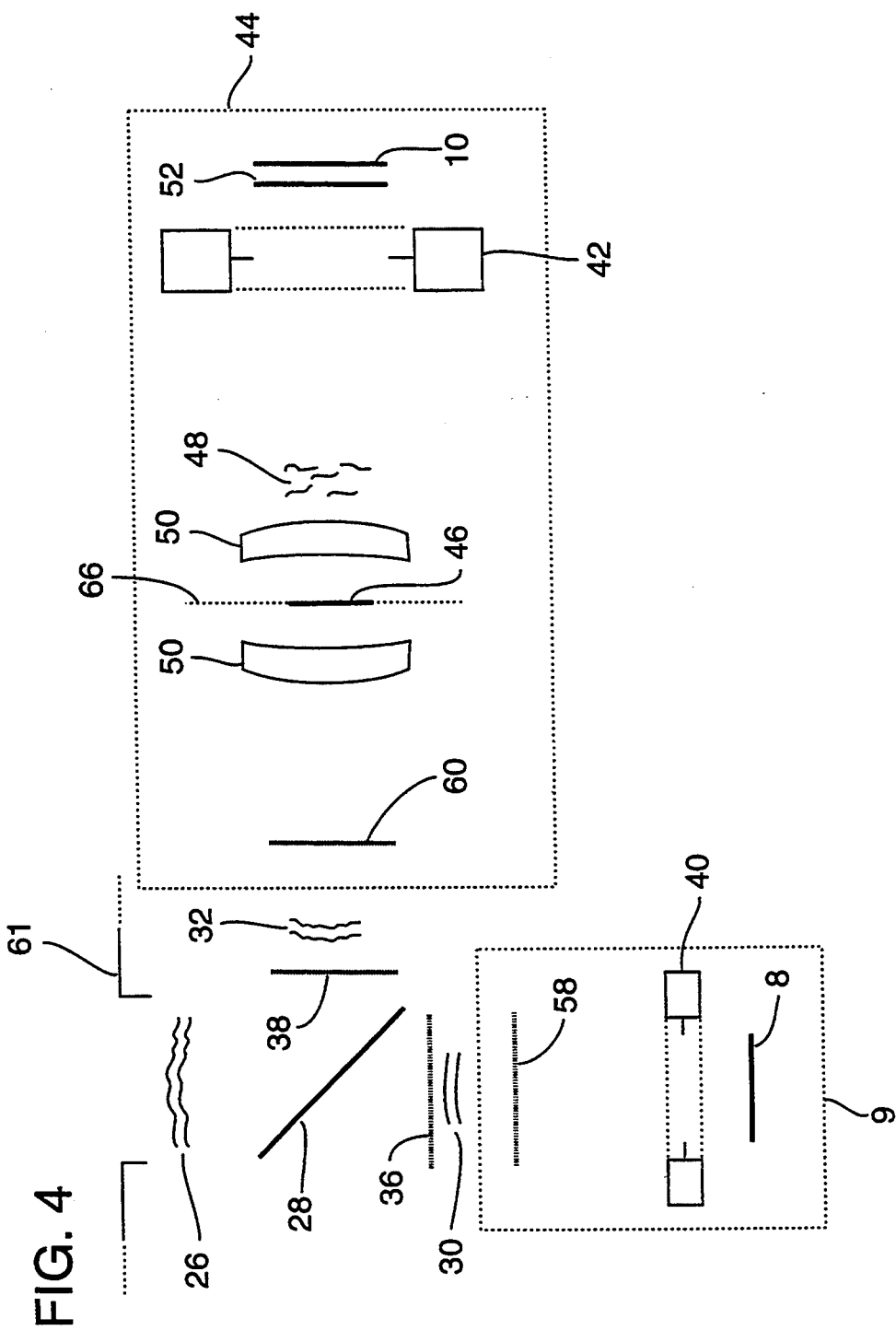
FIG. 4 is a detailed schematic of camera system embodiment using a simple wide field Hartmann camera embodiment.

FIG. 4 depicts a more detailed optical layout of the camera system 2. The primary panchromatic light wave emanating from the telescope optics 26 first encounters an (interchangeable) dichroic, 28, whose normal is tilted at a 45 degree angle relative to the paraxial ray. The dichroic is designed such that the close neighborhood of incidence angles about 45 degrees will transmit light waves within a narrow band of wavelengths (typically 10 nanometers to 50 nanometers) toward the primary camera 9, while the complement of this narrow band (broader band light with the primary narrow band generally excluded) is reflected along the perpendicular beam which is directed toward the wide field wavefront camera 11. It is optional to put secondary filtering elements, 36 & 38, in the path of either or both of the two new light beams, giving rise to the properly spectrally-shaped light beams 30 and 32, if the characteristic spectral curves of the dichroic alone is deemed sub-optimal for any reasons. Requiring one 45 degree dichroic to filter both beams to the desired spectral shape might be too much to ask, thus requiring further spectral filtering of the individual beams. As an engineering point, the primary light beam 30 should be a narrow enough passband such that the image data resulting from the primary camera 9 maintains reasonable signal levels at the higher spatial frequencies for a given level of ambient turbulence; while the spectral passband characteristics of the wavefront light beam 32 going into the wavefront camera depends ultimately on the kind of wavefront sensing camera used, and in the case of a wide field Hartmann type used in the preferred embodiment of this disclosure, the spectral passband is tied to overall system performance specifications and residual error criteria in the wavefront reconstruction processing. But in general, the spectral shape of the wavefront light beam 32 is a function of the correlation between the phase distortion at these wavelengths to the wavelengths utilized by the primary narrow band camera 9. This is considered ordinary engineering practice even in prior art systems, i.e. the determination of precise spectral characteristics of the lightwaves sent to a Hartmann sensor. It will also be further discussed in later sections.

The primary camera light beam 30 converges toward the primary electronic focal plane array 8 as in any ordinary imaging system. Before reaching the primary detector, the primary light beam 30 may optionally encounter magnification optics 58 which is often used to match plate scales to economical designs of the primary detector 8, such as pixel size and/or extent. A shuttering device 40 is placed in front of the primary electronic array 8. This shuttering device is synchronized (opens and closes precisely coordinated with) the shuttering device on the wide field wavefront sensor 42. Both shuttering devices are optimized for variable short exposure times, capable of operation over a very large amount of shutter cycles (10's or 100's of thousands of cycles or more). A mechanical shutter remains as a viable choice for these two devices, but certainly anything else can be used, such as electro-optic shutters or detector array electronic shuttering. The primary electronic array 8 should also be grossly interchangeable if either a very wide range of VIS/IR imaging is contemplated, or optimized quantum efficiency focal plane arrays are matched to narrower bands of the spectrum—e.g., a new focal plane array every 250 nm with its QE appropriately optimized. The primary electronic array 8 integrates the incoming lightwaves as any typical electronic camera, converting light intensity patterns at its surface into closely corresponding electrical signal patterns (capacitively coupled electrons typically). The description of the data acquisition electronics and the camera controlling hardware will explain how these electronic signals are converted into a stored digital image.

Figure 4A:
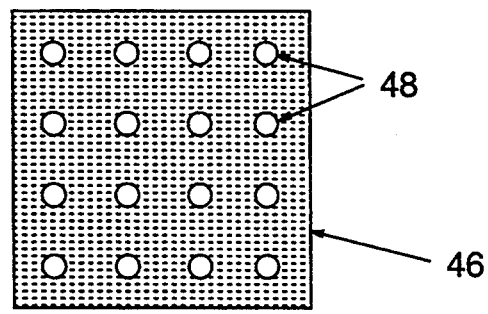
FIG. 4A is a close-up of a typical array of sub-apertures placed at the prime focal plane of the FIG. 4 embodiment.
Figure 4B:
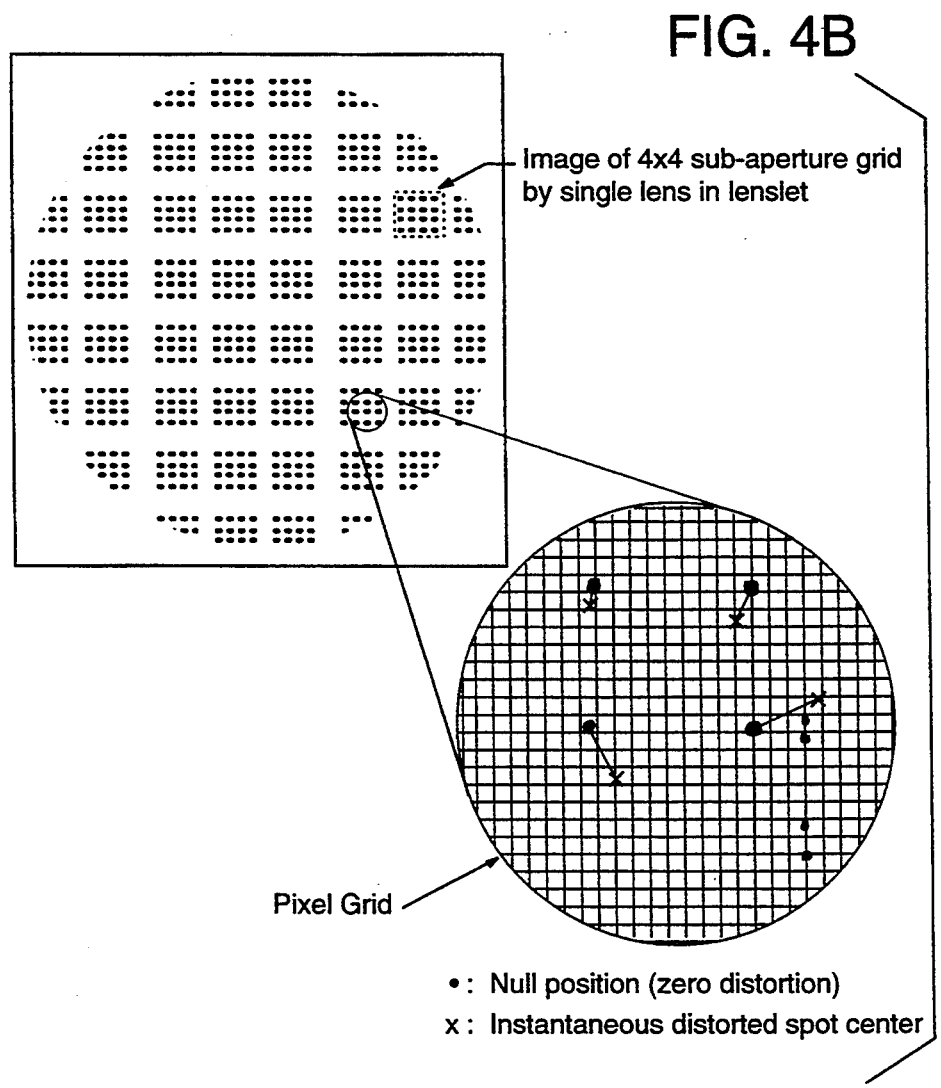
FIG. 4B is a schematic representation of spot images as they might appear on the Hartmann detector in the FIG. 4 embodiment, with a further blow-up to a depiction of the centroids of those spots during typical turbulent conditions.

The preferred embodiment of the wide field wavefront camera is what can be called a "basic wide field Hartmann camera" 44. It is enumerated differently here (not "11" as in FIG. 1) to denote a particular design, the Hartmann based design with the simplest field modulating configuration, in the generic class of wide field wavefront cameras that could actually or conceivably measure the pupil function 34, FIG. 2 as a function of field angle, be these "other types" previously invented or otherwise. In this "simplest configuration" design, the one which will suffice for bright extended objects such as planets, the wavefront beam 32—optionally spectrally filtered by filter 38 as mentioned—then converges toward a nominal prime focal plane 66 at which an array of sub-apertures 46 is placed. Before reaching the nominal prime focal plane, however, it is again optional to place magnification optics 60 in the path of beam in order to increase or decrease the effective plate scale at the nominal prime focal plane 66 (as is common in most instruments which attach to generic large telescopes). These optics 60 can be reflective, refractive, or some combination of both. They generally allow for matching later optical scales to convenient and economical construction of other elements in the wavefront camera as a whole. FIG. 4A then depicts a head on view of a typical arrangement of the array of sub-apertures 46. The sub-apertures themselves 48, which in this example are 3 arc second diameter circles with a square array spacing of 12 arc seconds, giving a total of a 4 by 4 square array of these sub-apertures. The spacings, the sub-aperture patterns, and even the opacity (which in FIG. 4A is binary in that it either completely transmits or completely absorbs), are all variables which can be optimized for particular telescopes, on particular nights (seeing conditions), imaging in particular spectral bands, and utilizing particular data processing methodologies. It is recommended that the spacings chosen in FIG. 4A are not used uncritically, and the later description on the "full field" embodiment of the invention will go into much more detail on determining preferred design specifications. The arrangement depicted in FIG. 4A is generally adequate for seeing conditions which practitioners refer to as an $r_0$ of 20 cm or better, and marginally adequate as seeing conditions worsen. A large part of the reason for creating advanced designs of the wide field Hartmann camera is to address much worse seeing conditions. The description of the processing methodology which reduces the Hartmann data will better explain that there is no absolute cut-off point on choosing these variables for given seeing conditions, and that it is merely a matter of a increasing error and noise performance as the seeing conditions worsen beyond the designed optimum. A "field angle modulated" light beam 48 emerges from the sub-aperture array 46. The sub-aperture array itself is surrounded by a (generally multi-element) field lens 50 which forms an image of the telescope pupil plane 34 onto a plane at which a lenslet array 52 is placed. The field lens 50 is drawn as a double element refractive type only symbolically. It is well known in optical engineering that beth reflective, refractive, and multi-element solutions to this field lens can be utilized. [Conceivably, this could be a single element of etched reflective circles deposited on an off axis paraboloid surface having a background absorbing material; etc. Also, there appears to at least be the option of using no field lens whatsoever if for some reason that might be preferable. It could save on reflective light losses, but the consequent slight blurring of the pupil image may ruin wavefront reconstruction accuracies. This choice is essentially using the sub-apertures 48 as pinhole cameras. It is an option, anyhow.] The lenslet array 52 sits at what is commonly referred to as the pupil image plane, i.e. the focal plane corresponding to the effective pupil plane 34 as imaged by the field lens 50. The lenslet array 52 is typical of the kind which are readily available commercially. It may be noted that the arrangement of this lenslet array USUALLY SHOULD BE SQUARE rather than hexagonal or anything else. This is because each lens in the lenslet array is imaging a 4 by 4 array of sub-apertures 46, and the square packing of the lenslets would nicely fit the square pattern of "spot images" resulting on the wavefront detector array 10 (see FIG. 4B). Since this is a wide field device which is imaging, in this example, a 4 by 4 array of sub-apertures 46, the designed position of the lenslet array relative to the field lens 50 (i.e. the field lens focal length), the aperture size of each and every lens in the lenslet array, and the f number of each and every lens in the lenslet array must be chosen such that each lens in the lenslet forms a non-overlapping image of the 4 by 4 sub-aperture array 46 [overlapping images of the 4 by 4 sub-aperture array 46 are possible, but are not part of the preferred embodiment]. Each lens in the lenslet array 52, where typically there are hundreds of lenses if not thousands, forms its own unique image of the sub-aperture array 46 onto the wavefront detector array 10. It can be readily seen that this will amount to thousands of spots being imaged onto the array 10. Each individual spot is, by design, "nominally allocated" an area on the detector array 10 anywhere from a 2 by 2 up to a 10 by 10 array of "pixels," enough so that in-operation spot wander and normal spot spread are adequately accounted for. Advanced engineering, where an intricate relationship between the physical design and the processing methodology is utilized in order to attain low residual wavefront error performance, will show that this idea of "pixel allocation" to each spot is somewhat oversimplified but is nevertheless quite helpful in the early design of full systems. FIG. 4B depicts a simplified view of the multitude of spot images 54 as overlaid on the border outline of the wavefront detector array 10. FIG. 4B then zooms in on a small neighborhood of spots where the in-operation wandering centers of gravity, relative to the nominal distortionless centers of gravity (i.e., the "null positions"), are depicted as x's and points, respectively, on a pixel grid. [This is all well known is the art, with the twist that these spots are actually grouped into individual images of the 4 by 4 sub-aperture array 46.] The large circular pattern of spots depicted in the upper left of FIG. 4B is a simplified idealization. In actuality, these spots are noise prone photon counts in an array of pixels with inevitable cross talk between spots. Assuming a field lens 50 is used, the spots would not have such an abrupt circular edge but would instead "dim" together as square units for the 4 by 4 sub-images near the edge. There would be an inner circle of no spot images also, if the primary/secondary mirror configuration of FIG. 2 is used. Finally, the 4 by 4 sub-images created by the individual lenses in the lenslet array 52 have an exaggeratedly sparse packing density in order to graphically demonstrate their presence. Actual designs would pack these sub-groups much closer together to the point where the individual 4 by 4 images become virtually indistinguishable and it becomes one large array of spots. It is an issue of refined design (which will be further discussed in the processing descriptions) to determine at what separation the spots must be to achieve a cross talk level which the overall system specification can tolerate.

Referring back to FIG. 4, the shuttering device 42, previously mentioned, could conceivably be placed anywhere in the Hartmann optical train and in this example is placed in front of the lenslet array 52. Its chief function is to ensure that the collected optical wavefront data corresponds exactly in time to the primary camera data. Once again, the wavefront detector array 10 converts the resultant intensity pattern of spots into a closely corresponding pattern of electronic signals which the data acquisition hardware will convert into a digital image.

Figure 5:
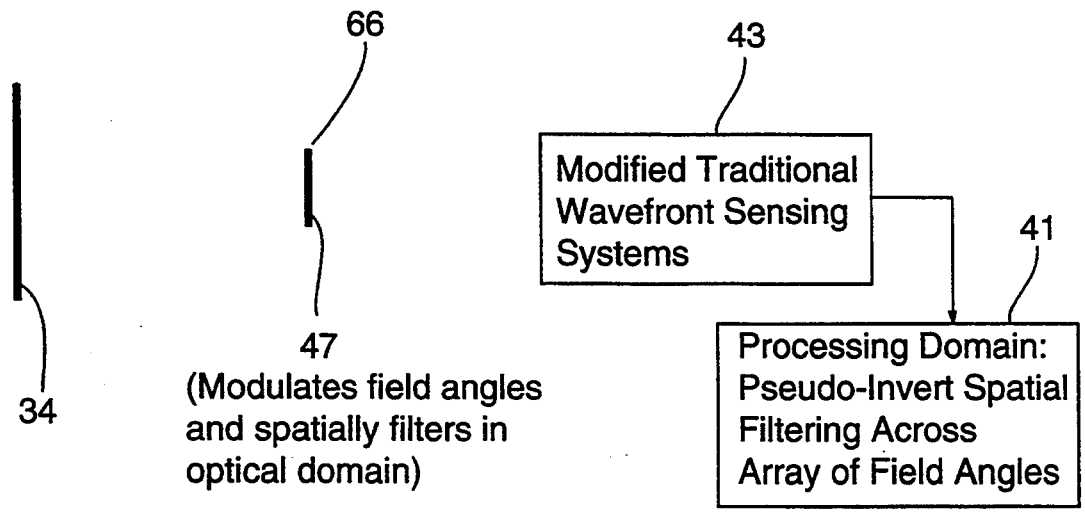
FIG. 5 is a schematic functional drawing of a wide field wavefront sensing system according to one embodiment of the invention.

Now that a simple but slightly limited form of a wide field wavefront sensing system has been described in the context of FIGS. 4, 4A, and 4B, it will easier to explain the more fundamental aspects of a wide field wavefront sensing system. FIG. 5 discloses the two key elements of the wavefront sensing system of this invention which distinguish it from its paraxial (or mono-axial) prior art parents. In FIG. 5, it can be seen that a field angle modulation unit 47—where in FIG. 4 it wound up being the field lens 50/sub-aperture array 46 combined unit—is placed (centered about) the nominal prime focal plane 66 of the overall telescopic system. This unit 47 (or system, as in the case of the preferred embodiment of this invention), explicitly modulates the optical field existing at or near the prime focal plane 66 in a manner that will allow later "traditional" wavefront sensing methodologies to distinguish between field angles of the incoming optical light waves. Moreover, the field angle modulation unit 47 explicitly spatially filters, in the optical domain, the incoming wavefront light beam 32. This explicit spatial filtering is best recognized in classic fourier optical terms, being the transform plane between the conjugated planes of the pupil plane 34 and the pupil image plane at which the lenslet array 52 is placed in FIG. 4. The second central element to this invention is the addition of a processing domain stage 41 which explicitly recognizes the spatial filtering which is impressed on the optical wavefront by the unit 47, and applies a pseudo inversion of the filtering in order to better estimate the actual wavefront function existing at the pupil plane 34. It is possible to exclude this processing step 41 at the expense of higher residual wavefront error. The section on processing methodology will have a great deal more to say about box 41. Ancillary to these two central elements 47 and 41, reference is made to "modified" traditional wavefront sensing systems 43, since the fact that the field angles are modulated and spatially filtered can lead to specific engineering design changes made to otherwise "traditional" prior art systems. In the case of FIG. 4 and the simple configuration, this modification was made to the traditional Hartmann sensing prior art, where it was necessary to explicitly design around the fact that it was actually 4 by 4 sub-arrays of spots which were being imaged. This "modification" becomes more pronounced in the preferred embodiment of the wide field wavefront camera presented in FIG. 7. FIG. 5 therefore is a basic blueprint from which a wide variety of engineering configurations can derive. Principal variables include: field angle modulation methods, spatial filtering methods, beam splitting methods in the preferable systems which attempt to create "lossless" measurements (see FIG. 7), the actual type of prior art wavefront sensing methods used, and finally the type of processing inversions which can be applied. The preferred embodiment of this invention has made quite specific choices regarding these many variables, choices which attempt to balance a wide range of current economic considerations with performance considerations. As with all engineering realizations of a given type of invention, it should be expected that any given design will have driven by its own unique set of performance and economic factors. We therefore turn once again to the basic Hartmann sensor philosophy of wavefront sensing systems for yet improved types of wide field wavefront systems, recognizing that there are quite viable alternatives that could derive from the core invention depicted in FIG. 5.

A fundamental variant to the simple wide field Hartmann design of FIG. 4 is what can be referred to as the beam splitting wide field Hartmann camera. It is entirely probable that of the two specific beam splitting designs about to be described, the second or "full field" design will be the most commonly utilized in physical systems: even though it is the most complicated and expensive, its performance gain will usually be worth it. Therefore, of these, the full field design is presently preferred, while the "simple" design presented in FIG. 4 and the "2X" design about to be presented will be viable alternatives to the full field design. (A third implementation is described at the end of this specification.) [The 2X design in particular may some day get very close to the full field ideal, especially when yet further refinements are made to "descrambling" the information gathered by the wavefront detector 10. More on this in the section describing the processing methodology.] The simple configuration listed in FIG. 4 was described both as a modestly functional option, and, as an easy introduction to the principles involved. The primary considerations for considering the beam splitting designs are: a) sensitivity, b) spatial filtering, c) guaranteed field coverage of bright (beacon) objects, and d) field angle sample spacing. The essential idea of the beam splitting variant designs is to multiplex the field angles out along separate beams so that either the field angle sampling aperture diameter can widen, or the field angle sample spacing can decrease, or some traded off combination of both. An accompanying principle is to gather as many "signal photons" as possible. The widening of the sub-aperture diameter effectively increases the signal photons available, reduces the spatial filtering of the re-imaged pupil function at the lenslet plane 52, and helps alleviate potential difficulties involved with bright stars (beacons) "falling between the cracks," i.e. falling outside the sampling window of a given field angle. The ability to decrease the field angle sample spacing translates into the ability of the device and of the overall system to function at increasingly worse turbulence conditions (lower $r_0$'s). This latter ability is arguably the largest value of these beam splitting variant designs.

Figure 6:
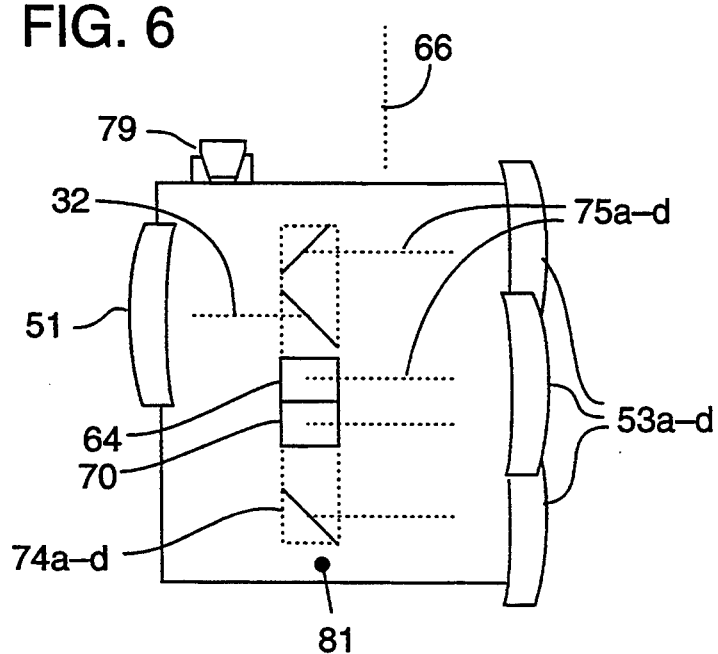
FIG. 6 is a schematic representation of a field angle multiplexing beam splitter.

The critical new element of a "2X" device, in relation to the simple configuration of FIG. 4, is depicted in FIG. 6 where a new optical device referred to as a field angle multiplexing beam splitter 56 replaces the combined unit of the field lens 50 and the sub-aperture array 46 depicted in FIG. 4. In effect, this new device 56 is the generic field angle modulation unit 47, FIG. 5. The positioning of this new device 56 is referenced by the relative position of the nominal prime focal plane 66, whereas detailed design should reference the nominal prime focal planes drawn in FIG. 6A, discussed later. The 2X of its title refers to the fact that it can halve the sampled field angle spacing for a given sub-aperture diameter, relative to the simplest configuration of FIG. 4. The beam splitting device 56 in FIG. 6 has, as a central element, a carefully arranged series of 45 degree angled full mirrors 74a–d and checkered mirrors 64 & 70 which, rigidly held together by a mechanical holding framework and collectively called the mirror sub-unit 81, produce four outgoing beams each with a virtual 4 by 4 sub-aperture array variously offset from each other, i.e. spatially multiplexed, giving a total of 64 sampled field angles. This arrangement as presented here allows for the same sized sub-aperture diameter to be used as in FIG. 4, i.e., a 3 arc second diameter circle, but now placed on 6 arc second spacings. This keeps the effective sensitivity and the effective spatial filtering effects of each field angle sample essentially the same, except now there are a few more reflective surfaces which will contribute to light loss. If need be, the apertures could grow to, say, 5 arc seconds in diameter and the field spacing to 10 arc seconds. Judging from typical anisoplanatism measurements and calculations, a 6 arc second field angle spacing could perform a reasonable field angle sampling down to $r_0=10$ cm or perhaps lower, while the 10 arc second spacing would be adequate for proportionately lower turbulence levels. If the device of FIG. 6 is precisely substituted for the field lens 50/sub-aperture array 46 of FIG. 4, then the resulting four light beams 75a-d emerging from the device likewise fall onto the lenslet array 52, with the remainder of the system being as previously described. Though FIGS. 6A-C will describe the mirror configuration in more detail, FIG. 6 points out that there is a single "half" 51 of the field lens functional system for the incoming wavefront light beam 32, while there are four separate lens systems 53a-d for the outgoing four light beams 75a-d. Again, the drawing uses single lenses as symbolic of the field lens function, while common optical principles should be applied to the detailed design of the overall field lens function, including chromatic aberration control as is common; furthermore, reflective elements are certainly feasible solutions as well. [In FIG. 6, only three of the four outgoing lenses 53a-d are drawn for simplicity, there other one being hidden]. A final note on the field angle multiplexing beam splitter 56 is depicted in FIG. 6 by the plug 79 and the encasement around the entire device. This represents that the entire device is sealed and filled with index matching fluid, matched to the (spectral mean) index of refraction of the glass flats that are used as bases for the checkered mirrors 64 and 70 (again, FIGS. 6A-C will go into more detail on these). The inner lens pieces of the field lens systems will also have, in general, more closely related indices to the fluid than they would to air. The reason for the index matching fluid is rather obvious: reduce unnecessary photon loss. The function of the beam splitting mirrors is purely reflective, and thus reflective losses must be tolerated. Refractive losses on the other hand are completely a side effect of the need for a refractive substratum, and the index matching fluid essentially removes this side effect. The beauty of the use of the index matching fluid is that it all but offsets the overall photon loss that the beam splitter 56 would have otherwise introduced relative to the simple configuration. Removing the field lens airglass glass-air inner surface reflective loss of the simple configuration is a partial compensation for the 2 to 4 reflective surface losses experienced by each of the four beams (one beam has two reflective surfaces, two have three reflective surfaces, and one has four reflective surfaces).

Obviously there is much more to say about the mirror sub-unit 81 and its function. FIG. 6A therefore has a top view of the detailed arrangement of the preferred embodiment of the mirrored surfaces, i.e., it is seen from the perspective of the incoming wavefront beam 32, whose central ray is depicted as the x on the first redirection mirror 62. There are certainly alternative ways to arrange full mirrors and checkered mirrors in order to split the incoming beam into four new beams, including the use of four detector arrays for each of the four beams, but the preferred embodiment attempts to make efficient use of a single detector array 10. For some applications on very large telescopes, however, there may be no choice but to use multiple detectors merely because there might not be any detector available with enough pixels to image all the resulting spots. The surfaces of both the redirecting full mirrors 62 and 74a-d are typically aluminum (if using visible wavelength light) deposited or etched onto a thin precision glass flat using generally available commercial processes. The optional magnification/demagnification lens 60, FIG. 4, can potentially create an image size of the 8 by 8 array of field angles which is optimized for ease of manufacturing the glass pieces, depositing patterned reflective surfaces upon them, cutting them into the proper shapes, and finally placing them in precision relative positions via an appropriate mechanical housing which stays clear of the light paths. For the purposes of exposition, we can imagine that manufacturing considerations of this sub-unit 81, FIG. 6, leads us to specify a virtual image size of 1 square centimeter for the 8 by 8 array of field angles (i.e. $8 \times 6''$ per angle giving 48" square steradian over 10 mm by 10 mm); the telescope optics (f number) and the size of the wide field wavefront electronic sensor 10, among other things, play a large role in best determining the virtual image size at this stage as well. Referring again to FIG. 6A, the incoming light beam 32 is symbolized by an x in the center of the first redirection mirror 62, directed from above the plane of the drawing toward the plane of the drawing, then reflecting off the first fully mirrored surface 62 which is a front aluminized flat with its normal directed at 45 degrees to the plane of the drawing. Its mirrored surface is on the side of the flat which is closest to the viewer, i.e. above the plane of the drawing (drawn as clear). The light wave 32 is directed by the mirror 62 downward in the plane of the drawing, depicted by an arrow emanating from the x toward the checkered mirror 64. It then encounters this first checker patterned mirrored surface 64, depicted in front view in FIG. 6B, left drawing. This surface is an 8 by 8 checker pattern with one dimension being the square root of two longer than the other, giving a projected square pattern when seen from a 45 degree angle. The darker regions are a thin layer of aluminum (or other chosen reflective material) which will reflect most of the incident light while the white regions are clear glass, allowing full transmission of the light. Referring back to FIG. 6A, this mirror unit is placed at a 45 degree angle immediately preceding the nominal focal plane 66, depicted in that figure as two separate nominal focal planes 66a&b due to the selective splitting of the checkered mirror 64. It can be readily seen that the alternating reflecting regions and transmissive regions will be increasingly displaced from the nominal focal plane as they extend outward, i.e., the unit 64 is by necessity skewed and increasingly out of focus. In general, this displacement will take place within the usual and somewhat arbitrary "depth of field" about the nominal focal plane 66. More precisely, however, the overall system effects of this displacement is a rounding of the sampling window on the distortion of a given field angle. As will be better explained in the description of the processing methodology, the adverse effects of this asymmetric blurring is virtually negligible. This can become more obvious if one imagines that we replace the simple checker patterns of FIG. 6B with aluminum "densities" which are sinusoidal in nature, giving rise to a spatially variable beam splitting rather than the "hard edged" one employed in the preferred embodiment. This option will indeed be explored in the course of normal engineering refinement and is at the root of why the device 47 in FIG. 5 is termed a "modulation" device as opposed to, say, a "splitting" device; modulating the light waves at the nominal focal plane is just as acceptable as "separating them"; the advantage of the approach of the preferred embodiment is that many techniques can now be borrowed from prior art Hartmann systems. In this case, there is no need whatsoever for "edges" and the displacement about the nominal focal 66 is of less significance still (see FIG. 26B also). Besides, it is highly recommended—though not absolutely necessary—to place two field stops 73a&b at the two respective nominal focal planes 66a&b; (in very low turbulence situations it might be possible to remove these, see processing methodology section). These field stops 73a&b, where one is depicted in FIG. 6C while the other is just this same design only flipped about the horizontal axis, create a well known spatial lightwave filtering which will later be used by the processing methodology and data reduction. It also helps keep spot crosstalk under control. Two light beams 68a&b (drawn as two arrows crossing through the nominal focal planes 66a&b) now emerge from the first checkered mirror 64, one impinging on the left half of the double checkered mirror 70, and the other impinging on the fight half (left and right referenced by FIG. 6B). FIG. 6B also has a front view drawing of this double checkered mirror 70. It can be seen in FIG. 6A that the two beams 68a&b are further split apart into 4 light beams enumerated collectively as 72a–d. A detailed look at the patterns will exhibit that they are offset from each other such that, for each contiguous 2 by 2 array of field angles which entered the system, it is now broken out so that each of the four incoming field angle travels into only one of the four outgoing beams 72a–d. Thus, the field angles have been spatially separated and then multiplexed. Overall, it can be seen that the new beams 72a–d consist of a four by four array of field angles with twice the field angle spacings as would be the case in the simple configuration of FIG. 4 (we could have widened the aperture diameters, 73a&b, as traded off by field angle spacing). It can be seen that the checkered mirror 64 is butted up against the center of the "double checkered" mirror 70 at a normal to its surface. The new beams 72a–d each encounter a 45 degree angled fully mirrored surfaces, called the 4 outgoing redirection mirrors 74a–d, with their mirrored surfaces on the other side of the viewer, thus directing the new beams down into the plane of the paper, back into the original direction of the incoming beam 32. Finally, as an intuitive aid in how and why such a device as this functions properly, there are large dashed circles 76a–d which depict the image of the telescope pupil function as projected by these redirecting mirrors 74a–d onto the plane of the lenslet array 52 in FIG. 4 (i.e., as if the plane of the lenslet array is some distance into the plane of the paper). The lateral distance of the mirrors 74a–d from the central assembly is such that these circles almost touch (to within engineering tolerances); the circles on the upper left/lower fight axis in FIG. 6A are further offset due to the first beam splitting. Good engineering practice would minimize this offset by keeping the plate scale at the nominal focal plane as small (least magnified) as is reasonable from a tolerance and manufacturability standpoint. It can be seen that a square electronic focal plane array 10 used behind the lenslet array 52 should be tilted at a 45 degree angle relative to the axis of the incoming 8 by 8 array of field angles in the light beam 32, in order to efficiently contain the multitude of spot images which will roughly correspond to the pattern of the large circles 76a–d. A few final engineering notes are in order. First, all of the mirrors 62, 64, 70, and 74(A–D) are held in place by a precision optical mounting structure (part of the sub-unit 81, FIG. 6A) which would need to steer clear of the light beams and their widening breadth as they get farther from the nominal focal plane 66. No completely reliable rule of thumb exists which specifies how precise, in terms of optical wavelength tolerance, these surfaces need to be, nor their relative alignments and relative tilts. It is fair to say, however, that the flats upon which the mirror surfaces are deposited will need to be of high precision optical grades which will not add their own distortions beyond the overall system specification for the wavefront sensor. The tilt tolerances appear to be less critical, in general, but this statement is rather arbitrary itself. The point is that this is an area for precision optical engineering, informed by the informational needs of the processing methodology and the overall system error budget. One true subtlety which may or may not be necessary to address relative to overall system design would be to place a trapezoidal "fanning out" of the dimensions of the checkered mirrors on 64 and 70 in order to precisely track the slight divergence of the incoming light beam (according to the F number of the incoming beam 32); for higher f number systems this may not be such a bad idea; in that case, the checker pattern would appear to be a trapezoid on its side in FIG. 6B. As another engineering subtlety, the spacing between the checkered surface on unit 64 and the left half checkered surface on unit 70 needs to be far enough so that the beam 72B does not clip the redirecting mirror 62. This is a particular instance of the general need to keep the mechanical surfaces out of the way of all the light beams. Finally, the slight bulge drawn in FIG. 6A on the checkered mirrors 64 and 70 are an exaggerated thickness of the underlying metallic reflecting material. In fact, this is the recommended side, though once the consideration of index matching fluid is introduced, the choice of which side of the glass flats should have the reflective material becomes a design option.

The next and most comprehensive variant on the nominal design of the wide field Hartmann camera depicted in FIG. 4 is what will be referred to as the "4X" wide field Hartmann camera, or better, as the full coverage wide field Hartmann camera, depicted in FIG. 7. The guiding principle behind this device is that no photons are lost one to other than by simple reflection or refraction. The two previous configurations are both forced to truncate (occlude) the field of view along the central axis of each field angle in order to maintain proper segregation of the spots on the electronic detector array 10. The full coverage configuration in FIG. 7 will be shown to multiplex the incoming beam 32 into a 4 by 4 array of variously offset new beams—16 new beams in total falling on the lenslet array 52. As will be seen, this is a sufficient segregation to allow for the sub-aperture breadths of each field angle sampling window to grow to the size of the field angle spacing itself, thereby allowing for a full coverage of the field of view (no bright stars will fall between the cracks; they may fall "on a crack," i.e. a somewhat sharp transition zone, but not between the cracks). More importantly, it will allow for the maximum sample spacing density of the field angles (relative to spot overlap and crosstalk limiting specifications).

Referring now to FIG. 7, the full coverage configuration is identical to the 2X configuration described previously, up through the 2X beam multiplexer 56, except that the sub-aperture field stops 73a&b FIG. C will not be placed at the nominal prime focal planes 66a&b. The Hartmann beam 32 passes through the optional magnification stage 60 (demagnification being an implied possibility as well). It enters and exits the beam multiplexer 56 just as described above. As mentioned, the one definite change to the interior design of the beam multiplexer 56 is the removal of the field stops 73A&B. The full coverage device will also require some adjustment to the lateral distances between the redirection mirrors 74a–d, FIG. 6A, and the central assembly in that same figure. This readjustment in lateral distance has to do with the fact that each of these new beams will again be split into 4 new beams each, giving a total of a 4 by 4 array of new beams 88a–p, and so the nominal axis centers of the outgoing beams 75a–d need to account for this. Getting back to the first stage, the four light beams 75a–d, laterally displaced now, travel from the beam multiplexer 56 to the first pupil image plane 90 where the lenslet array was placed in both the simple configuration and the 2X design. For the full design of FIG. 7, however, this first pupil image plane 90 has four new field lenses 92a–d aligned with the four beams 75a–d. These new field lenses can again be refractive or reflective as a designer may choose, where here they are depicted as refractive. These lenses are drawn crudely in isometric view in order to simplify their depiction and should be seen as centered about the same plane 90. These lenses are also roughly drawn as a symmetric 1 to 1 finite conjugate lens system relative to the first prime focal plane 66 and the second prime focal plane 93, but if there is determined to be a need for a remagnification at this stage due to engineering considerations, it certainly could be incorporated in this lens system 92a–d. Reiterating earlier comments, the design issue of magnifying and/or demagnifying the various optical stages is driven the primary telescope f number, the preferred sizes of the beam splitting mirror and their mechanical mounts (cost of manufacture), and the pixel size/overall size of the focal plane array 10. These, and other normal engineering considerations, are all significant factors in determining where and when to magnify or demagnify the succession of image planes and pupil planes. It should be noted that in consideration of minimizing reflective and scattering photon losses, these magnification stages should be kept to an absolute minimum. The reimaging lens system 92a–d reimages the nominal focal plane 66 onto a new nominal focal plane 98. About this new nominal focal plane 98 is placed an array of four beamsplitting multiplexers, 100a–d, of the same design type as 56, here enumerated as 96 being the entire four unit array. The mechanical positioning and centering of the array 96 corresponds to the position of the outgoing beams 75a–d and the corresponding positions of their images at plane 98. There are only three key differences between the design of one of the second stage beamsplitters 100 and the first stage beam splitter: 1) (optional actually, if one to one mag not chosen by field lenses 92a–d) overall scale; 2) 4 by 4 checkered mirrors rather than 8 by 8, giving rise to a doubling of the dimensions of the individual "checkers" on 64 and 70; and 3) lateral spacing of the four redirecting mirrors are now optimized for packing spots onto the array 10. Significantly, all four beamsplitting multiplexers 100a–d are identical to each other in design and manufacture. Also, none of them contains field stop arrays, 73(A&B). The only true subtlety involved in the nominal alignment of the array 96 with the incoming beams 74a–d is NOT to reference the absolute central axes of the incoming beams, but instead to reference the center of the unique offset grids contained in each beam. [Referring to FIG. 6B, the outgoing images are similar to the mirror patterns on the double checkered mirror 70; the beamsplitters 100a–d should each reference it own uniquely offset grid pattern]. The multiplexers 100a–d also contain index matching fluid, surrounded by a field lensing system which reimages the pupil image plane 90 onto the lenslet plane 52. There is yet another optional mag/demag lensing system (not depicted) possible between the beamsplitters 100a–d and the lenslet 52, just in case the output from the array of beam multiplexers 96 has an optical output incompatible with the physical pixel sizes and extent of the focal plane array 10. It is also conceivable that clever optical design could turn the back element of the field lenses of the beam splitting multiplexers 100(A-D) into a veritable mag/demag stage. This is certainly an issue for normal detailed engineering refinement. The remainder of the full coverage wide field Hartmann design is identical to the nominal design in FIG. 4. It is up to the processing methodology to sort out whose spots belong to whom, i.e. which beams are which and to what nominal field angle do they belong. As a final note to the full coverage design which has already been alluded to earlier, it may be necessary to consider putting an array of focal plane arrays, 4 focal plane arrays in total, one each at the output stages of each of the beamsplitting multiplexers 100a–d. The potential need for this configuration derives from the possibility that there are no acceptably large sized focal plane arrays available which can adequately contain all of the spot information. The possibility even exists of placing an array of 16 focal plane arrays behind each individual beam of the aggregate 16 beams 88a–p. These issues are exclusively in the realm of detailed system design and current technology, but the distinct possibility to create these "arrays of focal plane arrays" exists. As a quick specific example of how a system might come to require such an "array of arrays," we can posit a 10 meter near full aperture telescope designed to work down to seeing conditions commonly known as $r_0 = 7$ cm. System design parameters might likewise dictate the "allocation" of a 5 by 5 pixel array per spot. Finally, there is an average 20% overall engineering tolerance beam separation between the pupil images of the outgoing beams 88a–p as projected onto the lenslet plane 52; this Fig. accounts for several factors. Straightforward engineering calculations show that there needs to be a linear diameter of 160 subaperture lenses across the pupil image (10 m/7 cm), where each lens images a 2 by 2 array of field angles giving a linear breadth of two spots. The total linear pixel breadth per beam, 100(A-P), is therefore $160 \times 2 \times 10$ (pixels/spot) or 3200. Multiply this by 4 linear breadth of beams across our hypothetical single detector, and this gives 12800 pixels, then add 20% for engineering tolerances and this gives a 15360 by 15360 pixel detector needed as the focal plane array 10. This is well outside the reach of current state of the art focal plane arrays. However, a 4 by 4 array of 4K by 4K focal plane arrays is ostensibly within the reach of current state of the art, if not its pocketbook. [It should be noted that this is an extremely rough engineering example here described only in order to fully illustrate the possible need for multiple detectors. Even the orders of magnitude involved could be significantly altered after a thorough system design has been completed; i.e. less engineering tolerance could be allowed through tighter design, or better processing methodology could further reduce the pixels per spot through clever information extraction procedures. Finally, the system could be designed toward a nominal $r_0=10$ cm or more, and make do with a gradually decreasing resolution performance (from near diffraction limited) as the seeing worsens beyond that point. The ONLY point of this example is to see that the idea of using more than one detector is not so hypothetical.]

For the remainder of this disclosure, the full wide field Hartmann design depicted in FIG. 7 will be assumed and utilized as the preferred embodiment, while the simple and 2X configurations will be mentioned as significant alternatives with the same principles involved. This being the case, we turn now to a relatively detailed design of a full wide field Hartmann camera in order to illustrate the application of the design principles outlined above. FIG. 8 has a schematic breakout of the critical specifications for the example telescopic system which will be used throughout the rest of this disclosure. This example design should not at all be considered as an optimized design for a 2.5 meter telescope, it only uses simple numbers and fractional relationships which can best illustrate the principles of design. Those practiced in the art of telescope system design will understand that gross system specifications such as these are only the starting point for detailed engineering refinement. In fact, detailed investigation of these specifications will find that very little engineering tolerance has been included. This was done to further underline the nominal relationships of the basic designs parameters. Also included in the example system design is a few significant specific variations on the "symbolic" outline of FIG. 4 with FIG. 7's full design substituted. These variations illustrate the points made earlier on how specific design scenarios (such as a 2.5 m telescope w/20 arc second square field of view—FOV) can give rise to specific optical engineering design realizations. This point is most evident in the realization of the design of the field lenses 51 and 92. In any event, the specifications of FIG. 8 contain a sufficient set of information to illustrate the important aspects of this invention. I turn now to discussing these specifications in detail.

FIG. 8 is best described by starting with the specification of the primary wavelength $\lambda = 500$ nm. Those practiced in the art will recognize that this is in actuality a specification of the central wavelength of the narrow spectral band light beam which will fall upon the primary detector 8. Details of the spectral characteristics are not pertinent to this discussion and are contained in several other places in the disclosure. It should be understood, however, that typical physical realizations of imaging systems according to the invention will have a series of selectable bands at which the system will operate, including the choices of "wide and narrow" bands centered about the same wavelengths. The changing of these bands may likewise change other components of the system, even the primary detector 8 (as was previously pointed out). The aperture shape and size of the example telescope will be a circular aperture with an outside diameter of 2.5 meters. For this discussion, it is immaterial whether this is annular as in FIG. 1 or a full aperture telescope. The inherent focal length of the primary telescope is chosen to be 25 meters, giving an F/10 primary optical system. The primary beam is split by the dichroic system 28, 36 and 38 as described in the preceding disclosure. Looking first at the primary beam, this example design does in fact choose to use the magnification optics 58, FIG. 4. These optics effectively change the incoming F/10 beam into an F/40 beam which will fill upon a 1024 by 1024 square CCD array, 8. These optics, 58, can be reflective or refractive of course, and they can certainly be optimized for the current band being imaged, interchanged as the primary spectral bands are interchanged. The individual pixel size on the primary CCD 8 is chosen to be 10 microns. With a plate scale of $1''=0.5$ mm, this gives an effective pixel spacing of $0.02''$ at our 500 nm central wavelength, a precise match to the diffraction limit Nyquist spacing. The detector as a whole covers approximately a 20 arc-second by 20 arc-second square field of view; Since the wide field Hartmann camera about to be discussed has targeted seeing conditions of $r_0 = 0.7$ cm, this field of view can be seen to be much larger than the isoplanatic patch size at this level of turbulence. [There is no question whatsoever that wider fields of view could be chosen or larger telescopes. This example was chosen because many of the specifications fall out into nicely understandable forms; and they conform to "obviously commercially available" system design components.]

Turning now to the full wide field Hartmann camera in FIG. 8, it has been chosen that no magnification optics are used and the system directly uses the F/10 of the primary telescope. This gives a plate scale at the first primary focal plane 66 of $1''=0.125$ mm. Working now from the overall specifications listed below, we find that an 8 by 8 array of field angles will be sampled with a $3.6''$ square spacing between the field angles. This gives a nominal field of view of $28.8''$ by $28.8''$ for the WF Hartmann camera, more than enough for the $0.20''$ square FOV of the primary detector. This "gross" overfill will shrink appreciably as longer wavelengths than 500 nm are imaged in the primary beam, i.e. 750 nm imaging will be nice and snug with this field of view. Though not explicitly listed in FIG. 8, the $3.6''$ spacing plus the plate scale will give a dimension of 0.45 mm by 0.64 mm on the individual reflective rectangles on the single checkered mirror 64 and the double checkered mirror 70, FIG. 6B. Because a one to one finite conjugate field lens 92 will be used, the dimensions of these reflective squares will be generally twice as large on the second stage checkered mirror pieces (these second stage beamsplitters are essentially "splitting" a 4 by 4 array of incoming field angles, thus needing a 4 by 4 array rather than an 8 by 8). These items are not listed on FIG. 8 because they are generally derivable entities based on the figures presented in FIG. 8. Turning now to a closer look at the first focal plane 66 and the first stage beamsplitter which will be placed there, a single well corrected field lens 51 will be placed immediately preceding the first redirection mirror 62 of FIG. 6A. Its focal length will be chosen to be 500 mm (or whatever "subtle design variation" conjugates the telescope pupil 34 with the first pupil plane 90). Referring now to FIG.

6, the field lens system 51 is chosen in the example system to only have a first half 51, and to place an optical flat at the back halves, 53a–d. This is chosen for many reasons, not least of which to illustrate the "normal" variations which can be made to the "symbolic" design options presented in the preceding disclosure. Another advantage to this design is that only one well corrected lens need be designed and built, not five built. It also should ease optical tolerance. The first field lens (and beamsplitter, 56) then projects a pupil image onto the first pupil plane 90, at which plane a single field lens 92 is placed whose focal length in 250 mm (nominal) and whose clear aperture is a minimum of 100 mm (F number $<=2.5$). Yet another significant variation on the symbolic design of FIG. 7 is chosen, in other words. Rather than having four individual lenses on each of the new beams, normal optical engineering practice allows the use of one field lens that all four new beams utilize. The only real effect of this is to invert the four new beams relative to the second focal plane 98 (not a problem). Again, cost and simplicity allow and suggest this choice. The field lens 90 then sets up the aforementioned one to one magnification ratio which can so simplify lens designs and mechanical designs. Other choices are quite allowable as usual. The second focal plane 98 therefore has the same plate scale as the first plane 66, $1''=0.0125$ mm. Also, the nominal distance between plane 66 and plane 90 is 250 mm, as is the distance from the plane 90 to the plane 98 (i.e. one to one finite conjugate). At the second focal plane 98 is placed four second stage beamsplitters 100a–d as in FIG. 7. These will also use a single field lens rather than the front and back of FIG. 6. The focal length of this field lens, 51-2nd, is a nominal 64 mm placed again directly in front of the first redirecting mirrors of each of the beamsplitters 100a–d. This focal length therefore creates a second pupil plane image a nominal 86 mm beyond the second focal plane 98. The lenslet array 52 is therefore placed at this second pupil plane (@52 in FIG. 8). The 86 mm distance between these planes allows the pupil image to grow to a diameter of approximately 8.6 mm at the lenslet plane @52. As can be seen, a square lenslet array (both in extent and in the individual lenses themselves) is chosen with a linear spacing between lenses of 240 microns and F numbers of a nominal F/25. Those practiced in the art can verify that these figures are consistent with what $r_0=7$ cm seeing conditions would suggest. The overall size of the "active lenslets" on lenslet array 52 would need to be a nominal 50 mm square. A multitude of spot images are then formed onto a 2048 by 2048 square CCD with 24 micron square pixel sizes. This CCD was chosen partially on the basis of choosing a "nominal allocation" of a 5 by 5 array of pixels for each and every spot. All in all, this is a bit of the chicken and the egg dilemma in choosing these design specs, i.e. what drives what other numbers. In this example, the choice of a 2048 by 2048 was rather clear from the original system needs, while the 24 micron pixel size (readily available commercially) drove many of the other specifications. The few specifications not mentioned at this point have to do with the lateral distances 101 and 103 for both the first stage beamsplitter 56 and the four second stage beamsplitters 100a–d. FIG. 8A has a helpful diagram in this regard. This diagram shows the 16 pupil images as formed on the lenslet 52, overlaid on top of the beam displacements induced by the beam splitters 56 and 100a–d. As can be seen, an attempt is made to pack these images together in order to use a single detector 10. This may not turn out to be the end all and be all of packing spots, but it does quite nicely for the example system of FIG. 8. Referring back to FIG. 8, the lateral displacement of the first beam splitter 56 is 14 mm with a nominal 4 mm displacement in the center (slightly larger than the FOV at the focal plane 66), and the lateral displacement of the second set of beamsplitters 100a–d is a nominal 7 mm with the same 4 mm square displacement in the center. It should be stressed that this is a nominal design and engineering considerations may dictate small or large changes. In particular, the creation an placement of the mirror sub-unit(s) 81, FIG. 6, may dictate a larger plate scale and hence a larger center offset. This would ostensibly push the pixel area needs beyond a 2048 by 2048 CCD detector. The nominal design chosen, however, nicely (very snuggly) fills the 2048 by 2048 design and shall be used as the explanatory prototype. Hopefully there have been enough caveats already injected into the discussion surrounding FIG. 8 to drive home the point that this is not a "strict recipe" presented in the example system specifications of FIG. 8, but a nominal design useful in describing the invention in detail and potentially useful as a springboard into typical engineering design projects.

This concludes the detailed description of the camera system 2, FIG. 1. The disclosure now moves on to a detailed disclosure of the computer/data collection system 4, and thereafter into the description of the data processing methodologies.

THE CAMERA CONTROLLING SYSTEM AND DATA COLLECTION SYSTEM, 4, OF FIG. 2

FIG. 9 depicts the camera controlling system and the data collection system. The state of commercial technology is such that this entire depicted system is readily available by configuring commercial product(s). Essentially, it is what is commonly known as a digital camera system or a digital imaging system (among many other names as well). It is well known in the practice of systems engineering (and computer system configuration) that there are as many ways to arrange these commercially available elements as there are systems designers. The figure attempts to do justice to this multitude by leaving the relationships quite general. The only feature which could be considered somewhat unique to the needs of the illustrated embodiment of this invention are the shutter synchronization sub-system 118 and 40/42. The overall system should also be optimized for a high repetition rate of digital image acquires, and it would be running two digital cameras, 9 and 11; but these are only minor and normal enhancements to a typical commercially available digital imaging system. Finally, there is the software 120a–c which oversees and controls the data gathering process. It is customary and typical to utilize commercially available software library functions, programs, and compilers, usually sold along with the digital imaging hardware and host computers themselves, and incorporate them into the custom system software as auxiliary support programs and user program sub-routines. This disclosure will not get into the particulars of how these digital imaging systems function, such as how they direct the processes of reading out the electronic signals from the focal plane arrays nor how they specifically change analog electronic signals into digital information and how they specifically store that information, for such details are already known in existing systems. Instead, this disclosure will describe the details which are pertinent to the invention as a whole, and any details which might be somehow novel or specially required by the illustrated embodiment.

For the purposes of specificity, the preferred embodiment of the invention utilizes CCD detectors as the focal plane arrays of choice for the visible and near infrared light region. Other cameras operating in the infrared are certainly possible, as well as non-CCD focal plane arrays in the visible/IR. Both CCDs, 8 and 10, are controlled by units 108A&B, which in turn are controlled by either a local computer bus in a commercial camera or by a host computer as in a plug-in camera controller card (the generic term "Computer bus" 119 will be used and understood by those practiced in the art of systems engineering as representing the basic backbone of the data and control pathways). There are optional cooling controller units, 110A&B, along with their corresponding physical cooling units, 112A&B, which are well known components which can assist in lowering the overall noise levels in a digital imaging system. Here the cooling units can be considered to be what are known as common Peltier cooling devices, though other means of cooling are also utilized. Though the exposure times are typically on the order of hundredths or tenths of a second, these cooling devices can indeed assist in lowering the effective noise levels of the digital imaging systems because of the longer readout times commonly associated with low noise imaging, and are therefore included in the preferred embodiment. Each CCD, 8 and 10, has its output digitized by analog to digital converters 114A&B and stored in digital frame store memory planes 114A&B. The process of digitization typically scans the 2 dimensional electronic charge pattern at the faces of the CCDs through a shifting of the electrons which have been generated by the intensity distribution of the impinging light waves. In other words, an analog signal comes off of the CCD representing a serial scan, row by row, of the entire CCD array. This analog electronic signal is then digitized as per normal electronic apparatus, referred to as an A/D converter, and the resulting digital values are placed into a 2 dimensional grid of memory in an exact sequence at which the electronic signal was read out. For high performance systems, digitizing the electronic signal to at least a 12 bit precision is recommended [although this is ultimately driven by overall system specifications]. The frame store memory buffers 116A&B are drawn as a stacked array of multiple frames each. This is generally a convenience in the assistance of the throughput of digital images, where only one frame store buffer per CCD could suffice if need be. The critical function of the A/D network 114a&b and the frame storing memory planes 116a&b is to generate what is commonly known as a digital image, i.e. an array of numerical values which is a direct representation of the intensity distribution of light which existed at the face of the CCD. The commercial systems which perform this operation are well known to be quite linear devices, that is, the array of numeric values ultimately residing in the frame store buffers 116A&B do indeed match very closely to the relative intensity distribution existing at the face of the CCD. The last item depicted above the computer bus is the shutter synchronization and shutter driver circuitry 118, here drawn as a single unit driving both shutters, a driver which opens and closes both shutters at the same time for the same duration, typically 1/1000th to 1/10th of a second per dual exposure. The overall operation and control of these combined units, 108A&B, 110A&B, 112A&B, 114A&B, 116A&B, and 118, comes from the computer bus (either local or host), and ultimately from either software 120a-c or from front panel controls 122, or both. There is also an optional local display device 124, as is sometimes common. For the configuration where the camera controller is a local device hooked to a host, FIG. 9 also depicts a communications subsystem 126 and a box representing the host computer 15. It is fair to say that the combinations of system configurations which could be depicted below the computer bus line are quite numerous, and it is quite common for normal engineering considerations to dictate how to configure these computer system components. Finally, there is depicted the significant option of an image compression and mass storage subsystem, 130 and 16 respectively. Depending on many variables, including digital image size, number of exposures required per clear image, and others, some systems may decide to immediately compress the recently created digital images residing in the frame store buffers 116A&B and store them in less expensive slow retrieval mass storage. This is almost a necessity for objects which will require dozens if not hundreds of exposures without somehow "processing them on the fly." Often, a disk drive can suffice as the mass storage 16, and as often it could be tape drives or the up and coming technology of optical storage. The compression stage 130 simply allows a greater capacity of images to be stored on a given size storage device without appreciable loss of information. This concludes the detailed description of the computer/data collection system 4, FIG. 2. An important end result of this description are that this system supports the creation of digital images deriving from the detectors 8 and 10, and that there exists a computing system which can retrieve this digital image information and perform the data processing methodologies of the invention, which is the subject of the next section.

DATA PROCESSING

To understand the data processing methodology of the preferred embodiment of the invention, it is helpful to first generalize the input data to the processing steps. Physically, in the preferred embodiment of the invention already described, the input data is what is contained in the frame store buffers 116A&B and/or the compressed images in the mass storage 16 which once were in these frame store buffers. Additional input data is what is commonly referred to as system knowledge: a knowledge of the shape of the primary telescope mirror, a knowledge of the spectral characteristics of the light beams 30 and 32, a knowledge of the pixel sizes on the two CCDs 8 and 10, a knowledge of the effective sampling window profiles on the individual field angles in the wide field Hartmann camera, and many more items if need be. Referring to FIG. 10, the data input to the processing methodology disclosed hereinafter is:

1) A set 214 of E "distorted" digital images where the distortion is known to be appreciably variable as a function of position in the digital image (i.e., field variant).

2) A set 216 of E blocks of data which either directly quantifies (measures) this field variance of the distortion, or else encodes this information in such a manner that subsequent data processing can, through a priori knowledge of the encodation characteristics, derive a direct quantification (estimation) of the field variance of the distortion.

3) A set 218 of system data, system knowledge, or other environmental information which in any way can clarify ambiguities in the above two classes of data or otherwise enhance the overall system performance. Significantly, general statistical knowledge about the distortion would be included here.

The data processing methodology disclosed as the preferred embodiment of this invention in effect operates at this most general level of abstraction.

A processing methodology according to this aspect of the present invention creates a single clear image out of a set of E field variant distorted digital images (or digitized analog images), a set of data providing "direct or derivable" information about the field variant distortion itself, and any other a priori knowledge of the system design or the "statistics" of the distortion itself.

As so defined, this processing methodology is applicable to any linear imaging problem affected by field variant distortions and capable of some form of quantifying that distortion and its field variance. It operates on a set of distorted images to create a single clear image. This end result is analogous to a machine which would take several exposed pieces of "blurred negatives" of an object and produce a single "unblurred negative" of that object. An image deblurring system and methodology, per se. The large dashed boxes in FIG. 10 surrounding the input 220, the processing engine 222, and the output 224 reinforce this equivalence to a physical machine operating on film images.

DIGRESSION: GENERAL MATHEMATICAL BACKGROUND

Before describing the details of the flow diagram in FIG. 10, and the ensuing further details of the specific preferred embodiment contained in later figures, an extended digression into a useful mathematical language is first in order. This is necessary if for no other reason that complicated design considerations can be expressed in concise, but unequivocal terms. A much more thorough discussion of the general mathematical considerations involved in the basic problem of image restoration can be found in chapter 2, "Two-Dimensional Transforms" written by H. C. Andrews, contained in volume 6 of "Topics in Applied Physics: Picture Processing and Digital Filtering," ed. T. S. Huang, Springer Verlag 1979 or in chapter 1, "Signal Restoration, Functional Analysis, and Fredholm Integral Equations of the First Kind" written by C. K. Rushforth, contained in "Image recovery: Theory and Application," ed. Henry Stark, Academic Press, 1987, both of which are available in the libraries of large technical universities. There are several other such sources as well. Rather than continually referencing such sources, I will focus in on those items pertinent to this discovery in the following discussion.

A helpful perspective to view the processing methodology is through what is commonly known as the linear theory of imaging systems (quasi-monochromatic, unless otherwise indicated). It is summarized in the broadly accepted mathematical expression:

$$g = Hf \quad (1)$$

In the general case of this invention where a multiple set of E digital images is collected, it is best represented as:

$$g_e = H_e f; \; e = 1 \text{ to } E \quad (1A)$$

Here, f is a vector which represents the unknown object being imaged, g is the set (vector) of digital data collected by a digital imaging system, and H is the matrix which describes the linear relationship between each data point in the vector g to each point in the vector f. In actual practice, true linearity is never absolutely achieved, but it is well known that the residual deviation between "linear assumptions" and "non-linear actualities" can easily fall within the scope of a "system error budget."

For so-called "space invariant" imaging systems, i.e. field invariant systems as this disclosure refers to them, each point in the vector g has an identical relationship with the set of points in the vector f, except for a shift in indices. Expressed in terms of a digital camera, this implies that one pixel has a certain "view on the object space" while its neighbor has the same view, only positionally shifted. [i.e. FIG. 3 where the window function does not change shape as it moves from one data point to the next.] Many textbooks exist which explore these basic points in much greater detail. The point here is that since so many practical imaging systems come reasonably close to this "space invariant" approximation, much of current image processing techniques revolve around this assumption since it affords a wide variety of mathematical and computational simplification. An enormous amount of simplification, usually. The deviations of an actual imaging system from this approximation are most often small enough so that the errors caused by the approximation are well within system error budgets (the same as with the "linear approximation" mentioned above). One of the most broadly accepted and widely used manners in which this field invariant approximation is expressed as a mathematical relationship is:

$$g = h \otimes f \quad (2)$$

or $$G = HF \quad (3)$$

These look quite similar to equation 1, but have indeed undergone a major simplification. Equation 2 is what is known as a convolution equation (as symbolized by the convolution operator ) and equation 3 is its equivalent expression in fourier space, where the capital letters symbolize the fourier transform of the lower case space functions g,h, and f of equation 2. These are all common expressions in the mathematical representation of physical systems and are widely recognized and utilized by the engineering community (again, reference the texts cited above). Even though ultimately ALL imaging systems are FIELD VARIANT, so many systems are close enough to field invariance that the errors introduced by using equations 2 and 3 in practical applications are negligible.

Not so with the problem of imaging objects through a turbulent media such as the atmosphere, however. That is, IF one wishes to image objects which are not merely confined to the "isoplanatic region" as previously defined. Even when an application calls for the imaging of an object confined to the isoplanatic region, it will be found by anyone experimenting with the prior art techniques, in relation to the techniques of this invention, that the "isoplanatic assumption" leads to higher noise levels (per number of images collected) than this invention.

To use the common vernacular of the digital image processing industry, the overall problem of imaging through a time varying field variant distorting media can be defined as: "Estimate f given a set of E digital images, $g_e$, each of which has a random (albeit within generally known statistical parameters) non-separable space variant point spread function described by the matrix $H_e$."

The very definition of isoplanaticism incorporates the idea that h of equation 2 does not change other than a shift. As already mentioned, the transfer function of the atmosphere, i.e. the rows OR columns of H in equation 1, changes quite appreciably across the angles of the sky. So much so that even with a shift of angle in the sky of 10 arc seconds of one degree, in normal "good" seeing conditions commonly referred to as $r_0 = 10$ cm, the corresponding h functions of two angles 10″ apart are all but totally uncorrelated for visible wavelengths. This all but eliminates the massive body of image processing tools which rely on the shift invariant assumption from being employed in comprehensive, global or wide field solutions to the turbulent imaging problem. This includes simple fourier techniques. In fact, the second and third classes of prior art systems, adaptive optics and speckle interferometry which are described in the Background of the Invention Section, are both essentially limited by this field invariant approximation, the first (adaptive optics) due to the fact that they only measure and correct for paraxial light waves, and the second due to the fact that fourier representations, which ipso facto impose isoplanaticism, are at the heart of much of the practiced processing of their data.

A major foundational novelty of this invention (not here "claimed" per se, but leading to specific methodology inventions) is that the jump from equation 1 to equations 2 & 3 is emphatically not made, and that other approximations are introduced (which MUST be introduced IF the enormous computational requirements are to be accommodated by less than all the computational facilities on the planet put together) at appropriate stages, all leading to specific processing methodologies which form the heart of the so-called "image deblurring machine" of FIG. 10.

Instead, the problem is reformulated into the following:

$$g(x) = \int (h_y(x-y) * f(y)) dy \qquad (4)$$

Equation 4 is nothing more than a restatement of equation 1 (barring the subtleties of the continuous-discrete transformation process, here assumed to be "one and the same") with the additional consideration—normally quite helpful in actual instrumentation—that the coupled variables (x-y) in h are simpler than x and y by themselves. This is to say, the matrix H has a roughly bandlike nature (the word "roughly" is used owing to field variance and geometric distortion) and use of the coupled variables allows for a simpler conception and description of h. The careful observer will note that the "known" statistical properties of a turbulent atmosphere do play a role in this decision to utilize the more intuitive coupled variables (x-y), in that these statistics indicate a low spatial frequency of the "change in $h_y$" relative to the inherent spatial frequencies in $h_y$; it is a conceptual "separability" at this stage which will later be transformed into a quite mathematical one. In our current case of a digital imaging system, both x and y can be considered as two dimensional vectors metricizing the image and the object spaces respectively. Expanding this equation out into a rather full representation of a digital imaging camera, we get:

$$g[n] = \int g(x) p_n(x) dx = \int (\int h_y(x-y) f(y) dy) p_n(x) dx; \quad n = 1 \text{ to } MN \qquad (5)$$

Equation 5 is the same as that which is depicted in FIG. 3, implicitly including the atmospheric contribution and the telescope optics inside the field variant h function. Even the pixel sensitivity function, $p_n(x)$ is accounted for (again, the monochromatic assumption is in effect). It should also be pointed out that the subscript y on the h function could just as well have been an x; the y indicates that use is being made of the column vector of the H matrix in equation 1 rather than the row vector. The subscript n runs from 1 to MN, analogous to the discrete digital values that a typical M by N detector would produce. As an aside, equation 5 could be further simplified into:

$$g[n] = \int h_n(t[n] - y) f(y) dy; \quad n = 1 \text{ to } MN \qquad (6)$$

This is nearly a restatement of equation 4 in a discrete format. The vector t[n] (as a convenience) is a positional vector about which the h function can be defined. That is, it preserves the general convolutional character of the problem. Moreover, it can accommodate lower order geometrical and/or "center-of-gravity" "warps" if any advanced designs and methodologies require such, yet retain simpler mathematical expressions.

At this point, a kind of axiom is needed which states that much of the subtlety contained in equation 5, and contained in the use of the vector t[n] of equation 6, is within the proper scope of advanced engineering and CAN be ignored while describing the invention itself. The "errors" which will be introduced into the overall system performance will remain just that, errors within an established system error budget. This is common engineering practice to use approximations and let the errors fall out where they may. It is the nature of the approximations chosen which will determine whether these errors are within acceptable limits. So with this axiom in mind, the following approximation is put forth which can get us back on the explanatory path of the preferred embodiment of the invention. I return to a continuous function representation of the problem where the pixel sensitivity function will now be considered to be incorporated inside the h function:

$$g(x) = \int h_y(x-y) f(y) dy \qquad (4A)$$

This is precisely equation 4 only now h tacitly includes a field invariant pixel sensitivity function, p(x). From here, we can follow a path which will wind up with an equation that will inform many of the engineering choices made in the preferred embodiment of the invention.

Focussing our attention first on the continuous function h, one well known manner of approximating (arbitrarily closely) h is:

$$h_y(x-y) \approx \Sigma h_a * \Phi_a(y, x-y) \qquad (7)$$

This leads to interesting patterns and insights but not the ones that the preferred embodiment is after. Instead, the preferred embodiment can be better appreciated by employing the following expression which can generally be made arbitrarily precise:

$$h_y(x-y) = \Sigma z(qs-y) * h_q(x-y) \tag{8}$$

This has been cited in the general literature as a "series expansion of separable functions," see Andrews cited above. I am currently unaware of efforts which have gone beyond merely citing the more general form of equation 8 and noting its lack of usefulness in a global restoration context. Here, used with the (qs-y) variable on the z function, careful examination will show that this is merely a general interpolation function, z, being applied to a "table" of h functions where the table entry spacing is s. The interpolation function employed is left as an engineering exercise, though the assumption of a bi-linear function is a reasonable, practical starting point for this discussion [spline functions, standard square box functions, truncated cosine squared functions, etc., are all candidates with various properties]. The main purpose of equation 8 is the separation of the variables y and (x-y), mixed together in the original h function, into two functions, and in a way that retains a simple spatial coordinate system for the field variance (which the grid of table functions with a spacing s provides). The in-operation "typical" frequency spectrums of these two functions will grossly mimic the "field variance of h" in z, and the "intrinsic local transfer function of h" in h itself. It should be pointed out that, in the utmost efficiency minded approach to the design of a system, equation 8 may be somewhat wasteful if the spatial frequencies of the various basis components of h differ markedly. This is to say, the pole spacing, s, of the interpolants will be dictated by the highest spatial frequency components of h, and may be "overkill" for other components that would have sufficed with a pole spacing longer than s. It is felt that this is of negligible concern at this point and that the matter is entirely left to engineering if the phenomenon truly causes undue inefficiencies. A double summation, separable equation 7 could then be employed if absolutely necessary. Plugging this new representation of h into equation 4A, we get:

$$g(x) = \int (\Sigma z(qs-y) * h_q(x-y)) f(y) dy = \Sigma \int h_q(x-y)) * (z(qs-y)*f(y)) dy \tag{9}$$

giving a fourier counterpart:

$$G = \Sigma H_q * (Z_q \otimes F) \tag{10}$$

where the shifting, qs, in z is now merely indicated by a subscript q on Z. In general, equations 9 and 10 are no different than equation 1. However, there is now a certain separation of the "localized" (and generally lower frequency) components of the field variance from the more familiar transfer characteristics symbolized by the local H function indexed by q. Careful examination of equation 10 will show that in effect, this is the fourier counterpart to equation 1:

$$G = HF \tag{11}$$

where the matrix, H, is in italics to differentiate it from in space domain counterpart, H. For the sake of computational simplicity and conciseness, it would be helpful to quickly outline the detailed relationship between the F and G. Expanding F into a series expansion and pulling the summation out front, equation 10 turns into:

$$G(k) = \Sigma F_r * (\Sigma H_q(k) * (V_q(k) \otimes \Phi_r(k))) \tag{12}$$

where it can be seen that everything inside the outer parentheses, including the known and/or fully derivable $H_q$ functions, is now a single known function:

$$G(k) = \Sigma F_r * W_r(k) \tag{13}$$

Once again, this is merely reformulating equations 10 and 11, emphasizing that the rows and columns of the H matrix in equation 11 can be easily calculated on a computer. Detailed examination of equation 10 through 13 will find that the H matrix is also roughly banded just as its space domain counterpart H in equation 1. This concludes the general "abstract" mathematical discussion which will be referred to in later sections describing the preferred embodiment in detail.

Turning now to a highly practical mathematical formalism in which to further approach the computational necessities of the preferred embodiment, refer back to FIG. 3. The function h in equation 4A is graphically depicted in FIG. 3, where two particular points in g have their own unique h functions projected onto object space. It should be noted that each and every point in g has a unique projection onto (window on) f. FIG. 3 also depicts a variety of steps taken which begin to transform equation 4A into the preferred embodiment of the invention. The main step involves choosing a set of orthonormal basis functions over which to define f (and subsequently h). It is well known in the engineering community that there are many such sets to choose from, each having differing properties for specific applications, though all serving as a sufficient mathematical description of the functions. The choice of basis functions for the preferred embodiment of the invention is anchored by a uniformly spaced grid whose linear extents along the two axes correspond precisely to the dimensions of the pixels on the primary array 8, with precisely the same ratio of spacing. i.e., the preferred embodiment uses the most common set of basis functions: the grid of sine functions (or delta functions, if we must) which match the detector. At each "tie point" in the grid—points where the grid lines intersect—there is a two dimensional sine function (sin(x)/x) centered over the tie point which is one member of the basis function set. The collection of these 2D sinc functions is then the entire set of basis functions for f. This is perhaps the most common form of basis functions used in digital imaging applications (if only implicitly rather than explicitly; another common way of describing the very same set of spatial basis functions is to depict a grid of delta functions in the context of a "sampling theorem limited" system, i.e. a Nyquist limited system). Altogether there are MN two dimensional sine functions, identical to each other except for a positional shift.

Now there are a few practical issues which arise at this point which a meticulous engineer can notice and which, before being swept under the rug as prima facie negligible, should at least be highlighted and analyzed. It is pertinent to the invention, and pertinent to a full understanding of how to build the invention, to list these issues and discuss them briefly in the context of building the invention. There may arise situations where this discussion will be highly pertinent to engineering details, especially in systems designed to image through extremely turbulent conditions.

To begin with, the use of any finite set of basis functions to represent some object 20, FIG. 1, which for all intents and purposes requires an infinite set of basis functions to be described, brings up a variety of subtleties. Physical instruments which attempt to estimate the coefficients of as many of these basis functions as possible inevitably must make do with a finite number of data points to work from and hence cannot but form an estimate of the object with a finite set of basis functions. Meanwhile, ALL of the object's infinite (orthogonal) basis functions in some way affect the data points thus collected, if only in a vanishingly small manner for the vast majority. Most methodologies which attempt to form an estimate of the object using a finite set of basis functions often experience a phenomena whereby specific basis functions "beyond the designed finite number" manifest themselves as patterns in the data set in exactly the same way as some combination of basis functions "within the designed finite number." This is a very well known phenomenon in the signal and image processing community, generally known as aliasing or as an example of the Nyquist theory (which targets the fourier set of sinusoidal basis functions as the working example of how aliasing is defined and manifests itself). This phenomenon, and its general abstract presentation above, is important to this invention not necessarily at its core, but rather relates to implementation-specific issues. For one thing, this more general presentation can more clearly show that errors due to borders and errors due to "frequency aliasing" are two sides of the same coin.

Continuing then, there is the classic and widely utilized theory of the telescope which culminates in the concept of the diffraction limit. This theory, in a rough summary, postulates the existence of a finite aperture viewing an infinite extent object at an infinite distance in some particular wavelength of the electromagnetic spectrum; Using a fourier mathematical representation now, any point P inside an enclosed instrument will have a window function h (of equation 4) which is absolutely limited in (angular) frequency to a period of arctan($\lambda$/A), where $\lambda$ is the wavelength of light and A is the maximum aperture distance, both measured in the same units. The driving force behind this theory of the diffraction limit is the idea that, as a luminous point source is moved around in the object plane, the complex phase of the incoming planar light waves as projected onto the "pupil" (the open area of the aperture) can only relatively modulate at this maximum frequency and no higher. Any point inside the instrument will receive a "null signal" from angular frequencies higher than this "diffraction limit" angular frequency with the period as stated above. In broadly accepted theory, only the cosine multiplicative component on both the complex amplitude and the complex phase of the incoming light waves creates frequencies above the diffraction limit, where these two components are vanishingly small at the diffraction limit frequency even for very small aperture imaging system (they at least, however, provide a solid mathematical negation to the idea of an absolute diffraction limit and to an absolute null space). As a final note on describing conventional theory and its telescope design implications, focal plane arrays are generally chosen to have a spatial pixel spacing which provides 2 pixels per cycle of this maximum angular frequency, though some applications will specify a greater or lesser spacing for a variety of reasons. Returning now to the relevance of all this to the current invention, it can be noted that the conventional theory of the diffraction limit posits the existence of planar light waves impinging at the pupil 212. But the entire supposition of this invention, and its rationale, is that an imaging system will be used in a situation where the light waves are not planar but are distorted from a plane wave, and more importantly, these "distorted plane waves" change as a function of field angle. For field invariant imaging systems, this distortion does not really change the concepts embodied in the diffraction limit stated above, since though the complex phases and amplitudes are distorted, their relative modulation at the pupil plane will be identical as before: limited by angular frequency with the period arctan($\lambda$/A). But, once the field variance of the window function h is acknowledged, the situation summarized in equation 11 once again holds and the plane wave assumption behind the basic idea of the diffraction limit breaks down. Imagine then that incoming light waves from two different directions are seen impinging on an aperture. One just happens to have no distortion while the other has distortion. As the field angle is moved along the sky, the phasor diagram of an internal point of the instrument will be found to move at a faster frequency in absolute angular terms than would otherwise be the case with the undistorted waves, i.e. at a frequency above the "diffraction limit." Furthermore, examination of equation 11 indicates that the object spectrum F is being convolved by the (generally symmetric) interpolating function V, thus frequencies "above the diffraction limit" contribute to the data vector g.

Some general engineering observations are in order at this point. The overall point to the above discussion is that the pixel spacing may need to be somewhat smaller than would otherwise be the case for a straightforward diffraction limited calculation. Furthermore, an object estimate MAY be sought which exceeds the frequencies of the so-called diffraction limit. Having said all of this, it will be found that for large telescopes in particular, where the spatial bandwidth of the field variance as reflected in V is much smaller than the spatial bandwidth reflected in H, the effect can be considered negligible. On the other hand, in smaller aperture telescopes where V begins to appreciably approach H's spatial bandwidth, the effect can be significant to the design. As a very crude rule of thumb, the pixel spacing should be decreased from that dictated by normal diffraction considerations by the amount:

$$\text{sqrt}(p^2 * s^2)/p \qquad (14)$$

where p is the pixel spacing in arcseconds dictated by traditional diffraction theory and s is the "table spacing" of the h functions in equation 8. It can be seen that for large aperture telescopes this factor is quite negligible in even some of the most severe turbulence conditions. Be this as it may, the effect is one to take note of, possibly, in non-conventional imaging system design applications.

The above discussion overlaps to no small degree with the issue of aliasing previously mentioned. The "safe" route is to pick a pixel spacing conservatively above the modified diffraction limit indicated in equation 14. However, this can lead to less photons per pixel and possibly higher noise levels in certain critical system results specifications. In these cases, often a choice is made to design a spacing which is some significant spacing larger than is dictated by equation 14, improving the S/N ratio at the expense of "tolerable" aliasing. As always, the choice of exact pixel spacing, and the trade-off between noise and aliasing, is best left to specific engineering refinement.

This concludes the general mathematical description of the basic problem and the discussions on some of the mathematical subtleties that may be encountered.

THE PREFERRED EMBODIMENT OF THE DATA PROCESSING METHODOLOGY

Returning back to FIG. 10, we can now describe the core overview of this processing methodology aspect of the invention. We can then quickly transition to the specifics of the preferred embodiment. The following discussion is only meant as an explanatory discussion of how the major pieces fit together, while the recipe for the preferred embodiment will come later.

The data input to the process, 220 as a group, has already been described. The first critical step in processing the input data is to define a set of "universal" signal to noise ratio segregating basis functions. The engineering choices for exact choice of this set are vast, as any text on the series representation of functions will attest. This set of basis functions is NOT, generally, orthonormal. Indeed, it is generally an overdetermined set of basis functions, i.e. the total number of basis functions is greater than MN (except in the cases of very low turbulence and in situations where, for whatever reasons, an orthonormal set is required; it once again boils down to engineering considerations/error budgets). Each member of this set of universal basis functions 226 forms the basic element where an unambiguous weighted average will take place (I will refer to entities by the number in the box where they are defined or created). The following step 227 is, in broadest terms, the step where a user inputs the parameters which will control later processing methods. Here, a choice is explicitly made as to which reversion methodology will be utilized inside the inner loops 230 and 232; the preferred method of the "window function," as will be described later, is referenced as the usual choice. The next step 228 in FIG. 10 explicitly establishes (allocates memory as it were) both a numerator and a denominator array for each and every basis function in the set 226. These correspond to the usual numerator and denominator of a typical "weighted average" operation depicted generically in FIG. 11. The ultimate purpose of these first two steps is to set up a description of the object estimate, f, which can sort out the signal to noise ratio components of each and every digital image of set 214, and relate these components between two exposures and between any given exposure and the set of exposures as a whole. Furthermore, as will be explained henceforth, use of the weighted average in particular can be used to turn what has commonly been called an "inversion" into what is here called a "phase reversion" with post hoc magnitude inversion, or just "reversion." The deliberate phrasing here reflects an appreciation for the vast work that has been done on "deconvolution" problems, and the implication of this is that the ubiquitous problem of a possible divisions by zero or very small values, so common in straightforward de, convolution processing methodologies, is all but eliminated by this "reversion" (the remaining subtleties will be discussed). FIG. 11A relates detailed steps on how a set of E multiple exposures can accomplish this "reversion" as opposed to the "inversions" which beg for such arbitrary solutions. The need for segregating the function f into a universal set of signal to noise segregating basis functions is also made clear by this figure: otherwise there would be an ambiguous and varying designation of the function which truly is representative of the signal to noise ratio. Since the reasoning contained in FIG. 11A is central to the disclosed method of "undistorting" multiple independently distorted images, we turn briefly to describing its steps. Step 1 isolates a single member (coefficient) of the universal basis function set 226. a is the object parameter, b the transform and c the data realization. Straightforward deconvolution techniques of step 2 lead to the well known division problem. Step 3 and 4 now include multiple realizations of the data elements c with the corresponding transforms b, broken out into a phase and magnitude component for reasons which will be immediately clear. Step 5 points out that s is a perfectly acceptable metric on the inherent signal level contained in c, assuming the noise statistics are invariant across the E exposures (if they aren't, just account for the additional noise non-uniformity). Step 6 then pulls it all together into a final expression which "puts off" the division until all exposures have been accounted for. Step 7 illustrates that E, the number of exposures, is so chosen as to ensure an average "good" level of signal by the time this division is made. If a given realization still is below a threshold, perhaps it can be dropped entirely. But better yet, a Wiener-type amplification of the magnitudes could be used, as is described in any basic text on signal processing (i.e. the numerator in 6 could be "amplified" by a signal to noise ratio dependent factor).

Getting back to FIG. 10, then, the heart of the processing methodology is the loops indicated by steps 230 and 232 in FIG. 10. The outer loop steps through all E acquired digital images (and their corresponding distortion information), while the inner loop steps through each and every basis function defined by steps 226 and 228. Before the inner loop 232 is entered, however, either the input information of data set 216 is directly translated into an array named "rev_array" 235, IF the information in set 216 is directly in the form of h equation 4; or an earlier step 234 of transforming "coded" distortion information into the form of equation 4 is performed. The preferred embodiment is of the latter type, where the input data set is a set of digital images of a whole bunch of spots, hardly in the form of equation 4. Suffice it to say that steps 234 and 235 are dealt with in great detail in the description of the specific preferred embodiment. Also, reference is made to the "compressed H matrix" in 234 and 235. This language is chosen since it is perhaps the most concise way of describing what is required at this stage: an informational efficient encodation of either the rows or the columns of H in equation 1. Because the rows and columns are variant, BUT relatively low frequency variant, there are hugely more efficient manners of storing an arbitrarily close estimate of H in these more compact manners. Again, in the preferred embodiment of the invention, step 234 is quite involved, actually, in that it must transform the spot image data contained in the frame grabber 116B and/or mass storage 16 into the applicable H matrix rows/columns. In this case, the input data 216 is quite "encoded" and step 234 is quite integral. The inner loop 232 is then entered. Step 236 then calculates the array of data which will be unique to each basis function member in loop 232; this will be seen to be at the heart of overdetermination, wherein a "smaller" data region has its effects on a much larger region processed. Steps 237 and 238 are then performed which, through choice of the particular reversion method chosen in step 227, and the consequent assignment of appropriate values to rev_array 235, calculates the value to be added to the accumulating numerator and denominator (elements of 228) corresponding to the given basis function of loop 232 (i.e., its corresponding element of the defined set 226). Step 236 through 238 are also quite involved within the preferred embodiment. The very fact that they are boiled down into a simple accumulating multiplication illustrates the close connection between the weighted mean operation and the "reversion" operation. The denominator operation has the square of the magnitude of rev_array added into its cumulant, following the principles outlined in FIGS. 11 and 11A; stated in yet another way, subdata 236 will have an attenuated magnitude approximately equal to the magnitude profile of rev_array, and thus their product in the numerator necessitates a squared product in the denominator (FIGS. 11 and 11A do a better job of describing it, actually). The "next" statements 232B and 230B are then encountered respectively, being the closing elements of the loops 232 and 230 respectively. Once all digital images have been cycled through, a new array called "image_estimate" 240 is created and its initial values set to zero, and then a new loop 244 A&B is encountered once again stepping through the entire set of basis functions defined in step 226 and established in step 228. Step 245 is a generic filtering operation which could be performed at a variety of locations in the processing, even back in step 235; however, this filtering step 245 allows for a chosen optical transfer function to which the image estimate conforms rather than the "default" equal energy transfer. This is to say, the process without this step would try to boost ALL spatial frequencies to their unattenuated "object space" values, whereas it is generally a better idea to recreate these frequencies at the same OTF as, say, the diffraction limited telescope—hence the diffraction limited OTF filter would be used at this step 245. Step 246 then divides the numerator by the denominator for each basis function and adds the resultant directly image_estimate. Because the data arrays "subdata" 236 were (or should be, I should say) separated in an energy conservative manner, i.e. the sum of brightness in all subdata arrays equals the sum of brightness in the whole image, the additions into "image_estimate" will ultimately remain energy conservative as well. After the loop 244 A&B is finished, the resultant image_estimate is the "clear image" output 224.

Now that the steps have been generally described, it is easier to describe a central novelty of the processing methodology aspect of the present invention. To sum it up in one sentence, the invention simply performs a weighted average inversion—"reversion" as dubbed herein—defined over a generally overdetermined set of signal to noise ratio segregating basis functions. In plain English, the process not only "undistorts" the individual images, it does so in a manner that allows for all images to be properly averaged together into one final crisp image. An individual "undistorted" image IS generally noisy, and its noise properties non-uniformly distributed. Moreover, this non-uniformity of noise properties changes significantly from one image to the next. The present process, through the use of what could also be called universal signal to noise ratio preserving basis functions, creates a common ground for the image to image noise property differences to be reconciled, while the weighted average "reversion" not only ensures a maximally efficient signal to noise ratio on the final image estimate, it hugely reduces the practical difficulties associated with divisions by very small or null entities. Null entity inversion at the final step 246 would only take place if a given member of the basis function set continually finds null values in all its E realizations, and in this case, either the whole member contribution at step 246 can be thrown out, or a more general Wiener-type filtering can take place at step 246, where the magnitude "amplification" is related directly to its inherent signal to noise ratio as reflected in the denominator. [Basis function members near the "diffraction limit" generally ensure that these latter subtleties are usually present and must be accounted for.]

As a final mathematical note before the detailed recipe for the preferred embodiment is described, we can further analyze why the universal set of basis functions defined in step 226 is generally overdetermined. This discussion leads to further insight on the novelty of this aspect of the present invention and its relationship to the prior art. It is well known that by employing the standard mathematical technique of the singular value decomposition (SVD) to equation 1, a solution f can be obtained which is made up of a vector of coefficients multiplying a corresponding series of derived orthonormal basis functions, each of which has a further associated numeric value generally related directly to its inherent signal to noise ratio. Rather than get into the details of this process, we only need note here the "non-uniform noise properties" alluded to above can find precise mathematical expression in the SVD formalism without any need for "approximation." Every student of the SVD processing methodology knows that the matrix representing the orthonormal basis functions and the vector representing the inherent signal to noise ratio both change according to the H matrix alone, not its data realizations. It should not be surprising, then, to discover that for a "typical" random media changing the H matrix as it does, it is quite difficult or downright impossible to find a single "independent, orthonormal" set of basis functions which can serve as the perfect segregator of signal to noise properties across multiple instances of the H matrix. The transformation from any given instance of the SVD solution onto this hypothetical "universal" set of basis functions will force a scrambling of the otherwise "clean" signal to noise vector (sigma, in the SVD vernacular). It is important to choose a set of basis functions, in step 226 FIG. 10, which can appreciate the implicit or explicit "approximation" which is taking place between the "SVD ideal" and the chosen universal basis function set—that is, this should be done such that a given threshold of acceptable error is maintained. Computational efficiency and resource usage efficiency almost demands that approximations be made, while the overall system error budget provides the limit to these approximations. As alluded to earlier, for very low turbulence situations and for system designs with liberal error budgets, a good candidate for an independent orthonormal set of basis functions (i.e. normal and maximally efficient) is a spatial weighting grid of lower spectral resolution sinusoids, e.g.:

$$\Phi_{a,b}(x) = (\sin(cx)/cx) * \sin\_\&\_\cos(dx) \qquad (15)$$

where $c*c*d*d=MN$ (this is cryptic, admittedly, but the words should speak for themselves and it is quite immaterial to the disclosed invention). It should also be noted that in the case where the overall imaging system can be well approximated by the isoplanatic assumption, i.e. equations 2 & 3 can be profitably used, then it can easily be seen that the sinusoidal basis functions of the standard fourier components can fully serve as the "universal" set of signal to noise segregating basis functions. Indeed, this very concept is superfluous in that case; field variance is what gives it real meaning. It should also be noted that the prior art, most notably in the paper "Deconvolution from wave-front sensing: a new technique for compensating turbulence-degraded images," J. Primot et. al., J. Opt. Soc. Am. A Vol 7 No 9, p 1598, not only implicitly makes use of this clean segregation of the signal to noise components in the isoplanatic case, its use of the time average of the correlation by the time average of the auto-correlation, equation 3, is a degenerate case of the general weighted average reversion listed above, i.e. it happens to degenerate into global orthonormal basis functions which are derivable through less general operations such as correlations. It is clear, however, that the correlation and autocorrelation operations lose their efficacies when applied to field variant systems and thus do not extrapolate beyond the "isoplanatic" assumption. In any event, this functional congruence of this equation 3 to the more general principles outlined in FIGS. 11 and 11A dictate that this invention disclosure will not presume to claim the use of this specific processing technique within "fully isoplanatic" methodology. On the other hand, "fully isoplanatic" applications which utilize "field variant technique enhancements" certainly fall under the purview of this invention and will be claimed accordingly.

THE DETAILED PREFERRED EMBODIMENT

The description of the preferred embodiment picks up where it left off with the detailed descriptions of the camera system 2 and the computer controller 4. This preferred embodiment also makes use of the quite specific formats and variables of FIGS. 1 through 9. However, it should be clear to those practiced in the art that based on the above few sections, a much wider variety of input/output conditions could be accommodated by the processing methodology of the invention.

Figure 12:
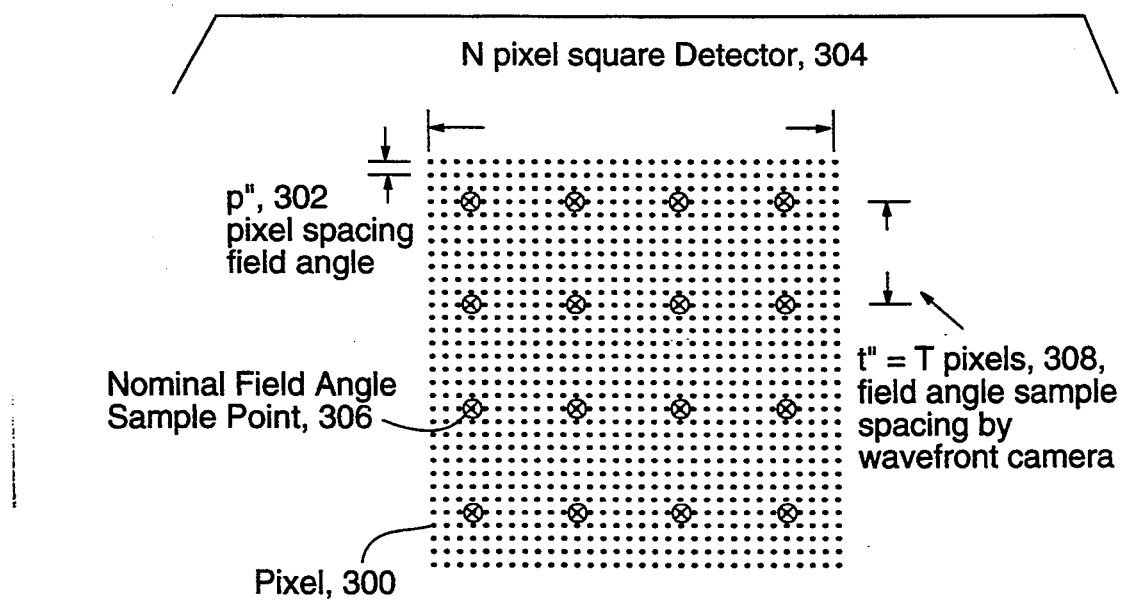
FIG. 12 is a schematic diagram of the centers of field angles at which the wavefront is measured, overlaid on a grid of solution pixels.
Figure 12A:
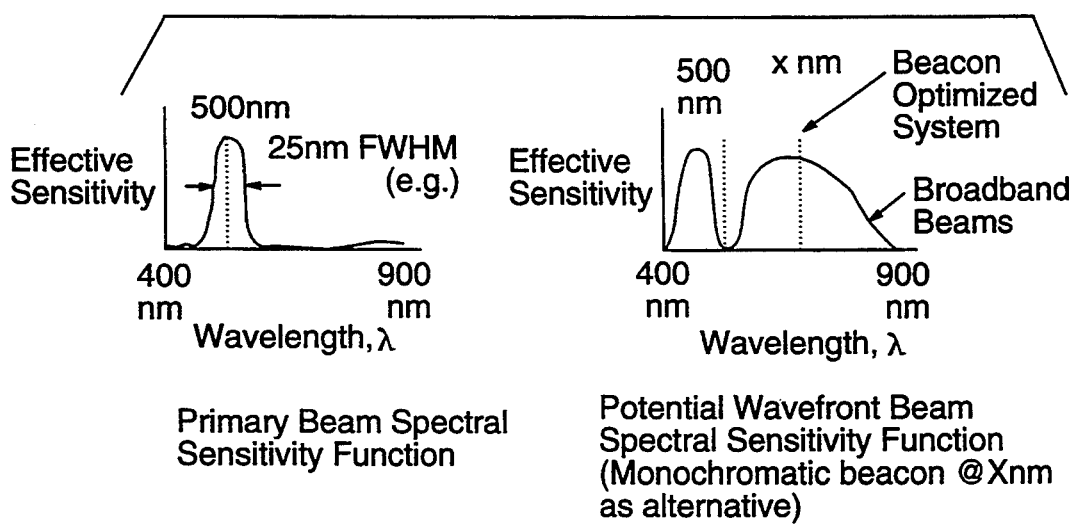
FIG. 12A are examples of spectral sensitivity curves of the light beams which enter the primary camera (on the left) and the wavefront camera (on the right).

FIG. 12 contains a schematic of the information which is best described as belonging to the input system data 218 of FIG. 10. Exact numbers are used in order to illustrate their relationships and in order to specify a typical system which can be built using current technologies. FIG. 12 depicts a simplified schematic of the pixels 300, represented as points, of the digital images derived from the digital camera 9, with p" 302 being the equivalent field angle spacing between pixels (0.02" as per FIG. 8, the example design). A square image format is chosen with a total number of pixels N 304 on each of the axes, where FIG. 8 has N at 1024. The s 306, implicitly overlaid directly on top of certain pixels (or fractions of pixels as the case may be), represent the nominal center points at which the pupil function has been measured by the wide field wavefront camera 11 (i.e. the pupil function for a given field angle). These nominal center points 306 have a nominal field spacing of t" leading to a pixel spacing T 308, where in the example design of FIG. 8, 3.6" leads to T=180. The light reaching the primary camera focal plane array 8 and detected by it has the spectral characteristics (as shaped by the overall system, the CCD 8, and the dichroics 28 and 58) contained in the inset FIG. 12A, where the central wavelength is 500 nanometers and the spectral curve has a full width half maximum of 25 nanometers (in this example; remember that this FWHM figure is negotiable relative to overall system error budgets). FIG. 12A also has an example of what the spectral sensitivity curves on the wavefront beam might look like both for a broad band system, the full curve, and for a beacon optimized system (see later sections) as the dashed curve. Harkening back to the discussion on the extension of the spatial frequency coverage beyond the diffraction limit, as symbolized in equation 14, we discover that the ratio of extension is trivially small in this design and so the nominal pixel spacing of $p''=0.02''$ will indeed be chosen. It should be noticed again that the example system of FIG. 8 will have its pupil function sampling extending beyond the extent of the data pixels; this is a convenience as already mentioned and need not necessarily be the case. Instead, this field angle sampling could be fully inside the extent of the data pixels and use would be made of simple extrapolation methodologies for the pixels at the outer edge of the detector. The choice of a field angle spacing at 3.6" should be quite sufficient to measure turbulence conditions at and somewhat "worse" than the well known seeing parameter $r_0=10$ cm, probably down to $r_0=7$ cm or even lower with appropriately more error incurred. As previously discussed, there is no absolute wall at which point final results fall off a cliff in an error or signal to noise sense. A field spacing of 3.6" would even give reasonable results down to a seeing level of $r_0=5$ cm, though various error and noise mechanisms would certainly begin to show up in the final results by this point. Any more detailed discussion on this point belongs in the theory sections and in normal engineering refinement.

Referring back to FIG. 10, the first bona fide processing step is the "non-computational" definition of the universal S/N segregating basis function set. FIG. 13 schematically describes the set chosen for the specific example described in FIG. 8. First, the digital image is split up—using square spatial weight functions—into a spatial grid of "data sub-zones" 320. Here, the weight function used is a 32 by 32 pixel region of unity value with zeros everywhere else, stepped across the entire digital image space. At the expense of computation time and resources, this could as well have been a bi-linear weighting function or a smoother interpolating function instead of a 32 by 32 square region, but the example of the square region suffices for many overall system error budgets. It can be noticed that now the digital image data is split up into 32 by 32 regions, each with 32 by 32 pixels. This is somewhat a coincidence: i.e. the 32 by 32 within a 32 by 32; since a 2K by 2K detector would give a 64 by 64 region of 32 by 32 pixels. It also reflects a preference for powers of 2 which will become more apparent shortly. At this point, each new data region, of which one in particular 322 is highlighted in FIG. 13, defines its own unique projection onto the solution space of f, here defined as a 256 by 256 point grid with a corresponding 256 by 256 array of fourier components (its own UV plane). The position of this 256 by 256 spatial plane relative to the solution space of f is not shown, but it can be seen as shifted inside that solution space so that its center coincides with the center of the data subzone from which it derives. It will be the fourier basis functions with the coefficients defined in the UV plane 328 which will be utilized as the components of the universal basis functions defined in step 226, FIG. 10. Since each of the data regions 320 defines its own unique basis functions, it can be seen that there will be a total of 32*32*256*256, or 67108864 individual basis functions (64 Meg), or a factor of 64 larger than would otherwise be needed to fully specify the solution f. This is to say, this set of basis functions is overdetermined by a factor of 64. Several engineering points must necessarily be inserted here in order to explain this.

First of all, there are clearly choices which could be made which will greatly reduce the overdetermination factor. The example presented in FIG. 13 chooses a conservative approach more appropriate to empirically derived error budgets as opposed to well-defined theoretical ones. The thinking behind the choice of a 32 by 32 region is that it is "well within" the "isoplanatic" conditions such that the pixels within the region can be treated in a normal isoplanatic processing methodology. Likewise, it is not too small as to unduly increase the computational time and resources in the hunt for diminishing returns (negligible decreases in error and noise). It is clear that the ideal universal set of basis functions would be to have each pixel define its own 1K by 1K UV plane, giving $10^{12}$ individual basis functions and an overdetermination factor of $10^6$. The choice made in FIG. 13 is therefore a compromise which, significantly, includes the desire to keep the procedure within a simpler framework not only to explain it more easily, but to simplify the real world software programming requirements which so often includes non-mathematical experts, or at least non-experts of the entirety of the invention. It has already been pointed out that weight functions other than a square 32 by 32 region could be used to split up the data region, also. It is quite conceivable, but to my present knowledge beyond practicality, that a basis function extension of the individual data regions could be found which is maximally efficient AND analytically smooth in describing the "reversion" process, but: will it be computationally efficient as well? These are questions for future "efficiency refinement" R&D. On a rather abstract plane, the path of engineering refinement can be summarized as "minimize the computational time/computational resources for a given level of error budget"; mathematically, find: MIN (DIM(#BASIS @TURBULENCE),. EXECUTION TIME ) @ERROR_LEVEL; The DIM alludes to a minimum dimensional entity, correlated directly to memory needs (# of basis functions for a given turbulence) and partially correlated (.) to execution time, which can fully represent the reversion procedure for a given error level; but it must be chosen so as not to overly burden the execution time above the highly efficient FFT procedures of the preferred embodiment, (which will be described). This sort of exercise is a classic engineering refinement task.

Returning now to FIG. 13, both the choice of a 32 by 32 sub-zone, and the choice of a 256 by 256 "halo" 324, were largely determined by the knowledge of the (very gross) statistical properties of the turbulence in the atmosphere; this statistical "knowledge" being generally contained in the input information 218 of FIG. 10. The choice of the 32 by 32 pixel data sub-zone 322 was already shown to approximate a region where the model of isoplanatism could hold, i.e. where equation 2 and 3 could profitably be employed within the overall system error budget (IF eq2&3 are needed; for more refined cases they are not needed, e.g., in reversion methodologies which work within local low order variance conditions). Furthermore, this can lead to the use of efficient processing methodologies such as the two dimensional fast fourier transform, to name the hands down favorite. The choice of the 256 by 256 "halo" 324 could just as well have been the entire 1024 by 1024 solution region in extent; the truncation to a smaller region (based on a power of 2) merely limits it to a region of significance, that is, the truncation of the area largely reduces the computational load while introducing a "negligible" error. The definition of "negligible" fits within basic engineering considerations, and this example decided that going with a 128 by 128 "halo" would not have been negligible (for turbulence levels approaching $r_0=7$ cm and worse). A general rule of thumb that can be used in choosing the size of the "halo" 324 is based on the well known "long exposure" profile of a point source. This idea is quite well known in the industry and has long been used to define the inherent resolving power of unassisted telescope viewing through the atmosphere. It is a common rule of thumb that in "seeing conditions of $r_0=10$ cm, using the 500 nanometer wavelength, a full width half maximum (FWHM) of 1" is generally found for the "long exposure" profile. For the purposes of this invention, the long term exposure profile represents the statistical weighting function that any given data point has on object space. A choice must be made to "ensquare" some percentage of energy of that profile. If we look at the field angle sampling spacing of 3.6" (308, FIG. 12) and the 500 nm central wavelength, it is clear that the overall system should work reasonably well down to seeing conditions of $r_0=7$ cm and perhaps a bit lower (higher turbulence levels) even. In this case, we can expect an FWHM of 1.5" to 2.0" at worst, or 75 to 100 pixels in width as the current numbers have it. The 256 by 256 square halo, on the other hand, translates to a conservative 5.12" by 5.12" square region on the object space. Subtracting the 32 by 32 inner breadth of the data region, this gives a 112 minimum pixel extent from an outer pixel of the 32 by 32 region to the edge of the halo, depicted as item 326 in FIG. 13. The idea here, verified by mathematical/empirical models and common sense, is that any given pixel "can be affected by" the object space contained in this halo, and therefore any "solution projection" from this small data region would affect the object estimate to at least this extent. The areas of the object space beyond this halo (the x% of light energy beyond this) will then show up as error signal, or "aliased" signal, within the overall system error budget. The choice of 256 by 256 in this example ensures that this "aliased signal" is in the few percent region and lower, down to the nominal design point of $r_0=7$ cm. The reason for the earlier "abstract" discussion on the concept of aliasing was to accommodate the idea that "frequency aliasing" and "border aliasing" are two intuitive sides of the same coin.

Figure 13A:
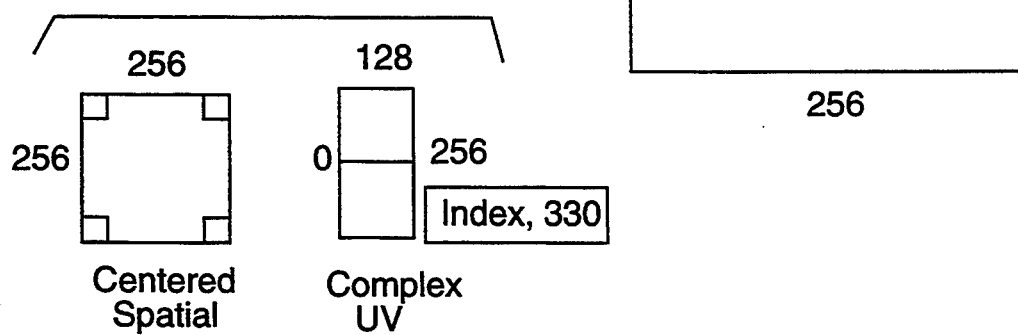
FIG. 13A is a representation of how these basis functions are arranged inside computer memory in an illustrative embodiment.

To finish the description of step 226, FIG. 10, which is further detailed by all of FIG. 13, we can note that the 32 by 32 data sub-zone 322 is centered inside the 256 by 256 halo 324. The corresponding UV plane 328 is there drawn as a 256 by 256 complex array (if only implicitly). It is more useful at this juncture to be more explicit about how to regard these entities as computational elements. In particular, FIG. 13A contains the basic in situ eneodation of these universal basis functions as they CAN be used on a computer (as is preferred by myself and as used in the preferred embodiment). Here, instead of envisioning the 32 by 32 data sub-zone 322 as centered in the halo, it is instead seen as 4 (16 by 16) data zones at the four corners of the 256 by 256 spatial halo. This is certainly not necessary but does help to simplify the UV plane representation by placing "the center of the data sub-zone" over the origin of the implicit fourier transform spatial domain. There are alternative ways to do this and many reference materials to choose from in helping to decide which one to use. Also depicted in FIG. 13A is the explicit recognition that the spatial domain is a real, as opposed to a complex, function and therefore only requires half of the UV plane to be fully represented, the other half merely being the mirrored complex conjugate (as is well known in the industry) of the displayed half. Finally, this process step keeps track of which data sub-zone is which (330), therefore being an indication of the relative shift that needs to be applied to the individual basis functions in comparison to the global basis functions of the solution space.

Turning now to FIG. 14, we find the full and specific process steps—or flowchart—for the software which carries out the standard operations depicted in FIG. 10. As with the case of the specific embodiment of the wide field Hartmann design in FIG. 8 in relation to the general design in FIG. 7, the flowchart in FIG. 14 will make specific choices of options outlined generally in FIG. 10. Prototype software and general implementation strategies have made use of the common software language known as "C," and therefore much of the presentation of the flowcharts conform to the basic concepts employed within that programming language. In particular, the use of callable "sub-routines" are used which then call forth other figures and descriptions, as opposed to describing these sub-routines in absolute linear execution format. The use of sub-routines also tremendously eases the discussions on the variants of sub-routines, since the discussion on variants can be confined to those appropriate sections and not overly burden the description of the main program itself.

The preferred embodiment comprises a computer program written, debugged and compiled which shall be called "main" 350, as is quite archetypical to C language computer programs. It is well known within the profession of software engineering that such a program as this could easily be a sub-routine inside a larger program, such as a graphical to text-based user interface program or a larger project organization program. Apart from whatever normal software engineering considerations which enter into the creation of computer programs, the first programming step 352 explicitly listed here is the generic step of declaring variables, opening input and output files, and otherwise allowing for the input from the user of variables which will modify the ensuing behavior of the program. The next step 354 is to allocate and clear (apply zeroes as initial values) the three arrays which correspond to the complex numerator and the real denominator of the universal basis functions 328 FIG. 13A. The preferred embodiment specifies these as four dimensional arrays of 2 byte signed integers, though the DENOM array could just as well be 2 byte unsigned integers since it will only contain positive values. These arrays could also be 4 byte floating point numbers or even 8 byte double precision values, where here they will be used as "encoded integers" meaning that implicit or explicit scaling values will be maintained relating the stored digital values to initial grey value scales in the input image data [This is a common software technique which eliminates the need to store values as floats merely for convenience; this is to say, there will be little to no information loss in storing the values in as compact a form as possible. In the case here, it can be seen that the array sizes can get quite large (i.e. 192 Megabytes), and a storage savings of 2X can be helpful].

These three arrays can be interpreted as a 32 by 32 array of 128 by 256 UV plane-elements: that is, the real numerator 356, the "imaginary" numerator 358, and the magnitude denominator 360. Implicit in these arrays is the fact that the Nyquist frequency has been thrown out, the opinion being that it is not worth the special programming attention it always seems to demand (including many "x+1's" on array indices). The meanings and formats of these arrays have already been described. The numbers indicated show that these are three 64 Megabyte arrays giving a total of 192 Megabytes. Relatively speaking, this is a large amount of memory needed and it is quite common to set up these arrays, in whole or in part, on "longer access" memory than the usual "fast main memory" of a computer. The choice has little relevancy, other than normal engineering and cost considerations, to the rest of the program. The next step is the beginning of a classic for-next loop 362. This loop cycles through the "E" digital sets of "speckle exposures" provided as input 214 FIG. 10. The implied character of such a loop is that when the last element of the loop is reached at the "next" statement 362B, the program resumes directly after that next statement [as is well known in the industry]. Bearing in mind the nature of how a loop performs, therefore, the first programming step inside the loop 362 is a global wavefront data reduction sub-routine 364 which will be described following the description of the main program. This global wavefront sub-routine 364 will be seen to have a choice of several methodologies which in general trade off accuracy with computation time (and other things as well, certainly). It is a normal function of engineering to optimize this trade-off. In general terms, the function of this sub-routine is threefold. First, it sorts out and processes the "digital images of the spots" 216, FIG. 10, into an array of complex pupil function estimates corresponding to each and every nominal field angle sample 306 FIG. 12. Second, it computes the "point spread function" corresponding to the field angle center points of each of the data sub-zones, using both pupil function "interpolation," the spectral characteristics of the lightwave 30 FIG. 4 as additional information (again, this will be described in detail later). Finally, it further processes this array of pupil function estimates into forms which the next loop 366 can with utmost efficiency utilize. The details of this last function of step 362 will be discussed in the description of the wavefront sub-routines. The output of step 364 is therefore either a set of digital values directly relating to an array of point spread functions indexed by position as in FIG. 12 (equivalently, its UV plane representation), or a set of digital values which further processes these numbers in manners to be described later.

Figure 15A:
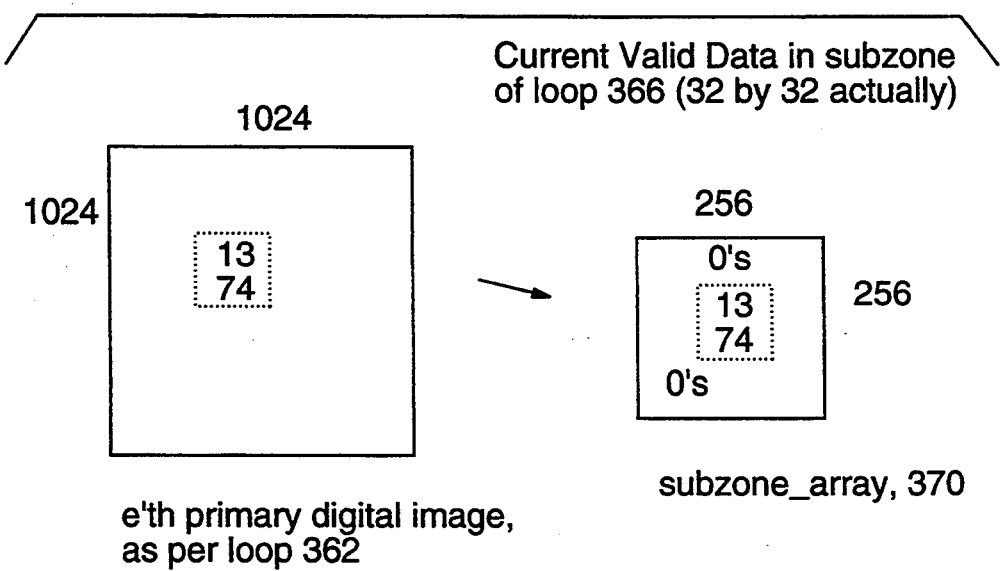
FIG. 15A is an assistance schematic, clarifying some of the process steps of FIG. 14.

The next step is what is commonly known as a nested loop or an inner loop 366. Here, all 32 by 32 sub-zones (320, FIG. 13) are looped through. It is a matter of software engineering preference whether this is viewed as, AND programmed as, a 32 by 32 array or as a 1024 linear vector. Depicting this loop with only one statement 366 implies that treating it as a one dimensional vector can simplify FIG. 14 itself. The next step 368 is to clear a 256 by 256 array of, either, 2 byte integers or 4 byte floating point values, the choice being dictated by storage considerations, execution time (for conversions mainly), and availability of appropriate "in-house" of "commercial" software for the ensuing 2D FFT routines. This 256 by 256 array in step 368 will be referred to as "subzone_array" 370. The next step 370 places the digital values contained in the current (as defined by loop 366) data region 320 FIG. 13 into either the center of subzone_array 370 as in FIG. 13, or into the four corners of subzone array as depicted in FIG. 13A. The choice is purely a matter of personal preference with some amount of housekeeping necessary in either case. FIG. 15A schematically depicts the operation of step 370, with the choice of loading the data into the center of subzone_array chosen for graphic simplicity. A two by two array of numbers rather than the full 32 by 32 array is also used for graphic simplicity. The next step is a conventional 2D FFT performed on subzone_array, where a very wide array of commercially available software can be utilized (all with varying software formats and data formats, but all within the normal scope of software engineering). The output (denoted by the = > symbol) of this operation will either directly be a 128 by 256 array of complex elements 374 (two digital values) or can be transformed using normal mathematical processing into such. Here, this new array is "conceptualized" as one array called "uv_array" 374, but as a programming element, it is stored as two arrays: uv_array_real[128][256] and uv_array_imag[128][256]. At worst, a commercial package will require a second 256 by 256 array of zero valued elements to be the "imaginary components" of the input image. An FFT output is then given as two 256 by 256 arrays, the real and the imaginary. uv_array 374 can then be constructed by considering only half of each of the two arrays, i.e. a 128 by 256 half of both the real and the imaginary array. Again, the "Nyquist" component is thrown out; or, it can be stored in the imaginary component of the DC element. All of this odd subtlety is quite well known in the art of image processing. The only practical point is to keep track of what one's own preferences are and what the 2D FFT routines require.

Next, step 376 calls the local wavefront sub-routine 376, whose output is a 128 by 256 array of complex values here called "rev_array" 378, also breaking out into rev_array_real[128][256] and rev_array_imag[128][256]. rev_array has precisely the same format as UV_array, only it will have different individual digital values determined in the local sub-routine 376. As noted in the discussion on the global wavefront sub-routine 364, the local sub-routine 376 also has a variety of methodologies to choose from which are (generally) intimately matched to the choice made for the global sub-routine 364. As such, both of these sub-routines will be discussed immediately after the discussion on the main program in FIG. 14. For our current purposes, it is sufficient to understand that the output array, "rev_array" 378, is a UV-plane representation of the complex phase "reversion" that will be applied to the local data contained in sub-zone array 370. VERY GENERALLY SPEAKING (to be clarified in the discussion on the wavefront sub-routines, and which was already clarified in the earlier sections on the mathematical background), rev_array contains the information necessary to reverse the phase distortion in the data, while also carrying information about the magnitude distortion which will be used in the ensuing weighted average [essentially the information on each UV plane element's intrinsic signal to noise level properties AND its magnitude "attenuation"]. For the purposes of the main program, however, we need only realize that rev_array and uv_array are identical in format and frame of reference.

A third "nested loop" 380 steps through each and every (two-valued complex) element of the matched arrays UV_array and rev_array. In other words, it loops a total of 128×256 times, or 32768 times. The first step 382 inside this loop 380 is to perform a complex multiplication of the current complex value in uv_array 370 by the corresponding complex element in rev_array 378, where current is defined by the index on loop 380 and the complex multiplication is obviously performed on the real and imaginary components of those arrays. The resulting complex value can be designated as the matched pair (RE,IM) 384, being floats, doubles, or integers as the case may be. Step 386 assigns the variable "mag" 388 to be the sum of the squares of the two values RE and IM, i.e. mag=$RE^2+IM^2$. It should be emphasized that this is the square of the complex magnitude of the complex variable (RE,IM) 384. Step 390 converts whatever working data format (ints, floats, etc.) was used during the preceding calculations into values compatible with the three arrays NREAL, NIMAG, and DENOM; 356, 358, and 360 respectively. Step then adds RE to the existing value of NREAL[ . . . ], IM to NIMAG[ . . . ], and MAG to DENOM[ . . . ]. It is understood that the index values on the three arrays correspond to the current values defined by the loops 366 and 380. The exact operation in step 392 corresponds to the "C" language "+=" operation, i.e. NREAL[][][][]+=RE; etc.

After step 392, we encounter a cadence of "next" steps for the loops 380B, 366B, then 362B. After the last iteration of loop 362 is completed, i.e. after all digital exposures have now been cycled through, the pertinent result is that the three arrays NREAL 356, NIMAG 358, and DENOM 360, are now completely filled with the numeric information corresponding to the complex numerator and real denominator of the weighted average on each and every universal basis function 328 FIG. 13. The next step 394 is to allocate and clear a new array to be named image_estimate[1024][1024], here explicitly being a two dimensional image estimate (spatial domain) with array sizes matching the primary detector array size. Again, clearing means placing zeroes as initial values for all elements of the array. This clearing is important since there will be an ensuing accumulation process expecting null values to begin with.

The next step is to enter a loop 396 which once again steps through the 32 by 32 array of data sub-zones. Indeed, loop 366 could have been used here with an "if last exposure, then" statement in front of the "next" statement 366B, but this current arrangement is more clear. The next step 398 is a new nested loop, stepping through each and every UV plane element of the current data subzone. It can be seen that loop 396 and 398 merely step through all indices on the NREAL, NIMAG, and DENOM matrices. Step 400, inside the nested loop 398, once again makes use of the (temporary) 128 by 256 complex array "uv_array" 374, assigning the real element, uv_array_real, with the division of NREAL[current] by DENOM[current] and assigning the imaginary element, uv_array_imag, with the division of NIMAG[current] by DENOM[current].

There may or may not need to be data type casting involved if the division is better performed by floating point arithmetic and NREAL, NIMAG, and DENOM are not already in that format. Also of note in step 400 is the addition of an element called "filter[][]" which is essentially a scalar quantity referred to in box 245 FIG. 10. In cases where a Weiner-like filtering of the final image is preferred, the division by DENOM becomes purely a function of DENOM as is the common Wiener method in the image processing community. The closing "next" statement 398B of loop 398 is then encountered. The result of completing loop 398 is that uv_array 374 now contains the UV plane representation of the weighted average of the current data subzone's basis functions. Effectively, this is the current (indexed by loop 396) data subzone's contribution to the final image estimate 224, FIG. 10. [As an aside, the image estimate f could just as easily have been a 512 by 1024 complex array, i.e. its UV plane representation. In that case, step 404 about to be described would have been a complex multiply rather than a spatial shift. As usual, the spatial domain approach was chosen not only for simplicity, but also to better understand the effects of data borders.] There is one practical problem with uv_array 374 at this point: detailed analysis will show that it represents a "full" deconvolution, meaning that it attempts to bring ALL frequency components up to Nyquist (or the diffraction limit, if you prefer) back to their original magnitude. In other words, it is trying to estimate the object up to the absolute informational limits set down by the solution grid spacing and image extent. What is much more appropriate at this stage, however, is to merely attempt to estimate the object to the resolution level that the underlying diffraction limited telescope would permit as if there were no obscuring atmosphere. This means that uv_array 374 should be "filtered" using a (digital) Airy disk (or the annular equivalent; or whatever). Ultimately, the choice of filtering is wide open. Filtering uv_array 374 with the natural optical transfer function of the underlying telescope is merely the clearest nominal choice. It could as well be a fully symmetric gaussian distribution with a spatial FWHM in the same neighborhood as the FWHM of the telescope's inherent Airy disk. Therefore, step 401 performs this filtering via a multiplication in the UV plane, as is quite common. The multiplication is generally with a real symmetric function such as a gaussian of the OTF of the underlying telescope. Importantly, the ultimate purpose of filtering at this point rather than fully at step 410, is that otherwise there will be a much higher signal content "wrapping" around the 256 by 256 boundaries. i.e., the signal level does not subside enough by the time it reaches the boundaries in the ease of the unfiltered uv_array 374. This can create additional error in the final image estimate f 394. Step 402 then performs an inverse FFT on uv_array 374, turning it into a 256 by 256 spatial domain representation "subzone_array," 370, where we make use of that earlier (temporary) array name. The inverse 2D FFT f routine usually would be a part of the same off the shelf type library routines used in step 372. Loop 404 then adds subzone_array 370 into image_estimate[][], taking care to add it while referenced to the center of the data subzone, throwing out values which exceed the image estimate borders, AND taking care to unshift it out of the form depicted in FIG. 13A, IF that was the form of storage chosen. [The format of FIG. 13A may seem somewhat awkward at this point, but discussion on advanced methodologies in creating "rev_array" 378 sheds some light on how this shifted form can be useful.] FIG. 15B graphically depicts loop 404. In this figure, the 256 by 256 array "subzone_array" 370 can be seen centered over the original data region from which the subzone itself derives; hence the offset 408. This all is within the context of the entire 1024 by 1024 image_estimate. An additional consideration deriving from the presence of a data boundary is also alluded to in the picture and deserves a brief tangent.

Figure 15B:
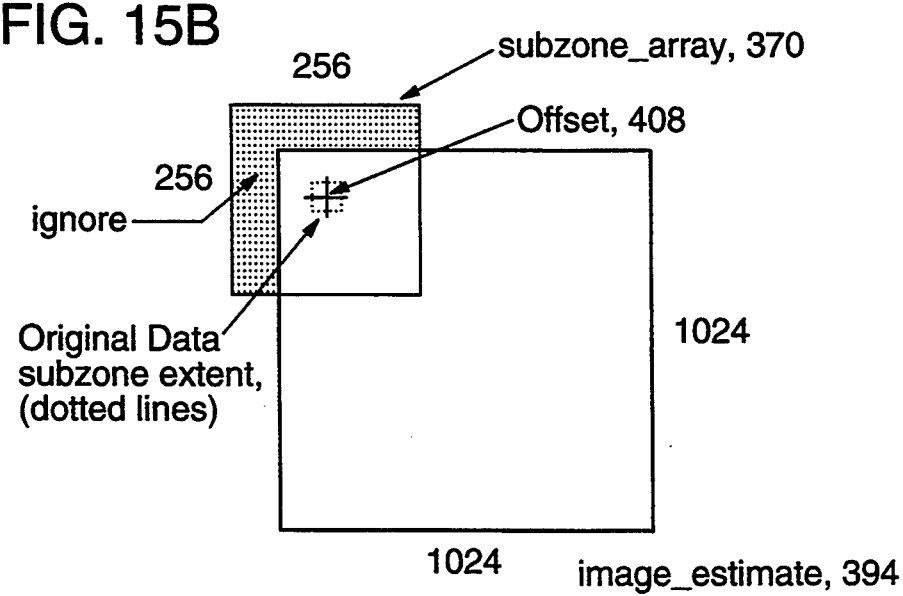
FIG. 15B performs a similar clarification on another programming item.
Figure 16:
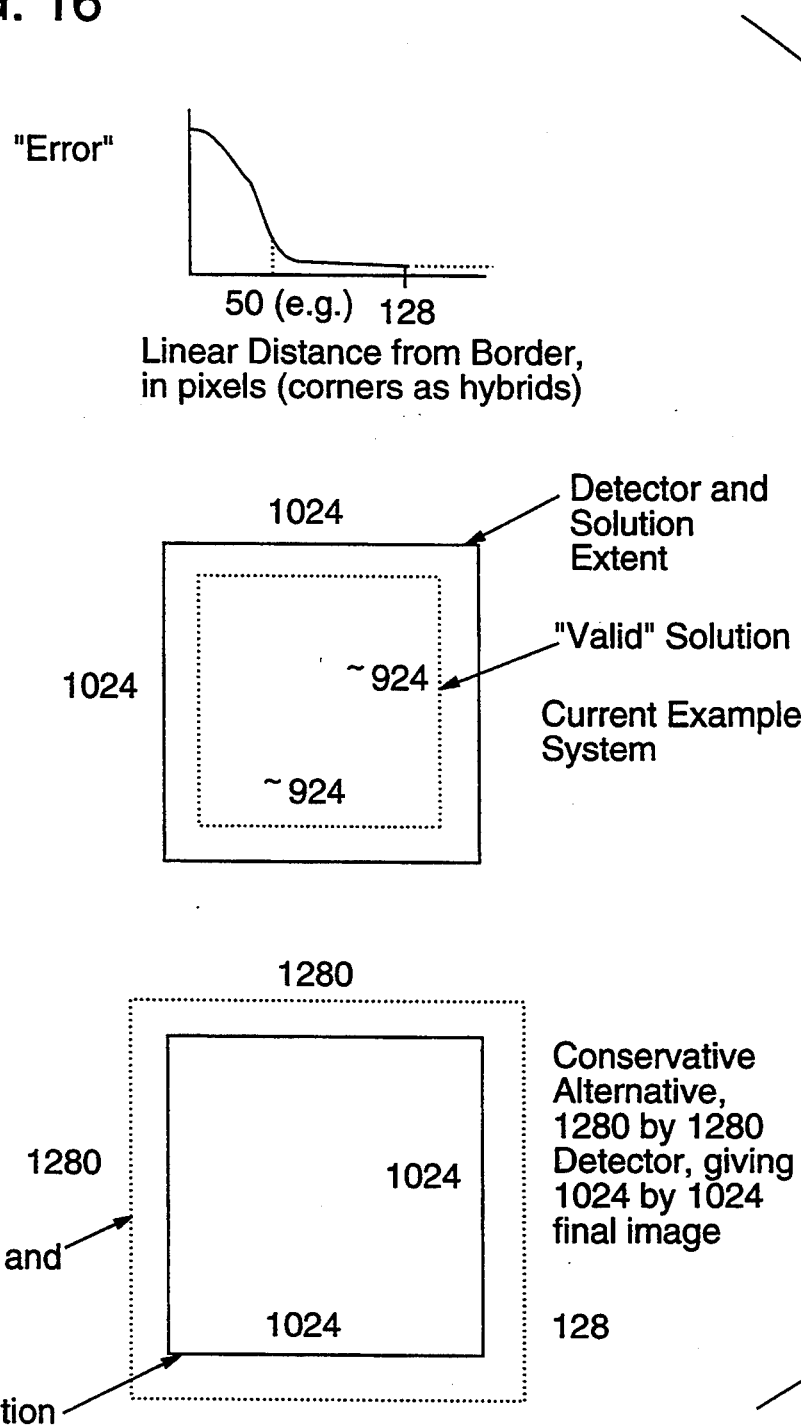
FIG. 16 displays some of the general characteristics of "the border problem" referenced herein.

It can be seen in FIG. 15B, and noted by step 406 inside the loop 404, that the portions of the shifted subzone_array which fall outside of the 1024 by 1024 boundary of the image estimate are merely ignored. This disclosure refers to this manner of dealing with data boundaries as the "fundamental spatial domain boundary method." It is truly a point of departure for a wide range of philosophies and methods which can be brought to bear on this well known problem. As a point of comparison, had I chosen the fourier representation of f and the complex multiply in the UV plane as my "shifting method," I would have wound up with what this disclosure refers to as the "fundamental frequency domain boundary method," wherein the parts of subzone_array which are "thrown away" in the spatial domain method would be "wrapped into" image_estimate in a mirrorlike fashion on opposite sides of the 1024 by 1024 boundary of image_estimate. In a crude sense of conservation of energy, the fundamental fourier method is preferable, but the spatial domain approach was chosen here once again for its ability to explain the basic boundary problem, its implications, and to provide an intuitive base to derive preferable (though generally more complicated) optimized solutions. To state the basic problem in intuitive English, objects which are inside the estimate boundary of f will have some fraction of their light energy fall outside of the physical detector 8, FIG. 1, with a generally larger fraction as an object is closer to the projected geometric boundary of that detector; the information carried in this light energy is lost. Likewise, objects outside the projected geometric boundary will have some fraction of their light fall within the physical detector 8 and will, in general, generate eventual "aliased" signal components (using quasi-informational terms). The implications of this problem can be conveniently split into two categories closely aligned to the underlying applications of the imagery itself. We can refer to these as 1) quantitative and 2) qualitative. In the approach toward creating "better" solutions to the boundary problem than the "fundamental" one, there are some common denominator elements and some unique elements relative to these two basic categories. We can scratch the surface of these for the sake of completeness of this disclosure, but the bulk of refinement once again falls under normal engineering (and scientific, to be sure) refinement. The simplest and most intuitively applicable description on the basic implications of the boundary problem is graphically contained in FIG. 16. This figure is deliberately "non-quantified" other than the pixel extent numbers. It merely has a plot of "general error" as a function of linear distance of a solution pixel from the solution border. A note is made on how corners will have compound effects. At a distance of 128 pixels, half of the extent of our universal basis functions, the error reaches a uniform level solely related to the fixed finite size of the universal basis function. Crudely speaking, the curve is related to the integral of the long exposure point spread function. At least from the qualitative standpoint, a rule of thumb "implication" falls out from this whole discussion on the boundary problem: Consider the solution region within a distance of the long exposure FWHM (full-width half maximum) from the border to be corrupt and throw it out. Thus, in the example of the specific case preferred embodiment, the FWHM is 1 arc-second in $r_0=10$ cm seeing, or 50 pixels in extent on our 2.5 meter telescope system at 500 nm; so we would consider the "qualitatively acceptable" solution to be 924 by 924 pixels in extent (50 pixels subtracted on all sides, corners subtleties ignored). The second drawing in FIG. 16 depicts this graphically. Individuals experienced in the imaging art will see this for the "arbitrary" definition that it is, but at the same time, may accept the value of having simple rules of thumb such as these in order to simplify the bigger picture. One final note is that a practical problem emerges of the difficulty that now exists in maintaining a power of two format for the data. Subsequent data analysis will not now have 1024 by 1024 of "valid" data to work with. It is quite a tempting option, then, to have a primary detector which is slightly larger than 1024 by 1024, say 1280 by 1280, and then always shoot for a "valid" data region of 1024 by 1024 (for instance). This then shifts the power of two "problem" to earlier stages of processing in FIG. 14, AND brings up the difficulty of finding commercially available detectors, frame grabbing RAM, etc. [The "power of two" desire is driven both by software and hardware considerations.] Fortunately, this is all well within the realm of normal (but tedious) engineering and science. The disclosure of the invention will leave the topic of the boundary problem at this much said, the essentials having been presented.

Finishing up with the main program and FIG. 14, the loop 404 and its main processing component 406 adds the values of subzone—array into image—estimate, with the "offset" 408 determined by the current index on loop 396. Step 404B closes the loop, thereupon encountering the next statement 396B for the loop 396 which is cycling through the data sub-zones. The entirety of loop 396 can be seen as stepping through each data sub-zone, finding its weighted average contribution to the final estimate, then adding that contribution to an accumulating image—estimate 394. After the loop 396 is completed, there is an optional (additional to 401) filtering step. Using this "post-filter" is quite common, and in the context of this invention, can be helpful in attenuating anomalous signal caused by the artificial truncation of the data field into 32 by 32 pixel regions, likewise with the use of a 256 by 256 basis function extent, and even possibly residual effects of the "optical" sampling artifacts caused by the fixed wavefront sampling by the Hartmann camera. These "error sources" once again should be placed into the context of an overall system error budget, thereby driving decision IF and HOW to use this optional post-filtering step 410. These error sources can be "attenuated" by other means obviously, such as through refined choices of universal basis functions, refined methods of computing rev—array 378, and so on. We finally reach the output, then, a "diffraction limited" image if we must use the vernacular. Again, practitioners of the art will realize that the use of the term "diffraction limited output" is arbitrary, and other more technical ways of describing the output would be: "highly improved strehl ratio image" or "greatly enhanced OTF imagery" or "quasi-Wiener filtered image" (if S/N ratios help determine the ultimate transfer profile), and so on. The last item mentioned here, the "Wiener" aesthetic, is the one that I generally use at least at the conceptual foundations, it is the one that relates the core of the results. Nevertheless, the broader astronomical community is more comfortable with the "diffraction limited" terminology or some equivalent.

THE WAVEFRONT ESTIMATION SUB-ROUTINES

There are two reasons that these sub-routines are split out into their own section. First, they are generally quite specific to a Hartmann type wavefront camera in particular and to atmospherically distorted imagery in general (as opposed to the most basic category of "distorted digital imagery"). Second, they are relatively involved and contain their own alternative methodologies (generally based on the typical "accuracy vs. resources" engineering dynamic) and therefore they would have diluted the discussion on the main program to the point of unintelligibility. Now that the rationale for this has been stated, we can turn once again to the specific preferred embodiment which is based on Hartmann "spot" data being the input data 216 in FIG. 10. Recall, also, that our specific design of FIG. 8 posits an 8 by 8 array of sampled field angles. One final note is that those experienced in the art of "traditional" paraxial type Hartmann wavefront sensors are aware of a wide range of processing methodologies and other practical techniques that are generally available in the public literature. There is no attempt made in this disclosure to go into detailed discussion on these methods. Instead, reference will be made to items which belong to this wealth of pre-existing art, and only those items which are unique to this invention, or those items which are part of the prior art but which have an intimate relationship to those items which are unique to this invention, will be discussed at length and in detail. Overall reference is here made to Southwell, "Wavefront estimation from wave-front slope measurements," J. Opt. Soc. Val 70 No. 8, p 998-1006 and to Herrmann, "Least—squares wave front errors of minimum norm," J. Opt. Soc. Am. Vol 70 No. 1, p 28-35 as excellent treatments of the basics, where each of these articles in turn have several other pertinent references. Concerning more recent "refinements" to the basic techniques involved, reference is made to Cho & Peterson, "Optimal observation apertures for a turbulence-distorted wave front," J. Opt. Soc. Am. A, vol 6, no 11, p 1767-1775.

FIG. 17 depicts a simple overview of the wavefront distortion methodology. It is specific to the use of the Hartmann camera as mentioned. It is important to point out that the end product of this entire wavefront section and the described sub-routines is to create the complex array "rev—array" 378, FIG. 14. The wavefront methodology can be split into three procedures as depicted in FIG. 17, the first of which being further split into MacroCalibration and MicroCalibration as rubrics. The calibration operations are essentially independent from the main program outlined in FIG. 14. It is a procedure which (ideally) will be performed only as often as system performance requires: perhaps once a day, or perhaps once a month even for MacroCalibration, but certainly after particular physical changes have taken place with the overall camera system 2, FIG. 4. The calibration procedure as a whole outputs a file of calibration information which will be used by the two remaining procedures, both of which are sub-routines in the main program of FIG. 14. The overall purpose of the calibration procedure is to determine the nominal (Macro) and estimated instantaneous (Micro) centers (null positions) of all the Hartmann spots, find out which field angle in the array of field angles that each spot belongs to, match up each spot to a nominal location in the pupil plane, and to determine at what point is a given spot "on or over the practical edge" of the pupil plane and not getting enough signal level relative to the other spots. This last task is referred to as finding the "good spots." The second procedure of the three in FIG. 17 is called the global wavefront sub-routine and has already been discussed in general within its role as step 364 of the main program 350, FIG. 14. FIG. 17 restates its overall purpose and the ensuing discussion will fill in the details. Likewise, the third procedure listed in FIG. 17 corresponds to step 376 in FIG. 14, and likewise, it will be discussed in further detail. As can be seen in FIG. 17, the three procedures comprising the overall wavefront distortion methodologies are arranged in increasing frequency of usage in the normal operation of the invention. The distinction made between these three already crosses the line into engineering efficiency detail, that is, it splits out the overall wavefront sensing requirements into initial stages of computation time management. We shall now discuss each procedure in turn.

Of all the three procedures listed in FIG. 17, the calibration procedure is most affected by which type of Hartmann camera system is being employed. The splitting of the calibration into two delegates the bulk of the work to the Macro routine, while the Micro routine "fine tunes" the estimates of the instantaneous spot center references. Three particular choices of Hartmann camera system design were detailed earlier in FIGS. 4, 6, and 7, being the simple configuration wide field model, the 2X model, and the "full" model respectively. Conceptually speaking, the task given to the Macro Calibration procedure in FIG. 17 is simple. It can be stated as: For each and every spot contained in an "typical" digital image from the Hartmann Camera system (input 216, FIG. 10):

1) find which field angle it belongs to, and to which nominal area in the pupil plane does it correspond.
2) find its nominal "averaged" center location (or zero-slope reference) as a function of the pixel grid on CCD 10, where the center is found to fractions of a pixel spacing—as will be discussed.
3) determine if its nominal center point on the pupil plane is too close to, or over, the edge of the pupil support, thereby precluding a spot from being considered a "good spot"; that is to say, its inherent sensitivity will fall below some pre-determined threshold.

Additionally, each field angle in the array of sampled field angles needs to be matched to particular location on the primary CCD 8, FIG. 4. We can refer to this broadly as the positional correlation of the two input data sets 214 and 216 of FIG. 10.

Using these three tasks as guidelines, and the need for positional correlation as the parallel companion, much of the macro calibration belongs to the realm of common sense and basic engineering. There is obviously a great deal of regularity in the arrangement of the spots. Contrarily, there may also be subtle deviations from this regularity which, especially in the case of the full Hartmann camera system of FIG. 7, would require a rather involved software scheme for "keeping track of the spots." It should be pointed out that prior art (paraxial) Hartmann sensors already must deal with, and have already come up with fine solutions for, a somewhat simpler form of macro calibration. It is "somewhat simpler" due to the fact that there is only one field angle involved, where in the wide field case there are interlaced field angles—multiply interlaced in the 2X and full designs. Referring back to FIG. 4B, it contains the simplified version of the interlaced field angles for a 4 by 4 field angle sampling Hartmann camera system (simple configuration). The idea of spots "fading out" as opposed to abruptly stopping is roughly drawn in as well, suggesting the need to threshold the "good spots" from the bad ones. [Again, paraxial prior art already has developed solutions for this type of problem. Also, yet another reminder should be made that the clear circular fade out in FIG. 4B would actually be more of a fade out of the squares as a unit, not the individual spots within the 4 by 4 sub-groups.]

The preceding discussion and FIG. 4B are quite sufficient to map out specific software embodiments. Be this as it may, a description of further considerations is in order, and detailed descriptions of an "inefficient but thorough" output file will be presented in order to mesh sufficiently with the discussion on the micro calibration and the two remaining procedures depicted in FIG. 17.

It might be possible to design the Hartmann camera system with such tight opto-mechanical tolerances that much of the macro calibration could be performed "by design." This is to say, the physical tolerance would unambiguously assign spots to field angles and pupil positions, and field angles to primary CCD (8) pixel locations. This would generally involve micron level tolerances for some components, such as the CCD relative to the lenslet array, and slightly eased tolerance on other components. It would be yet more difficult to accomplish this for the 2X and the full models. It is equally probable that this kind of ultra-precision—for this particular "need" at least—is not necessary. What is more needed is in-operation rigidity rather than absolute accuracy. Even this need for "rigidity" is contingent on whether or not "engineering methods" such as the micro calibration are available and economical. In any event, one extremely simple method for assigning spots to field angles (as a first task) is to "scan" a bright star in and around the paraxial field angle of the telescope. Those experienced in the art of telescope operation will understand that, assuming we gather nominal digital exposures, the bright star will variously "light up" the interlaced arrays of spots belonging to the individual field angle in which the star currently is positioned. Provided that the bright star is positioned such that it is sufficiently centered in a given field angle, those spots belonging to that field angle readily manifest themselves. If it is not centered, either no spots light up, or two "sets" of spots will light up such as in the full model of the wide field Hartmann design, when the star falls at the border of two (or four!) regions. Once a bright star unambiguously lights up a single array of interlaced spots, standard prior art methodologies can treat those spots as if they were from a normal paraxial Hartmann sensor, find their nominal centers (over an ensemble of exposures), find their "fade-out" characteristics, and assign an offset to the spots relative to the known pupil plane support. It can be seen that this last procedure accomplishes all three tasks listed above. Again, once the spots are identified which belong to the same field angle, prior art Hartmann techniques can be used almost verbatim. It remains to establish positional correlation between the field angles and the primary CCD.

During the above "scanning of a bright star," the primary CCD 8 should be recording a "centroid record" of the position of the bright star during each exposure in the series of exposures taken during the "scanning." Realizing, then, that what we are now looking for is the nominal center point of a given field angle as projected onto the primary CCD, we realize that there are a variety of ways we can establish this estimate. Perhaps the simplest (conceptually, at least) method would be to isolate a given field angle and to make very small steps of position of this bright star within this field angle. Two data points are collected during each exposure: the position of the centroid of the bright star on the primary CCD, and the total brightness of all of the spots belonging to that field angle. [The centroid is part of the bread and butter of the prior art in paraxial Hartmann sensors. Briefly, it establishes the center of gravity of the brightness distribution of a given array of digital values, where that array of digital values is usually peaked and quasi-symmetric. It typically finds a resultant "center" to fractions of a pixel, i.e. one tenth of a pixel or, as a current practical limit, one hundredth of a pixel.] After randomly moving the star in order to create a sufficient ensemble of data pairs in this fashion, a new quasi-symmetric profile manifests, and any number of methods can be used to determine the center of this distribution including another centroid-like operation or a "peak-finding" operation. The end result is that each field angle [n,m] (n=1 to 8, m=1 to 8 in our specific 8 by 8 example) is assigned a subpixel resolution position on the primary CCD. It should be clear to those practiced in the art that a wide range of engineering refinements can be applied to the above procedures, most definitely including manners of software efficiency and manners of deducing overall patterns rather than doggedly measuring each of the 8 by 8 sampled field angles.

Let us now clearly define the required output of the macro calibration routine, realizing that the above discussion is sufficient to outline how this output is generated. The use of the "C" struct variable type is enormously helpful in this context. The output can be seen in its most thorough (but probably inefficient) form as:

```
OUTPUT CALIBRATION FILE 420
    sruct field_angle[8][8] {
        float x_CCD_position, y_CCD_position;
        int number_spots;
        float x_Hartmann[number_spots],
        y_Hartmann[number_spots];
        float x_Pupil[number_spots],y_Pupil[number_spots];
    }
```

The reason that this is "inefficient" is that no allowance is made for the regularities involved, regularities which could be exploited for reduction in storage and computation time. Nevertheless, this disclosure shall use this as the foundational approach. The output is arranged as an 8 by 8 array of structures, each with the associated elements inside the brackets. Each field angle has a nominal center point on the primary CCD stored in the first floating point values listed. The second line contains one integer value which gives how many "good spots" were found for this particular field angle. Note that this allows for each field angle to have a slightly different number of good spots than the ensemble average. i.e., field angle X may have 120 good spots, while field angle Y has 122 good spots. The third line contains the x and y coordinates of the nominal "ensemble average" center location of all the good spots for this field angle. It has "num_spots" number of floating point values referenced to integer pixel locations on the CCD 10 FIG. 4. The issue of finding the best "center" of these spots is clearly a matter for normal engineering; what we can say about it here is that, ultimately, these center points will represent the "zero wavefront slope" condition which is well known in the prior art of Hartmann sensors. As with these prior art sensors, there will always be the need for a reference from which to determine the instantaneous wavefront slope. The use of ensembles of spot image realization across many field angles increases the statistical resolution of the ensembling technique, in relation to system which use reference beacons to help track the instantaneous null positions of the spots. The last line in the output structure is the corresponding nominal center of each spot in the conjugated pupil plane. This too is an x/y floating point array of elements, "num_spots" in size. The indices on these arrays and on those of the preceding line correspond to the same spots. The reference scale of the pupil plane is rather arbitrary, where one can easily use standard metric units and assign the x/y axes in any orientation that one pleases. The only practical matter involved with scaling is to keep track of the relationship between the pupil reference scale and the primary pixel reference scale, relative to the primary beam center wavelength; but this matters little at this point.

FIG. 18 takes a closer look at the situation obtaining for the specific preferred embodiment. It can be noticed that the top drawing in FIG. 18 corresponds to the appearance of a digital image deriving from the full or "4X" beam splitting Hartmann camera of FIG. 7. In particular, it depicts the (nominally optimized) configuration as would appear for the 2.5 meter telescope, utilizing a 2048 by 2048 CCD array as the specific focal plane array 10, FIG. 4 (i.e. the example system, see FIG. 8 once more). Calculations will show that there will be a little over 1000 "good spots" per field angle, giving a total of over 4000 floating point values per field angle in the above calibration structure, with the structure itself being an 8 by 8 array. This winds up being about 1 Megabyte of calibration information if our floating point entities are 4 bytes in size. [A reasonable size; besides, remember that good engineering practices can hugely reduce this by exploiting the regularities.] The middle drawing 430 blows up a small section from one of the pupil-images-turned-to-spots from one of the 16 beams. The bottom drawing 432 then further blows up this middle drawing, focusing in on mean iso-intensity lines for two neighboring spots overlaid on a pixel grid pattern (using the nominal 5 by 5 pixels per spot allocated in the nominal design). Note that these intensity distributions are polychromatic according to the spectral properties of the Hartmann light beam and the CCD sensitivity, FIG. 12A. They are also intended to represent non-turbulence high brightness conditions, whereas FIG. 4B already showed the in-operation movement of the centers of gravity of the spot images. Their "FWHM" isolines (50% @436) are seen to be a bit wider than the pixel sizes and their 2%-of-peak isolines appreciably overlap. This is drawn arbitrarily here please remember, where each specific design may find different isobrightness results; i.e., these are as usual drawn for expository purposes. The purpose of highlighting the overlap of the brightness distributions is to illustrate that "spot crosstalk" will in general be a more central issue in the wide field Hartmann cameras than in the design of prior art paraxial Hartmann wavefront sensors. In fact, it is the spot crosstalk issue which drives many of the practical limitations of the wide field Hartmann camera in general. In particular, it limits the fineness with which the field angles can be sampled. The fact that the FWHM is comparable or larger than the pixel size is quite open to engineering refinement as well. FIG. 18A, very much like FIG. 4B, then depicts a hypothetical in operation distributions of the spots in a high brightness situation, except this figure draws the iso-brightness lines 436 [as opposed to FIG. 4B and the centers of gravity. These lines are referenced to the peak brightness at the center of the spot]. The vectors drawn are from the quiescent nominal centers (the +'s 434) to the instantaneous center of the spot. This vector has been generally accepted as being linearly related to the wavefront slope existing at the lenslet subaperture (see Southwell previously cited), and hence becomes the core information carrier of the phase-difference measurements of the complex pupil functions (exactly as with the prior art paraxial systems). This in-operation situation, and the issues of spot cross-talk and low photon counts, will be discussed in the two remaining sub-routine discussions. It is the purpose and methodology of the micro calibration which can now be discussed. Very simply, the micro calibration "fine tunes" the estimation of the quiescent center points of the spots relative to the more coarse estimates created during the macro-calibration. The purpose of this micro calibration and its methodology are essentially equivalent to prior art paraxial Hartmann sensors. As such, only an overview will be stated here. After a telescope system has been configured according to FIG. 2, and after the macro-calibration has been performed, the instrument will of course be utilized on real objects. The movement of the telescope from one object to another, the "small" relative movements of the components of FIG. 2 as an object is "tracked," and the change of interchangeable components giving rise to component movement, all contribute to small changes in the position of the nominal non-turbulent (zero wavefront slope) spot centers from those found during macro-calibration. It is thoroughly impractical to re-perform macro-calibration for these small changes, thus, some method of "micro-calibration" may or may not need to be performed, all depending on how these movements play out in terms of the system error budget. The range of solutions that can be brought to bear on this "need" for micro-calibration is again wide, with much to be outright borrowed from paraxial Hartmann sensors systems. This disclosure will present yet another simple minded methodology, leaving more detailed solutions for engineering studies. The idea behind this micro-calibration is that the full wide field Hartmann design of FIG. 7 can be considered sufficiently rigid for most applications, and thus the only movement of nominal spot center locations will be a global "x-y shift," or offset, which will be applicable to ALL spots. Thus, those practiced in the art will recognize that mis-calibration will only affect the global tip-tilt estimate of the pupil function (the second and third zernike coefficient). If a given Hartmann system is found to have more than this simple form of "error" between the nominal spot centers and the true instantaneous (quiescent) centers, then these can be modelled as zernike coefficients and treated the same as the tip-tilt is about to be treated. Assuming, then, that it is only the global tip-tilt correction which is sought in the micro-calibration, it would be possible to keep a global average of the spot locations across a large ensemble of short exposures, say 100 exposures or more. The macro calibration would have given its own global ensemble average. As the system operates, this "floating average" is always compared with the macro-calibration average, and the difference is always accounted for as the "micro-calibration" to the nominal spot center locations as given by the macro-calibration stage. The ensemble should be large enough so as to not add its own tip-tilt noise to the ongoing system performance, but small enough to meaningfully measure whatever slow drift there is in the tip-tilt parameter. Another more sophisticated method of micro-calibration would use a bright isolated star somewhere in the field of view as a kind of anchor point in a larger feedback loop in the main program in FIG. 14. However, these kinds of solutions go beyond the scope of this disclosure and are largely connected with optimizing overall system performance, rather than enabling operational performance. It can be seen that both of these above ideas would run in a parallel fashion to the main program in FIG. 14, feeding updated "offset information" to all of the spot center variables contained in the (third line) of the above calibration data structures. This disclosure will leave the micro-calibration issue at this much said, suggesting that the literature on paraxial Hartmann systems be consulted for further ideas.

We can now turn to discussing the second procedure, "step 2," in FIG. 17, the "global wavefront sub-routine" 364 of FIG. 14. During the discussion on the main program 350, FIG. 14, it was stated that this global wavefront sub-routine has three general tasks to perform. Reiterating, they are: 1) sorting out and processing the "digital images of the spots" 216, FIG. 10, into an array of complex pupil function estimates corresponding to each and every nominal field angle sample 306 FIG. 12; 2) computing the "point spread function" (and/or its UV plane conjugate) corresponding to each of the center points of the data sub-zones 320, FIG. 13, by "interpolating" the pupil functions onto the field angle corresponding to the center of each data sub-zone, also using the spectral characteristics of the lightwave 30 FIG. 4, depicted in FIG. 12A, as additional information; and 3) further processing this array of point spread function estimates into forms which the loop 366, FIG. 14 can with utmost efficiency utilize.

FIG. 19 can help better explain how these general requirements are implemented. The first step 500 of FIG. 19 is a non-processing step which clearly describes the input data to the overall global wavefront sub-routine. Recall that this sub-routine is called for each and every exposure in the main program, FIG. 14. Thus the input data can be seen as 1) a single "digital image of spots" such as is depicted in the top drawing of FIG. 18, and 2) the calibration data structure 420 as described earlier. [From here on, it will be assumed that if a micro-calibration procedure is utilized, it will function in parallel to the main program and will effectively update the calibration data structure as required, and the global wavefront sub-routine need only reference the stored center references and be assured they are the latest estimates available.] The first processing step in FIG. 19 is a loop 502 through the 8 by 8 array of sampled field angles. The ultimate function of this loop is to determine the complex pupil function estimate at the nominal center points of each and every field angle in the 8 by 8 array. [Advanced approaches to the problem would not pose the situation quite in these terms; instead, they would pose the task as "deriving a new set of spatially filtered but discrete" complex pupil function estimates. The distinction derives from the tension between ease of explanation and setting up system optimization. This disclosure will continue to err toward the former (ease of explanation) since there is no loss of "enablement" by doing so, and the advanced optimizations can merely be seen as post hoc refinements, described after the basic enablement is finished.] Step 504 does pay some lip service to the potential parallel micro-calibration, where whatever updates are required to the zero wavefront slope spot center references, the null positions, (third line in calibration data structure 420) can be applied at this point. Step 506 begins a nested loop through the number of spots, "num_spots," for the current field angle as given in the calibration structure. The first step 508 inside the nested loop 506 is effectively a small sub-routine, but we can discuss it as one operation here since it is derived from common sense. Essentially, it finds the integral pixel value of the closest "peak" to the nominal center point of the current good spot (remembering that the nominal center is defined in the calibration data file structure). The "peak" can be defined as "a brightness value over a certain threshold with its neighboring pixel brightness values all lower than itself" (as I said, common sense; moreover, prior art Hartmann sensors routinely utilize such processes as these). Those practiced in the art of image processing will realize that there are certainly subtleties involved with defining this peak and conditions which would confound certain algorithms which search for local peaks. Complete spot overlap of neighboring spots, identical brightness values next to each other, AND local maximum caused by low photon count noisy data are common conditions which come to mind. Nevertheless, the preferred embodiment of the invention merely requires an algorithm that will "find the nearest peak" whether it is the "right one" or the "wrong one." The engineering idea is simply "design the peak finding algorithm, and more importantly, the nominal spot separation dimensions (of the physical Hartmann design), such that X % of the time the peak finding algorithm finds the correct peak for a given level of turbulence." X% should typically be in the 99% region or above. For our purposes at this stage in the disclosure, step 508 merely finds the closest peak and calls it good—where the overall system performance realizes that it will be wrong a small percentage of the time: (100-X)%. Step 510 then performs a "local centroid" about the peak pixel thus found in step 508. A local centroid processing steps are then described in FIG. 19A, where a nine pixel neighborhood is utilized in the calculation (the peak pixel and its 8 adjacent neighbor pixels). The variable "low" 474 refers to the lowest brightness value among the nine pixels. The variables px[] and py[] in step 482 can take on the values −1, 0, or 1, according to their x and y positions about the central pixel. The resultants, xcenter and ycenter, will be found within fractional pixel position precision, and are returned in reference to the offset of the central pixel of the input 3 by 3 array. Those practiced in the art will once again notice that spot cross-talk can significantly affect the results obtained by this operation for that percentage of spots whose "instantaneous centers" come within a two pixels of each other. Indeed, the cross-talk effects are ever-present. This disclosure will have an extended exploration of this topic immediately following the current section on the core wavefront sub-routines, FIG. 17. For now, we will accept whatever "error" is induced by step 510, FIG. 19, and the 9-point local centroid as part of the system error budget. Step 512 then loads the two (temporary array) variables grad_x[] and grad_y[] with the respective differences of the measured centroid and the nominal "zero slope" center. The temporary arrays grad_x[] and grad_y[] both have "num_spots" number of elements corresponding to all the good spots of the current field angle, and the current refers to the loop 506. Step 514 is an optional system diagnostic step, where a warning flag "warning1" is incremented (it should be cleared before loop 502 is entered) if the root of the added squares of grad_x and grad_y is larger than, say, 1.5 pixels in the 5 by 5 pixel/spot nominal design case. Later, the value of this warning flag is an rough indication of how turbulent the atmosphere is and how much spot cross-talk error might be occurring. An alternative is merely to record the mean square deviation for all spots; whereas the technique stated here is more indicative of explicit spot mis-identification. Step 516 is optional (though recommended) and is common in prior art paraxial Hartmann sensor systems. The basic thinking behind this correction is that the object giving rise to the spot data may itself have a brightness distribution whose "center of gravity" does not coincide with the exact center of the nominal field angle being sampled. If we imagine a bright star 1" away from the nominal field angle being sampled, it will nevertheless be contained in the square steradian field of view of the field angle sampling window (of the 4X design) and will skew the centroid accordingly. For the specific preferred embodiment presented in FIG. 8, it can be seen that this "bright star" can bias the centroid by ⅓rd of a pixel, a very appreciable amount when we consider that centroid precisions of 1/20th of a pixel are routinely achievable. Thus, step 516 presents an optional method of estimating the "C.O.G." (center of gravity, to use the common descriptor) of the object within the current steradian field of view of the nominal current field angle, and using this information to "correct" the grad_x[] and grad_y[] values found in step 512. Those practiced in the art will see this as another "global tip-tilt" correction to the given complex pupil function of the current field angle; and indeed, those practiced in the art probably have been using some form of this correction on prior art Hartmann systems. The added importance of this correction to the wide field Hartmann design derives from the fact that the tip-tilt error becomes a veritable field angle dependent "wobble" in later system performance, rather than a somewhat arbitrary global shift as it is in the paraxial Hartmann designs. Though the advanced methods of wavefront sub-routines presented in FIGS. 26A&B, 27 and 28 will quite explicitly deal with this "problem," we can sketch in a simple solution even at this juncture. Specifically, the ensemble of speckle digital images in the input data set 214, FIG. 10, can be added together and the resulting image filtered by a suitable estimate of the long term seeing point spread function (e.g. a 1" FWHM quasi-gaussian). A given field angle will be multiplied this image by its own average steradian sensitivity profile (e.g. a smoothly rounded 3.6" by 3.6" square region in the specific preferred embodiment). The centroid is found for this newly created data set, and the difference between it and the nominal center of the field angle is accounted for via step 516, FIG. 19. There is no point in being more detailed about this particular procedure since the advanced methods later discussed have more elegant ways of dealing with this potential error source; again, it is also common in prior art Hartmann systems. The "next" statement for loop 506 is then encountered in FIG. 19. Putting aside the question of the "error sources" contained in the arrays grad_x[] and grad_y[] which will be explored later on, the resultant of this nested loop 506 is identical to what would obtain from a prior art Hartmann sensor system. It should be no surprise then that the next step encountered, 518, is simply labelled as a prior art "wavefront estimation sub-routine," adding the "least squares" as a clearly identifiable trait. That is, step 518 turns the phase difference measurements (combined with knowledge of the positions of those phase difference sample points relative to the known aperture support function) into an absolute phase estimate with an arbitrary constant phase term. Reference is directed in particular to Southwell's 1980 paper for the mechanics and considerations of this sub-routine. Those practiced in the art can borrow (probably verbatim) the current routines they are already using for "phase difference to absolute phase" conversion programs. As usual, the constant phase term is neglected, i.e. the integration constant is immaterial. It is fair to say that the basic principles of this phase estimation process are well known at this point and that current work involves evolutionary refinement (see paper by Cho and Peterson, for example). One particular point that does have pertinence at this point is that much of the earlier literature (but by no means all) posits the need to perform this process 518 "very fast" in order to keep up with the physical mirror actuators as in prior art adaptive optics systems. It is important to realize that this need for "very fast algorithms" is emphatically not a requirement for the basic invention disclosed herein—it will be a consideration, however, for "realtime" implementations of this invention—and this fact will be exploited in the advanced methods in the section on engineering optimization. Step 519 is an optional wavefront estimate refinement step which will be extensively described in the sections surrounding FIG. 27. It is written as optional since indeed it is, but the preferred embodiment of the invention will typically perform this function. For the purposes of discussing FIG. 19, this step can be summarized as attempting to mitigate spot cross-talk effects as well as attempts to utilize higher order zernike coefficient estimation on the spots if such information would be useful in better estimating the phase[][]. Step 520 is yet another optional refinement step, a step which generally has been determined to be "negligible" in most formulations of the basic problem of turbulence correcting imaging systems. This step is an optional sub-routine which performs a least squares fit to what has been called, among many other things, the scintillation of the pupil function; which merely means that the whole complex phase function (magnitude and phase together) are estimated rather than merely the phase alone as in step 518. Though I don't have explicit studies to cite, part of the background folklore of adaptive optics systems in particular is that accounting for the scintillation function removes a degree of error which is dwarfed by practical error sources deriving from physical instrument noise sources and by errors resulting from residual "phase" after step 518 is completed. Be this as it may, this optional step 520 is presented here for several simple reasons. The main reason is that no one can say if and when other error sources may "practically" subside to the point where the scintillation function error would become an appreciable performance enhancement. Another simple reason is that it never hurts to empirically experiment even when solid theoretical reasoning suggests you are wasting your time; you never know what other interesting artifacts may pop out, such as cross-correlation statistics between phase and amplitude information to the point that the scintillation information can help refine the phase information (long shot? I won't presume to guess). In any event, it is conceivable that a sub-routine placed at step 520 could "integrate" the photon count at each spot, and a (generally low(er) order modal) scintillation function could be least squares fit to the resulting grid of "intensity" values. Spot cross-talk and spot mis-identification are clear difficulties to deal with, as well as polychromatic effects. This disclosure will leave it at this much said and leave whatever "discoveries" there are to be made for future R&D AND on-site empiricism; this disclosure will also touch upon the scintillation issue in the engineering refinement section.

Whether step 520 is performed as a bona fide scintillation estimator, or whether it merely changes the incoming single element phase array into a two element complex phase array with constant magnitude 1.0, the resultant output after step 520 can be seen as a (variable offset, one field angle to the next) grid of complex values representing the complex pupil function at the current field angle defined by loop 502: here named "complex_phase[][]," implicitly having a real element and a complex element, generally floating point, and defined on the pupil support function such as annular support of the specific design example in FIG. 2. There are several things we can now state about this array. These are: 1) It is a flawed estimate of the "true" complex phase function existing at the precise center of the nominal field angle, owing to a) it is spatially filtered (as a function of field angle), and b) it has "noise"; and 2) It exists on a "grid," or more generally on a set of basis functions, which are unique to this particular field angle due to its unique relationship with the lenslet apertures; that is, it has a variable offset because of the 16 beams which give rise to the 16 circles of spot images depicted in the top drawing of FIG. 18, each array of spots has a quasi-random relationship with the lenslet array (i.e. an offset from each other up to one half the linear dimension of the lenslet, 240 microns as in FIG. 8). No doubt there are more things to say about this array, but we shall stick with these for now.

Steps 522A&B and step 524 are steps which attempt to address these issues all in the service of attaining better overall system performance (why else?). Step 522 A & B are philosophically the same and are optional both separately and together. They sandwich step 524 since various normal considerations enter into whether they should come before or after or both. It is anticipated, however, that one or the other at least will be used in normal systems utilizing the invention. As with any set of spatial data, the signal to noise properties of the various two dimensional spatial frequencies of complex_phase[][] can be determined, and a "Wiener-like deconvolution" performed on said set of spatial data. Furthermore, it is a matter of normal data processing that such spatial data can be placed onto another spatial grid ("reinterpolated" as step 524 puts it) with minimal adverse consequences, provided the basic signal to noise considerations are heeded. This is a very general way of saying that steps 522A&B plus step 524 resample "complex_phase[][]" onto a new "standardized grid" or basis functions, here named "standard_phase[][][][]" 526, while at the same time minimizing the error between the "true" complex phase and the estimate on the standardized grid (i.e. the "Wiener-like" solution). standard_phase[ . . . ]526 is complex. The reason for using a standardized grid for each and every field angle derives from later stages where the complex pupil function itself becomes conceived as a uniformly changing (continuous) entity across field angles, necessitating a uniform treatment of the basis functions which describe that function. The reason for minimizing the estimate error is self-evident. Finally, the "next" statement 502B of loop 502 is encountered in FIG. 19, with the resulting output of the entire loop being an 8 by 8 array of these standardized complex pupil function estimates. In effect, loop 502 merely isolates each field angle in the array of 8 by 8 and performs, generally speaking, prior art methods on those field angles to obtain the usual phase estimate. As such, it is fair to say that all of FIG. 19 is merely applying common sense adjustments to prior art techniques.

Loop 502 effectively accomplishes the first of the three tasks for the global wavefront sub-routine as delineated above. The next task is to generate (estimate, to use precise language) the corresponding point spread function (or its UV plane conjugate) which result at the center field angle of each and every data sub-zone 320, FIG. 13. It should be pointed out that there are other options at this point, this one merely is an excellent engineering choice since it is a straightforward problem to convert complex pupil functions into point spread function estimates. It is also compatible with all of the preferred embodiment choices for the methodology of the local wavefront sub-routine. This issue will be further discussed in the paragraphs which describe the local wavefront sub-routines and their advanced treatments. So in order to accomplish task number 2 of the global wavefront sub-routine, loop 528 is entered at step 528A, FIG. 19, stepping through all 32 by 32 data sub-zones 320, FIG. 13. Step 530 then interpolates the value of the complex pupil function at the center of the current data sub-zone, using the 8 by 8 grid of standardized pupil functions 526 as table points. The manner of this interpolation is left as a normal exercise in data processing, where it should be noted once again that conceiving of this situation as an "interpolation" rather than a "evaluation of a function at a particular point" does service to ease of explanation and ease of programming. [It is yet another manifestation of the zonal versus modal debate which those practiced in the art know so well.] FIG. 12 can once again assist in an intuitive supplement to the working of loop 528. There, an array of field angles is represented as a quasi-regular grid 306 projected on top of the primary detector boundary. The "quasi-regular" means that geometric distortion can be accounted for if desired. Each of the grid points 306 on this array has a complex pupil function estimate as given by loop 502. The center of the data sub-zone (see FIG. 13 now, and the 322 projection) then has its own complex pupil function interpolated from the actual 8 by 8 grid of the example system. Back to FIG. 19, then, the output of step 530 is a complex array called local_pupil 532, where once again, this array is standardized and has an implicit aperture function support. The reason for standardizing the pupil functions in step 524 should be clear after considering step 530 and considering that other routines can be better optimized by knowing a specific format is being employed. Step 534 is phrased in FIG. 19 as a "C language" type callable sub-routine named "find_psf( local_pupil)" 534 where the passing conventions of the C language are also utilized. This routine takes the local pupil function estimate 532, and also using "global variables" of wavelength used (500 nm) and aperture support (circular/annular/etc.), creates a point spread function estimate for the current data sub-zone. FIG. 19B has a brief and highly general flowchart for this sub-routine, where those practiced in that art will recognize this as standard fare: i.e., resampling the pupil function onto a 128 complex grid, an auto-correlation onto a 256 by 256 complex grid, fourier transformed into the complex spatial domain, there converted to an intensity pattern by calculating the complex magnitude of the spatial domain complex distribution. Alternatives to this routine are brute force ray tracing, or as alluded to in FIG. 19B, sampling to higher grid spacings then downsampling back to the 256 by 256 output array psf. The output of the sub-routine 534 is a non-negative all-real valued array named "local_psf[][][][] 536, being the estimate of the point spread function, at 500 nm, for the field angle corresponding to the center of the current data zone defined by loop 528. The first two array brackets can be seen as indices on the data sub-zone, the second two as the 256 by 256 region. It is a good idea to perform these previous operations in floating point precision. The "next" step 528B of loop 528 is then encountered, so that by the time the entire loop 528 is completed, all field angles corresponding to the centers of the data sub-zones now have a corresponding point spread function estimate applicable to the primary CCD 8 data. This completes the second appointed task for the global wavefront sub-routine.

The third appointed task, that of further processing the array of point spread functions 536 into forms which the inner loop 366, FIG. 14, can best make use of, is thoroughly contingent on what processing methodology is chosen for creating the specific rev_array 378, FIG. 14, chosen in step 227, FIG. 10. As such, this third task will be discussed in the context of the third procedure in FIG. 17, which will now be described.

The best place to begin describing the preferred embodiments of the generation of the specific rev_array 378 (FIG. 14) by the local wavefront sub-routine 376 is depicted in FIG. 20. There shown is a highly simplified graph, with legend, of a common situation found in the engineering design and in the operation of instruments: the existence of a multitude of solutions to a given problem which variously trade off performance against resources (or cost). This disclosure presents four distinct solutions among a wider array of hypothetical solutions to the specific reversion methodology utilized inside the main program 350, FIG. 14. [The solutions marked 1A through 1C will be discussed in the paragraphs discussing solution 1]. The graph is deliberately without a scale or without detailed description of the variables on the axes. It is an intuitive diagram. The four procedures will be in turn discussed. Both solution 1 and solution 2 will be described in detail. The outlines of the third solution will be presented, not a recipe, and this disclosure anticipates that standard engineering development of this third solution may turn it into the preferred form of the invention, though at the application date of this disclosure it only exists as an outline for high priority R&D. Finally, the fourth solution essentially entails the "brute force" solution of equation 11, assisted by the general banding (i.e. sparseness) of the H matrix and using the simplifications of equation 13 to best advantage. This solution is well and fine, except that it hugely increases the memory, storage, and processing time involved. Again, it is anticipated that solution 3 will eventually become "arbitrarily close" to solution 4, primarily due to its formulation in the full matrix context (as will be discussed). Summarizing, then, solution 1 will be seen as a very fast method but the one most prone to error, solution 2 is currently preferred, solution 3 appears to have the most promise in the near future, and solution 4 is the brute force full solution that supercomputer users are at leisure to utilize, though at ever diminishing returns.

As an important but ancillary mathematical digression, solutions 1 through 4 can be simply related to equations 10 through 13 in the section on the mathematical background. Future developers of refinements to the present invention are highly encouraged to take the time to examine these relationships, since they are intimately connected to optimizing solution 3. Essentially, solution 1 ignores both the summation and the convolution in equation 10, effectively treating the problem as an isoplanatic one, that is, retaining only the diagonal element of matrix H and setting those diagonal elements equal to the (local) transfer function as defined by psf[][][][] 536, FIG. 19. Solution 2 also ignores the convolution in equation 10, but it does use the summation as indexed by q to derive the diagonal elements of the local transfer function. Thus, this is still "isoplanatic," but it uses a closer estimate to the effective local transfer function, i.e. the rows of H rather than the colunms. Looking at solution 1 and 2 in this fashion can better explain why solution 3 is expected to be preferred in the evolving future. Solution 3 will merely begin to utilize ever more "neighboring" values of both the summation AND the (heretofore ignored) convolution operation in equation 10. The most elegant intuitive way to visualize this (see FIG. 25, actually) approach is to first realize that equation 10 is itself a "shift varying convolution" operation; in the context of determining an "effective" inverse transformation for the data subzone region (i.e., by using a unit g vector, essentially), a simple "deconvolution" can be applied as opposed to no deconvolution at all as in solution 1 and 2, the result still being a better estimated diagonal matrix. This topic will be picked up in the paragraphs which discuss solution 3. Finally, solution 4 merely solves equation 11 with the unit g vector (all zeroes with a single one) corresponding to the center of the data sub-zone.]

I will first describe the simplest and fastest reversion methodology marked as solution 1 in FIG. 20. This solution is named the "point spread function" method since it utilizes the array psf[][][][] 536 of FIG. 14 essentially as is, except that it uses its conjugate. The processing steps are listed in FIG. 21, where those familiar with the art will see that the local wavefront subroutine 376 FIG. 14 is nothing more than a pointer assignment operation to a pre-calculated (e.g. stored on disk) array of "rev_arrays." FIG. 21 shows that, for this PSF-based reversion methodology, the sub-routine 538 in FIG. 19 first allocates and clears a complex array "global_rev_array" 549 which will be the ultimate output of the sub-routine 538 (be it on disk, memory, or whatever). It then begins with loop 550 through the data sub-zones.

The first step 552 inside this loop performs a 2D fft on the array psf corresponding to the current data zone, where the output goes into the current global_rev_array (real and imag). Thereupon a nested loop 554 is encountered which steps through all UV plane points. The processing step 556 inside the nested loop 554 effectively assigns the new array global_rev_array[][][][] with the complex conjugates global_rev_array 549 by applying the negative value to the imaginary components. Then the two next statements 554B and 550B are encountered respectively. In plain English, the sub-routine 538 loads a global array of complex conjugated UV plane estimates of the local point spread functions. Finally, the local wavefront sub-routine 376, FIG. 14, reduces to a simple pointer assignment operation (as is quite well known in software engineering) into the pre-calculated global array constructed in sub-routine 538. For the sake of completeness, this is indicated in FIG. 21A, labelled as step 558.

At this point it is worthwhile to compare this most simple reversion solution (number 1 of FIG. 20, just described) with prior art techniques which function under isoplanatic assumptions. Reference is again made in particular to the Primot et. al. paper, previously cited, as an outline for the state of the art in this regard. Now it has been "suggested" to me by numerous (independent) people that existing isoplanatic methods could just as well be "stepped and repeated" across all field angles measured (there still is the issue of how these field angles are measured, but in any event . . . ). Since this suggestion has been made even by what could be called "non-experts" in the art, I assume that such an idea could be considered as "an obvious extension of the prior art." There are two answers that I generally have for these suggestions: 1) yes, it certainly can be used, but it is quite a poor performer in the error vs. resources graph of FIG. 20, there depicted as solution 1A; and 2) It is quite non-obvious how to move this performance from the position at 1A to the position at 1 in graph 20, and I am aware of no efforts, published or otherwise, which have attempted to move from a simple, obvious "step and repeat" methodology to a more sophisticated one. In fact, I am aware of no attempts to systematically compensate for imagery arbitrarily beyond the isoplanatic region. For the sake of completeness, this disclosure will outline the considerations for moving from the "obvious" performance at 1A to the involved reasonings which have led to the creation of solution number 1 described above. This "moving from 1A to 1 will itself involve the novel processing methods 1B and 1C referred top in FIG. 20.

Figure 22:
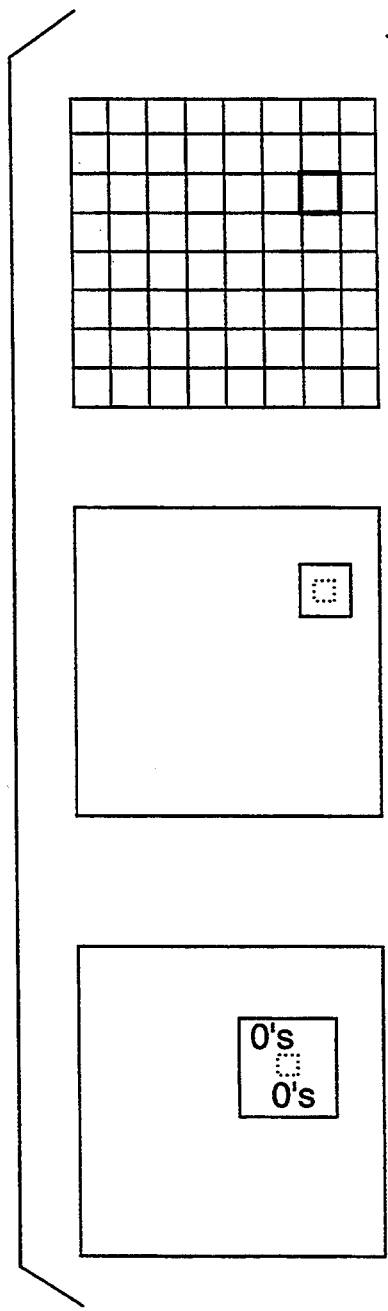
FIG. 22 is a graphical depiction of the relationship of novel processing methods of this invention to the "obvious" application of prior art processing methods.

FIG. 22 contains a schematic series of methodologies which, moving from the top drawing to the bottom, transition from the "obvious step and repeat" method of isoplanatic prior art processing to the preferred embodiment solution 1, FIG. 20, of this disclosure. We can imagine that the performance points of the two intermediate methodologies 1B and 1C travelling downward in error but outward in resources as in FIG. 20. It should be explained that the reason 1A, 1B, and 1C are all out further on the resources axis is because, in general, they will have a higher noise level per acquired exposure, and thus require more exposures to attain a given level of noise, or "error" performance. The top drawing of FIG. 22 alludes to simply splitting the data region into an 8 by 8 array of data zones each with 128 by 128 pixels each—we are still assuming a 2.5 meter telescope, 500 nm, etc. Presumably a wide field wavefront sensor is being employed as described in this disclosure, and thus each region has its own estimate of the local point spread function applying to it. The techniques as described in Primot et.al.'s paper are applied verbatim to each region on a large ensemble of images, and the results are sewn back together into a single 1024 by 1024 final image estimate. It would be fair to say that a post filtering of this final image estimate, where a spatial filter is applied which attenuates the "square harmonics" of the 128 by 128 grid regions, would be part of "the obvious step and repeat extension of prior art techniques." To reiterate, this "obvious" extension will indeed work and should in general produce results which are "better than" what would obtain using purely the long term exposure seeing profile. However, whatever average resolution gains are made come at the expense of gross spatial non-uniformities in signal to noise properties (related to the 128 by 128 spacings). Resolution performance will be non-uniform spatially, and noise properties will be non-uniform in both the spatial domain and the Fourier domain. For visual applications, central regions can be "degraded" in order to match border regions, thus at least creating visual uniformity at the expense of a minimal overall gain in resolution. For numeric image science, these non-uniformities can cause havoc. Thus summarizing, as mentioned earlier, this "obvious" step and repeat extension of prior art techniques can indeed improve performance potentially, but only by a small amount and only within a context which manifests other forms of performance degradations.

Stepping out now from extension of the prior art techniques into the novel design of processing methodologies which borrow on these prior art techniques, the second schematic in FIG. 22 takes a jump downward in error performance from number 1A toward number 1's level in the graph of FIG. 22 (a reminder is again made that this is a highly qualitative treatment). This technique is there marked as 1B. The idea is to once again envision 128 by 128 data regions, perform the techniques of Primot and Rousset to an ensemble of images, only this time only a 32 by 32 central "sweet spot" is chosen to be added to a final image. Meanwhile, the 128 by 128 region is stepped over by 32 pixels to the left, the same process performed, and so on, each overlapping region determining its own 32 by 32 sweet spot. Eventually an entire final image estimate is built with an outer border of data "thrown out" because it never was in a sweet spot of any 128 by 128 data region. And once again, post filtering can attenuate the square harmonics, this time based mainly on the 32 by 32 sweet spot sewn regions, but also deriving from the larger 128 by 128 grid. Looking at FIG. 22 then, experimentation will find that the error has subsided at the expense of processing time (however, less error can mean less exposures needed, and thus less processing time). Though this new technique 1B clearly gives less overall error, it is still quite computationally redundant and still more error prone relative to the preferred embodiment of methodology 1, FIG. 20. The second schematic in FIG. 22 also can serve to illustrate a small variation on the method 1B just presented. Here, the "sweet spots" are rounded by smooth weighting functions and they are generally broadened beyond the 32 by 32 region somewhat (such as bilinear functions extending to a 64 by 64 region), greatly minimizing the square harmonics due to the square subregions in method 1B, also allowing for smoother "interpolated" values between the centers of the sweet spots. This is a variation which was broadly outlined in the disclosure of the preferred embodiment of this invention already. Looking once again at FIG. 20, we see a path of improving error performance starting with the "obvious" extension of prior art techniques, moving through novel "borrowings" of prior art techniques, and then winding up at the superior performance of the psf-based method of the preferred embodiment of this invention. At this point it can be better appreciated the role that the overdetermined set of universal basis functions play in setting up an optimal solution from first principles rather than winding an intuitive path from the obvious solutions to the optimized. To complete FIG. 22 therefore, the methodology of solution 1, FIG. 20 is sketched as a next logical "intuitive" step where the redundancies of methodology 1C are essentially eliminated (as well as the concomitant error sources) and a (maximally?) efficient psf-based methodology is arrived at. The whole reason for outlining methods 1A through 1C was to show that "obvious" wasn't necessarily so obvious, and when it is indeed obvious, it is generally of limited value. That is to say, even extending basic principles of prior art techniques requires a fair degree of novelty.

We can turn now to a description of the preferred embodiment of the processing methodology; specifically, the use of the data point window function based reversion method, labelled as solution 2 in FIG. 20. Now the definition of a "data point window function" was already given in the mathematical background. To revisit this definition in plain English, it is the weighted sensitivity function that a given pixel has on object space at any given moment in time. More prosaically, it is the rows of the H matrix in equation 1 rather than the columns. [My apologies for using the term "window" since this may be easily confused with its usage in the spectral estimation context; i.e. the weighting of spectral components in order to affect preferable space domain properties. However, I must say that I feel the use of this "mother's tongue" word is infinitely more appropriate to the manner in which it is presented in this disclosure than in its more stolid spectral context. It is quite the matter for aesthetics as well as agreed jargon, but admit, a pixel does truly have a "window" on object space, does it not?] The very fact that it is a row rather than a column should give a first clue as to why it is a better performer than the PSF—it directly relates to the data point under question (whose reversion profile is being sought) rather than indirectly as in the PSF. As mentioned earlier however, it still treats the overall reversion problem as a quasi-isoplanatic one (it can be likened to having the row define an approximate Toeplitz matrix rather than the column defining that Toeplitz matrix as in the PSF formulation). It will take solution 3, FIG. 20, to take the approximation yet further into the true anisoplanatic realm. But for now, the data point window function methodology works admirably, if not perfectly optimized. [It is important to note that the very idea behind the data point window function posits a space variant matrix H. In the invariant case, the point spread function and the data point window function are trivial mirrors of each other and there is no reason to distinguish the two. I have always assumed that this is why there has been little attention paid to the distinction in the first place. As can be seen here, however, the distinction is quite important.] The price paid for using the data point window function is generally one of increased computation time (and usually more complex software data management schemes). This derives primarily from the fact that the PSF is a simple conjugate to the complex pupil function along a given field angle, whereas the data point window function generally must be composited from a neighborhood of point spread functions (in practical terms). This can be seen more readily when we describe the details of the processing steps as laid out in FIG. 23.

The output of the sub-routine 538, FIG. 19, for the data point window formulation is generally the same as it was for the PSF formulation, except that the global_rev_array is now called the global_window_array 561, having the data point window functions stored as opposed to the complex conjugates of the point spread functions. FIG. 23 begins with a description of the sub-routine 538 which should be performed when using the data point window reversion methodology. It first notes the existence of the previously calculated local_psf array 536. The processing steps begin with step 560 which allocates and clears a 32 by 32 by 256 by 256 array, global_window_array 561, of unsigned integers (floats can be use if memory is no problem). This array will hold the calculated window functions as they exist at the center of the data sub-zones 320, FIG. 13. [For practical computing purposes, we shall calculate the window function at the center of the pixel at the 16th row and the 16th column; rather than the fractional "true" center at (16.5, 16.5)] Recall that it is a simple matter to calculate the columns of the H matrix in equation 1 based on the complex pupil function. In fact, the preferred embodiment ONLY utilizes the calculation of the columns (the point spread function) as a means for transforming between the pupil plane estimate and the spatial domain estimate. Yet the use of the data point window function necessitates calculating (estimating, to be precise) the rows of the H matrix. Clearly we could calculate each and every column of the H matrix, i.e. each and every point spread function in the image, and then fill all row estimates in the doing, but this requires massive computational time and resources and is rather informational redundant. Instead, the preferred embodiment performs the operation which is described in the second, highly simplified intuitive diagram of FIG. 24A and 24B—it still looks complicated even though is simplified, admittedly. What is there depicted is that 1) We only wish to calculate rows every so often, effectively at short enough intervals to adequately represent the spatial variance of the H matrix, in our case being at the center of 32 by 32 pixel regions (i.e. generally isoplanatic); 2) We fill all the chosen rows by stepping through columns at a comparable spacing as the row samples, where we will again use 32 by 32 spaced regions; 3) At each column, we calculate its values (its point spread function) according to "find_psf" of FIG. 19B; 4) then stepping through the rows which we are calculating; 5) effectively rotate the current column 90 degrees clockwise about the common element of the current row and column, i.e. the "current axis"; 6) then multiply the rotated values by an "interpolating function" centered about the current axis and add the resultant into the accumulating row values. [This figure is most simplified because it ignores the subtleties of a 2 dimensional image-type matrix, i.e. it ignores multiple banding subtleties. It also only depicts the column being rotated onto three rows, where in general it will be rotated onto a total of 81 rows (9 by 9) as in the lower left drawing of FIG. 24A.] The important philosophical point to note is that we are using the slowly changing properties of H matrix (its slow spatial variance) to chunk it up into smoothly interpolated quasi-Toeplitz mini-regions, then performing simple transposition operations that Toeplitz matrices allow. The whole point of this fanciness is a) I have found no easier way to directly calculate the data point window functions, and b) it greatly saves on computational time and resources, that is, it is more informational economical.

Figure 24A:
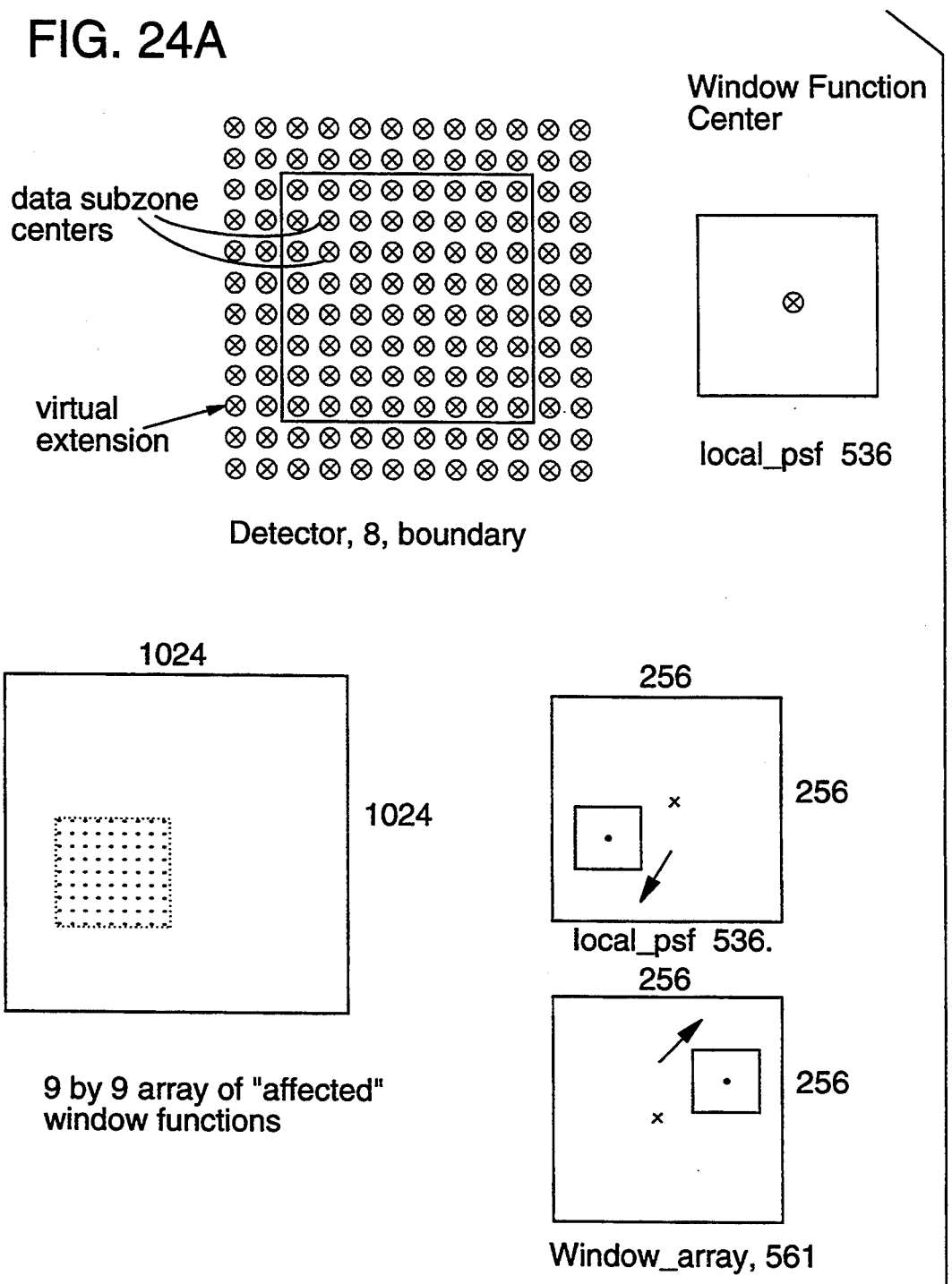
FIG. 24A is a schematic diagram assisting in the explanation of the data point window method of FIG. 23, depicting in particular the mirroring of indices between psf array and the window array, in the lower right two drawings.

The remainder of processing steps in FIG. 23 translate the concepts in the two drawings of FIGS. 24A&B into computational routines. The next step after allocating the large array 561 is step 562 which allocates and "loads" a 64 by 64 floating point array "weight" 563 of values representing a bilinear interpolating function. [Smoother interpolating functions than the bilinear, or ones of larger extent, most certainly can be used instead; usually with a larger than 64 by 64 region.] Using the C convention of numbering arrays with the first element as 0, each element in the array will have the value:

$$bilin[i][j] = (1.0 - |32-i|/32)(1.0 - |32-j|/32) \qquad (16)$$

[Efficient software engineering may wish to use quad or octal symmetry to merely store and use a smaller segment; but the computational overhead in this routine is so small that using the full array can make for easier pointer arithmetic.]

Step 564 then creates a new virtual (hypothetical, computationally speaking) array 565 of 40 by 40 data sub-zones, the 32 by 32 real data sub-zones plus an extension of 4 zones on all borders, accommodating the 128 pixel overshoot of the 256 by 256 universal basis functions. Next, loop 566 is encountered which steps through the indices of this 40 by 40 virtual array. The first step 568 inside loop 566 is a query as to whether the given virtual zone is inside or outside the real 32 by 32 data sub-zone region: if it is outside, than the closest real data sub-zone's psf array 536, FIG. 19 will be used in the ensuing steps, otherwise, if it is inside, than the existing array psf is used. Thus, step 568 performs a very simple extrapolation if necessary; more sophisticated schemes are again quite employable as well. Step 570 is a nested loop which will cycle through the "applicable" window function sites, i.e. those sites which are in general within the 256 by 256 pixel "reach" of the point spread function. This "applicable" region is in general a 9 by 9 array of window functions sites when the current virtual zone defined by loop 566 is well within the real data region, and it is truncated from a 9 by 9 array when the virtual zone comes within 4 zones of the border and beyond the border. [This is sounding more complicated than it is; Those practiced in the art of image processing will recognize this as the usual "trivia" that comes with dealing with data borders.] FIG. 24A's lower left drawing has a schematic helping to better explain the "applicable" criteria. Yet another nested loop 572 is then encountered which steps through all 64 by 64 indices of the weight array, effectively stepping through the region 575 in FIG. 24A. Inside loop 572 there is first another query 574 as to whether a given point is inside the psf region 536 or outside (since the region 575 can be partially outside itself). Then step 576 is an accumulating weighted add, where the indices on the accumulating resultant, global_window_array 561, is mirrored about the center pixel (128, 128) from that of the psf array. This mirroring is indicated in the two lower right diagrams of FIG. 24A. [Had we used a simple square box region of value 1.0 as our interpolating function instead of a bilinear, step 578 would have been a simple assign statement.] It should be noted that several offsets are involved in these loops and calculations, and it is no small software engineering task to keep track of them all. The important point to realize is that a mirroring of indices does take place, and care should also be taken with the conventions of using the (N/2)'th element or the (N/2−1)'th element (out of even N) as the effective center reference points and center axes. The preferred embodiment prefers the (N/2)'th point for clarity. Three "next" statements are then encountered, closing loops 572, 570, and 566 respectively. Step 577 then indicates that ALL of the 32 by 32 array of window functions must then be fourier transformed into their UV plane counterparts, using the same 2D FFT routines mentioned in the main program of FIG. 14. The result is then a filled array "global_window_array" 561 which is merely the global set of (complex, UV plane) rev_arrays for all the data sub-zones. Hence, sub-routine 376, FIG. 14 becomes a simple assign loop (or pointer assignment in the "C" language), represented as step 580 in FIG. 23, just as in FIG. 21 in the psf method. Actual hardware systems and software program may find that the array sizes involved are so large that a fair amount of "swapping" is needed, or, some of the steps in the sub-routine 538 of FIG. 23 should be done inside loop 366, FIG. 14 rather than outside. This is why there is the sub-routine called the "local wavefront sub-routine 376, FIG. 14," even though for solution 1 and for solution 2 of FIG. 20, both have turned out to be simple pointer assignments.

This completes the detailed description of the preferred embodiment, the one which uses the data point window function as the basis for the reversion methodology. I turn now to a discussion of what is the broader de facto preferred embodiment of the invention. It is "de facto," since both of the preceding solutions 1 and 2, FIG. 20, are effectively contained within its scope.

Recalling the discussion surrounding equations 10 through 13, and turning to the drawings in FIG. 25, we can outline the technique for refining the specific reversion methodology to be used. The top drawing in FIG. 25 presents a simplified view of a data point centered at the origin for convenience, having the point spread function of the nominal field angle of that data point drawn an x with a circle around it directly at the origin as well. Likewise, there are field angles nearby which have slightly different point spread functions, where the distance scale here might be spaced 1" apart, somewhere within its isoplanatic region which would isolate the "low order" variability in the point spread function. Those practiced in the art will realize that there is still a high degree of correlation between the point spread functions at these nine locations, but in some sense there is a local "tip-tilt and low order curvature" present in the field variant point spread function. In other words, if we focus in on only the local low order change in the point spread function, this will be closely approximate to the actual characteristics of the "change" in the point spread function in the neighborhood of the field angle at the origin. We can therefore imagine that modelling "low order" change in the point spread function in this small neighborhood is better than modelling no change at all (as in the case of solution 1 and 2, FIG. 20). The goal now becomes the incorporation of a finer derivation of rev_array 378, FIG. 14, based on that local change. It appears that the best way to approach this problem is to view the local characteristics of this data point region. To do this, the lower drawing contains a highly simplified matrix equation which attempts to "localize" the situation depicted in the top drawing. The text under this figure further explains the approach toward a solution 3, FIG. 20. It will be found that by assuming that the point spread functions of the 8 neighboring field angles (to the central field angle) are extrapolated into an arbitrary distance, the matrix equation 11 simplifies into that depicted in the lower drawing of FIG. 25. By placing an all 1's vector in Gn, we set up a solution for the inverse (as opposed to "reverse") projection from the data point at the origin into the solution space. Solution 1 and 2, FIG. 20, effectively did this same operation, except that only the diagonal of the H matrix was used, not a small band as in the figure. So without going into any further detail, it is anticipated that further refinements will be made which determine yet finer solutions than the data point window function of FIG. 23.

Finally, solution 4 of FIG. 20 is merely cranking out the full (huge) matrix solutions to equation 1 and/or 11. There is truly no magic in this, it is an a priori given that it can be done. However, it is generally considered too bulky and inefficient in any event, and besides, it does not pose the multi-data set reconstruction problem in the overdetermined least squares formalism of FIG. 14, thus "arbitrary" methods of dealing with nulls must be used.

ADVANCED WAVEFRONT ESTIMATION ROUTINES

Whereas the processing methodology presented in FIG. 19 and discussed in the disclosure text was quite functional and "enabling," it cannot be said to be the "best mode" of the invention. The only reason for this is that it tends to have higher residual wavefront error than the routines which follow. Referring back to FIG. 5, there is box 41 which speaks of "pseudo-inverting" the spatial filtering which is taking place optically at the focal planes 66 and 98, FIG. 8. Loop 506 and step 518, FIG. 19, in particular is where our focus will once again turn for improvement, though not necessarily inside the loop, but in modifying it after it and the traditional wavefront estimation routine of step 518 is completed. In loop 506 and step 518, the procedure essentially followed basic prior art Hartmann methods in determining the wavefront estimate and called it good. In the prior art systems, however, spatial filtering was much less of a consideration and/or error source. With the wide field designs, the issue becomes central.

Figure 26A:
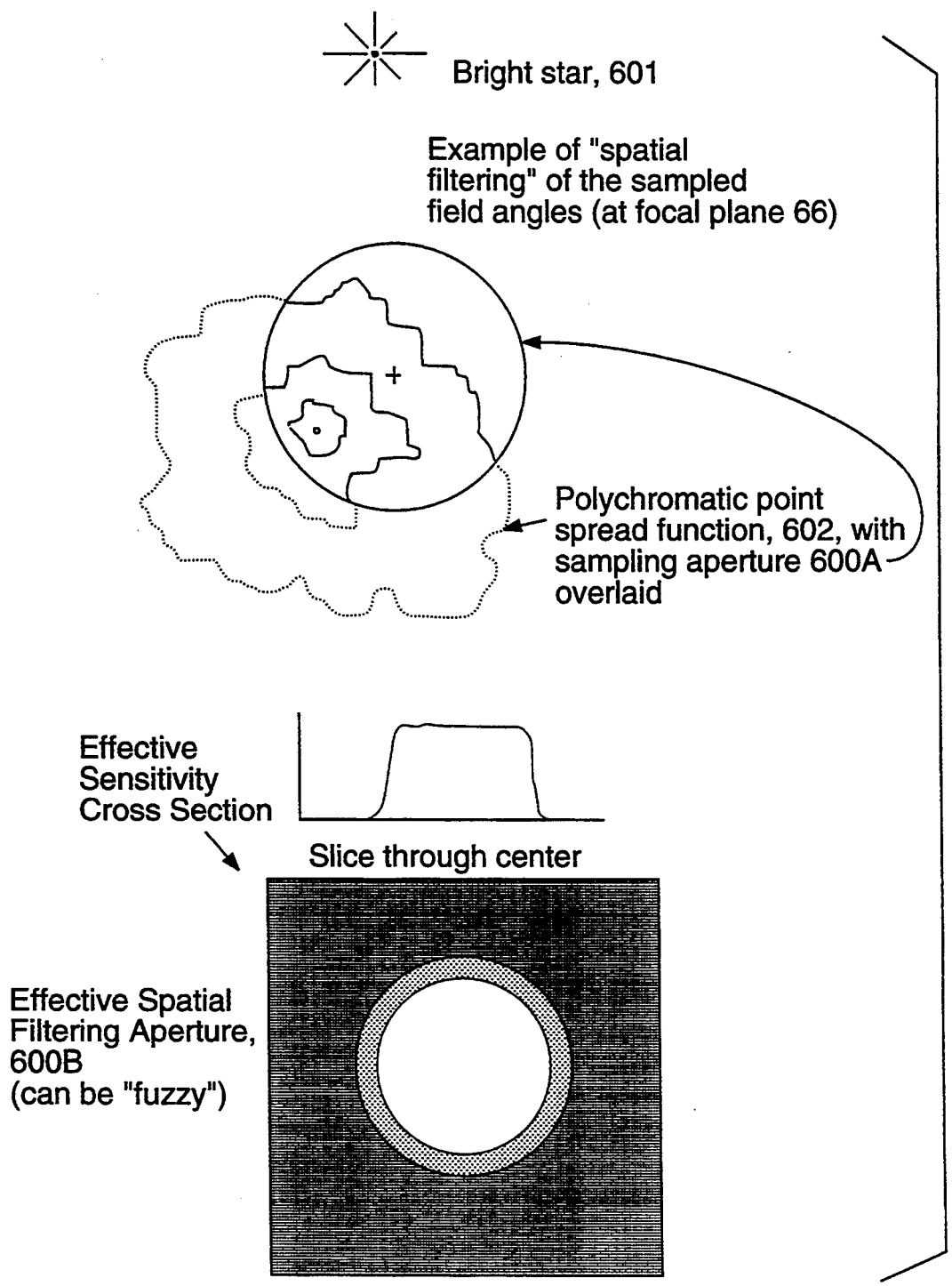
FIG. 26A is a schematic which highlights optical spatial filtering effects to which the wide field wavefront camera described herein will generally be prone to. The lower figures detail the effective fourier optics operation performed by the field sampling aperture.
Figure 29A:
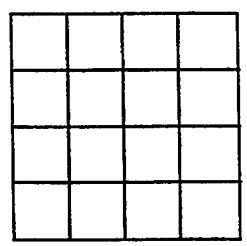
FIG. 29 is an example of how geometric distortion manifests itself on a typical grid image, and how that distortion can be described graphically.
Figure 29B:
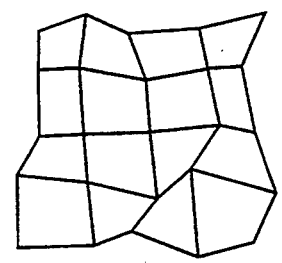
Figure 29C:
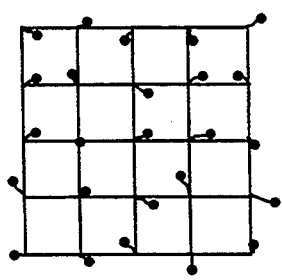
Figure 29D:
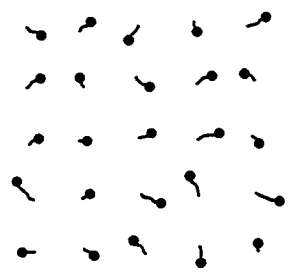

FIG. 26A gives a closer look at what is taking place inside the wide field Hartmann camera system. A bright star 601, slightly offset from the nominal central field angle of one of the 8 by 8 field Hartmann sampling apertures (e.g., 46, FIG. 4) is producing a polychromatic speckle distribution at the nominal focal plane 66, FIG. 4 (this aperture would be a square in the example system of FIG. 8). The spectral distribution could be something like the spectral curves of FIG. 12A, fight diagram. The sampling aperture 600A of FIG. 26A is an idealized sharp edged profile of a sub-aperture, where inside the circle it is transmissive and outside it is completely absorbing. The polychromatic light distribution (still complex, i.e. this is NOT an intensity profile, per se) is drawn overlaid in iso-modulus lines, where those areas of the light field transmitting are drawn as solid lines and those absorbed are drawn as dashed lines.

Modern optical language and Fourier Optics theory therefore tells us that the sub-apertures are performing a spatial filtering operation on the two conjugated planes: the telescope pupil plane 34, FIG. 2 and the lenslet sub-aperture plane 52, FIG. 4. The drawing at the bottom of FIG. 26A shows that the filtering function in actuality will be a slightly rounded distribution, a fact which is important when considering the 2X and Full wide field Hartmann designs of FIGS. 6 and 7 respectively, since these designs in particular have 45 degree inclined apertures giving rise to somewhat asymmetric "filtering functions" 600B. We also note that spatial filtering is a decided function of wavelength. Those practiced in the art will recognize that the complex pupil plane wavefront has been transformed into the wavefront existing at the lenslet plane 52 via a convolution operation defined by the effective aperture function drawn as 600B. The spatial offset of the bright star 601 manifests itself as the usual phase shift (see bottom equation, FIG. 26B). The result of all this general theorizing is the realization that the measured values of the wavefront slope are inherently altered from the slopes existing at the true telescope pupil plane 34, FIG. 2. Yet it is the true pupil plane function we are seeking for the processing methodologies, and therefore we need to seek methods which better estimate the true pupil plane function rather than making do with the measured values as in the nominal procedure of FIG. 19. Those familiar with the art of fourier optics should immediately recognize that, indeed, better estimates of the pupil function can be found, but within other sets of limitations and constraints; they will also realize that there is a range of tools which can be brought to bear on creating better estimates rather than one singular "method." The remainder of this section therefore discusses such solutions in detail, including their philosophies. It should always be borne in mind that the end goal of all of this is minimizing the residual wavefront error between the wavefront estimate created by the processing methodology and the "true" wavefront.

FIG. 26B sets up some generic mathematical concepts and a framework which can be used in creating computational solutions to improving the wavefront measurement/estimation. The Full or 4X wide field Hartmann design of FIG. 7 and FIG. 8 will be the basic model used in the drawing, where the 3.6" field angle spacing of the specific preferred embodiment is also used. The top left drawing in FIG. 16B is a three dimensional array representing the "current" multi-spectral object estimate 610 corresponding to one of the field angles in the 8 by 8 array of sampled field angles. It is a course resolution estimate of 1" square boxes of 4" square total extent, giving a 4 by 4 pixel estimate. The double summation below merely tracks the coefficients of the values and leaves off the implied square box basis functions, as is common. The spectral plane can be considered as 20 nanometer square bandpass regions corresponding generally to the spectral regions of significant energy as defined by the rightmost spectral curves of FIG. 12A, the wavefront beam sensitivity function. If a monochromatic "artificial beacon" is the only signal of significant energy content, then there will only need to be one spectral plane rather than several, where this beacon assisted system is also depicted in FIG. 12A—effectively reducing it to a 2 dimensional object estimate. The coarse 1" resolution of "the estimate pixels" derives from several considerations. Perhaps the larger reason is that until the whole technique of wide field wavefront science becomes a meticulous, mature science, this may be all the resolution which is required to effect "reasonable" error reduction. Besides, the resolution certainly can be increased as will be discussed later. The 1" resolution of the Fig. also implies that an ensemble of the primary speckle image themselves, filtered by gaussian distributions for instance, can serve as the initial object estimates. A "white light" model can also be used as an initial estimate, where all spectral planes then have identical values. These broader issues will be discussed immediately following the description of FIG. 26B, especially in FIG. 28. Turning now to the upper right drawing in FIG. 26B, there is depicted iso-radiometric lines—10%, 50% and 90%—for the amount of optical energy that the in situ aperture receives as a whole, laid out on the same spatial reference of the object plane. The 4" square box of the object estimate is drawn as a reference. The effects and subtleties of the 45 degree inclined apertures depicted in FIGS. 6A and 6B are alluded to here. The fact that one edge of the aperture is farther out of focus than the other (the effect is not huge by any means) is drawn as a smoothing and broadening of the iso-radiometric lines to the right of the figure. For reflective telescopic systems, the radiometric profile should be effectively the same across wavelength, and if it isn't, and if the difference produces appreciable error effects later on, then these radiometric profiles certainly can be treated as a multi-spectral entity as well. On the other hand, when the profile in the upper right drawing of FIG. 26B is fourier transformed into W and modelled inside the "convolution" equation at the bottom of FIG. 26B, then there will be a scaling factor which is directly related to wavelength, hence the lambda subscript on W. The equation at the bottom therefore describes a mathematical model of the operations performed on the "true" pupil function, there named "pupil," and the measured phase estimate. It can be seen that each "spectral pixel" has its own unique shift and convolution applied to it. The pupil function is taken as an invariant function in this Fig. and further refinements can begin to look at its local tip-tilt and low order curvature (in that event, the "pupil" function would thereby be given the subscript m denoting that it changes as a function of field angle). The $s_m$ is a two dimensional spatial coordinate representing the shift of the pixel from the nominal central field angle. The trick now becomes how to turn this mathematical model of the degradation into methods which better estimate the actual pupil function.

Among the many choices of better estimating the true pupil function, the preferred embodiment of the invention chooses a rather simple approximate scheme loosely based on what has generally been known as the Van Cittert solution to deconvolution problems. [The basic methods set down by Herr Van Cittert in the late twenties and early thirties have gone through the nth degree of refinement and modification. Nevertheless, using the "Van Cittert" label still carries the basic philosophy of solution with it.] It is a little bit ironic that this disclosure chooses such a solution, since much of the philosophy of the invention as a whole is to boil down certain relationships into direct (quasi-deterministic) forms rather than the more indirect Van Cittert formalism. Be this as it may, the Van Cittert solution will indeed effect improvements at a reasonable computational cost, and future engineering refinement will be tasked with finding better quasi-deterministic methodologies which are better candidates—as if they were plotted on the same type graph of FIG. 20.

FIG. 27 has a general processing flowchart of a new sub-routine which should be placed immediately following step 518 in FIG. 19. It is therefore called sub-routine "wavefront_est_refine" 519 as if it comes right after that step. The processing methodology begins with the usual definition of what it expects as input, in this case being the critical entity of the phase estimate at the pupil plane, as derived from traditional wavefront estimation routines in step 518, FIG. 19. The first processing step 620 is allocating and clearing two new arrays new_phase[][] 622 and tmp_phase[][] 623, each with the same number of elements as the array "phase" which is the output of step 518, FIG. 19. The next step 624 is a step which need only be performed once per main program, where two "table arrays," w_lambda 625 and e_shift 626, are pre-loaded with values corresponding to the fourier transform of the aperture function and values of the phase shift of a given (spectral) pixel, corresponding to the situation as described in FIG. 16B. If necessary, the w_lambda array could be a further array of the 8 by 8 field angles if each of their aperture functions is sufficiently different. Step 628 is a sub-routine which loads the values of the low resolution spectral object estimate of the top left drawing in FIG. 16B. Recall that this can be a gaussian filtered (. FWHM_. 1") of the ensemble of primary speckle images, then each field angle assigned its own unique 4 by 4 pixel region; the spectral characteristics can be treated as uniform if no explicit information is given to the contrary, and if it is treated as "spectrally neutral," only one array $f_m$ need be calculated. Then we encounter loops 630 and 632, stepping through lambda and then through the low resolution pixels respectively. The order could be changed here if there are software efficiency issues at stake. The next step 634 is complex operation multiplication on the named arrays. Here, the array tmp_phase is assigned a phase shifted version of the input phase array which was the original output of step 518, FIG. 19. The phase shift array 626 was pre-calculated and is specific to each lambda and each pixel indexed by m. Step 636 is also a complex operation statement, where now the array new_phase created and cleared in step 630 has an accumulating add (accumulating inside the lambda,m loops) of the product of the scalar value $f_{m1}$ multiplying the convolution of the tmp_phase 623 loaded in step 634 and the table array w_lambda 625. Then the "next" statements of loops 632 and 630 are encountered respectively. Then a new loop 638 is begun, where the indices on the phase arrays are explicitly stepped through rather than implicitly. The inner statement is then the crux of a Van Cittert like operation, where the difference between the incoming phase and the newly calculated phase is found, and some empirical multiplication factor alpha is applied to the difference, and the difference duly subtracted from the original input array "phase." Using an alpha of somewhere between 0.5 and 1.0 is a crude rule of thumb; empirical values always seem to wind up being the final choice however. Finally, loop 638 is closed with the "next" statement 638B. The output of the sub-routine is the same as the input, in other words, only with "semi-corrected" values which, empirically speaking, should provide for a better estimate of the complex phase than the raw slope measurements would have otherwise given.

Again, it should be clear to those practiced in the art of image processing and in general "data correction methodologies" that the example processing methodology of FIG. 27 is indeed indicative of an entire genre, iterative and quasi-deterministic alike. Entire books have been written on the basic subject and those building on the present work are encouraged to consult those books and apply the basic solutions to the specific conditions at hand. With this said, we can turn to a brief discussion of FIG. 28 wherein a rough refinement feedback system is depicted on the processing methodology of the invention as a whole. At its core, this could be conceived of as a grand web of Van Cittert like feedback loops which in principle can iterate its way to a refined self-consistent solution for an object under study. However, I believe this interpretation overstates the argument for the very need for these refinements, and in situ testing of actual telescopic systems will be the final arbiter of whether such loops are employed. Furthermore, the more that such "feedback loops" are replaced by direct, efficient prediction methods, the better. In some senses, the Van Cittert approach is hence a fail safe when there is appreciable error which can be removed, but the quasi-deterministic solutions are either computationally impractical or they are not within the grasp of the imagination. In any event, some or all of the loops depicted in FIG. 28 should be considered as a potential part of a working model of the invention. I personally like to envision them as single iteration loops, since the errors they are correcting are already very small (except in the case of FIG. 27 perhaps), and one iteration will bring them well within the point of diminishing returns. The key elements of FIG. 28 that should be noted here are first the step labelled "spot cross-talk correction" 704. Very briefly, it can be imagined that after all spots of all field angles have been found and centroided, a certain cross-talk predictability becomes apparent which will tend to shift the centroids of two neighboring spots slightly closer to each other as the two spots become closer themselves. That is, the positive slopes of a neighboring spot skew the 9 point centroid in that direction (see FIG. 18A). As one spot moves in the direction of one neighbor and away from others, the effect becomes pronounced and asymmetric. Provided with a crude model of spot light distribution, a small correction factor could be applied to the centroid values of all the spots. The real importance of refining such a scheme as this is that, ultimately, a finer field angle spacing of sampled complex pupil functions could be managed (say 3" spacing instead of 3.6") if and when the spots can be more closely packed together. Spot wander and outright overlap provides a harder limit on how closely packed the field angle sampling (and the spots) can be. Step 706 poses the possibility of performing an operation such as described in FIG. 27 on the Hartmann digital images directly, rather than on their derived phase estimates. More broadly, local low order curvature of the phase function can also be incorporated. The resulting refinement procedure would use the error between actual spot data and "predicted" spot data as the modification signal on the pupil function estimate itself. This may be time consuming, or it may not be, depending on how much computing resources can be brought to bear on the problem. Step 708 is precisely what was described in FIG. 27. It had its own Fig. and its own highlighted explanation since it is anticipated that a large majority of applications and telescopic system error budgets could use its error reduction magnitude. This general question goes for all such "refinement schemes" obviously. Step 712 asks whether after an entire solution 412, FIG. 14 is found, would a better solution be found if this estimate is used as the object estimator in the top left hand corner of FIG. 26B in the wavefront sensing routine. Step 512 is speculative (in terms of whether it is past the point of diminishing returns) at this point, but its possibility certainly exists. Finally, another speculative option is considered in step 714, suggesting that in applications where a spectral set of images is being taken of a given object, would this information be sufficiently helpful in improving the spectral plane estimates of the upper left hand drawing in FIG. 26B as well. Again, whether or not this could substantially improve overall performance is not the issue here, only the existence of the possibility if needed.

A few additional refinement possibilities which have or haven't already been mentioned and which did not easily fit into FIG. 28 are those connected with improving the generation of "rev_array" to the ideal of the full matrix solution of equation 14 (i.e., yet more discussion on the search for solution 3, FIG. 20), as well as refinements which explore further into the role of "local low order shift variance" and how such simplified viewpoints can simplify both the reversion methodologies and the wavefront estimation methodologies. Finally, the scintillation function of the pupil plane as usual is given short shrift and all too often given the a priori boot. Perhaps accounting for it and using its "measurement schemes" will be well into diminishing returns, perhaps not. The disclosure already had a short essay on this earlier. In any event, rementioning it here in the context of FIG. 28 and the "other" refinements possible is not inappropriate.

Concerning polarization effects and their potential introduction of further error sources, this is an issue present in this invention and in the prior art systems. Once the basic solution has been formulated in the manner of equation 1, the isolated issue of polarization becomes one of predicting the rows and/or columns of H within this additional "polarization" context. The issue of how the "spot information" on the Hartmann data is different from the "true pupil function" and the focal plane array 8 light distribution is of equal concern in the engineering design of this invention as it is in adaptive optics systems, and should be given the same engineering attention accordingly.

One final note is on the broad issue of tracking an object as the earth rotates. Though there are volumes which can be written about this and its effects on the methods of this invention, perhaps the easiest summary of the effects of "tracking errors" is that they should, in fact, blur the final image in the same manner that they have always done. At first glance, this appears to place major new demands on the tracking abilities of large telescopes, suggesting they go from there current. 0.1" region specifications to an order of magnitude better. (I can hear opto-mechanical engineers groaning). Not to worry however, there are several interesting tools which can be brought to bear on alleviating this problem, POSSIBLY TO THE EXTENT WHERE TRACKING SPECIFICATIONS CAN ACTUALLY RELAX. Wouldn't that be a twist. The basic idea is that a phase only corrected version of a speckle image should have stable overall "centroid" properties, and that by either taking the individual exposure numerators RE,IM, 384, FIG. 14, or taking these and performing modest modulus amplification, these entities will exhibit centroid figures which should change from one exposure to the next according to A) the tracking, and B) random noise from instrumentation and shot noise. The magnitude of the noise effects on the centroid should be quite tolerable for brighter object (scenes), while for low light level objects the situation becomes less useful. So at least to some "brightness level," this centroid correction can be used to continually shift the image estimates according to a global tip-tilt parameter applied to the data. For the lower light situations, rather than attempting to design absolute rigidities of the components of an overall telescopic system plus a rigid bright star tracker data feedback (all of which can be used as data in set 218, FIG. 10 to be sure), another option is to merely monitor the orientations of the primary CCD 8, the primary mirror, the secondary mirror, and a star tracker very precisely, let them be relatively "non-rigid" because of the short exposures, and be content with merely knowing their orientations rather than "enforcing" rigid orientations. This could be done with interferometric techniques among others. In any event, chasing the lower brightness tracking error suppression techniques is yet one more area for detail engineering.

This concludes the disclosure of the preferred embodiment of the invention. The following sections describe major variations or extensions of the invention as applied to systems which are different enough to deserve being highlighted.

ALTERNATIVE: NO WIDE FIELD WAVEFRONT DISTORTION INFORMATION AVAILABLE

Modified methods of the invention can be applied to physical systems and to sets of blurred digital images wherein no direct information is available concerning the distortion of the images. In effect, the situation would be such that there would be no input information of the type 216, FIG. 7. Such a situation can arise for many reasons, and the past two decades have generally referred to this problem as "blind deconvolution" among other things. In the case of this invention, and not withstanding the upcoming description of how the techniques of this invention can be employed to improve the performance of conventional "isoplanatic systems," the teachings of the present disclosure can be applied to the restoration of blurred digital images which altogether constitute a more general class of "field variant blind deconvolution." The distinction is important since there are published prior art techniques which explore rather deeply the issues and solutions applicable to "field invariant blind deconvolution" (ref. Bates, & McDonnell, "Image restoration and reconstruction," The Oxford Engineering Science Series: 16, Clarendon Press, Oxford, Section 10.), i.e. isoplanatic solutions. Even so, the methods of this invention may well present superior results to imaging deblurring applications which are forced to make isoplanatic assumptions (field invariance) even in anisoplanatic systems.

Getting back to the issue at hand, the case we examine now is when there is no input data set 216, FIG. 10, available. In general, it can be assumed that significant system data information as well as gross statistical information about the distortion functions IS available as input 218, FIG. 10. And of course, the set of "E" distorted digital images must be part of the input data 214, FIG. 10. For the sake of simplicity, we will again assume that a 2.5 meter telescope is providing the distorted images and that an 8 by 8 field of "unknown distortion estimates" would be sufficient to characterize the distortions. Each distorted digital image in the input set 214 sets up its own "Z-dimensional" probability region in solution space, where that probability is determined largely by the gross statistics of the distortions contained in input data set 218. Since Z is effectively $<<N^2$, the number of data points deriving from the primary detector, a unique high probability region should emerge in solution space after several distorted images have their respective probability functions multiplied together. It is not the point of this disclosure to further explore the subtleties of the higher mathematical reasonings involved with this problem. Instead, it is rather clear that a simple methodology for searching for and finding this region of higher probability, i.e. the sought solution 224, FIG. 10, could be facilitated by the techniques of this invention. The two practical difficulties which will attend any system incorporating these methodologies will be, in general, the much larger computational times involved and the traditional nasties involved with search algorithms (slow convergence and local maxima to name the two largest). For solutions to and/or help for these common search algorithms, there are many texts and published accounts available. Also, there are certain basic limitations to the results of these techniques which are not only brought about by basic signal to noise ratio considerations, but also due to certain quasi-non-uniqueness which (in atmospheric turbulence at least) exist within the gross statistics if the distortion functions themselves. An intuitive situation is where the zernike coefficient connected with the focus adjustment, though it is only one dimensional, can blur a given image only along a unique path in solution space: several manifestations of "defocus" (alone) therefore give rise two mostly similar families of probability distributions, leaving little assistance in searching for a unique "intersection point" or high probability point. There are pragmatic solutions for items such as this, but they do tend to limit the results obtainable. In any event, though this degenerate case of having no direct information 216, FIG. 10, is far from the preferred embodiment of the invention, some systems my have no other choice, and the processing techniques described from FIG. 10 onward may not completely "solve" these problems in light of the problematic search difficulties just mentioned, but they will no doubt provide significant tools in such bona fide "inventions."

SPECIAL SECTION: THE USE OF ARTIFICIAL BEACONS

It has long been appreciated that wavefront sensors generally require a moderate incoming light flux in order to operate properly. For the case of atmospheric turbulence, their short exposure times increase the need for higher light levels. Both theoretical limits and practical state of the art instrumentation limits have generally limited conventional wavefront sensors to the 10th stellar magnitude object brightness or perhaps a little better. [It is actually dependent on a variety of factors.] Within the last decade or so, practical systems have been built which provide additional light levels to the wavefront sensors via, generally, laser light directed along a near-paraxial field angle of the telescope; the laser light either backscatters back into the telescope, or may instead excite florescence in higher altitude atmospheric layers with a small portion of the energy once again going back to the telescope. These systems now go under the name of "artificial beacons" generally. There ultimate purpose is to extend the faintness limit of objects which can be imaged by the telescope (almost exclusively in the context of adaptive optics systems; see the discussion on prior art). These artificial beacon concepts can also be quite helpful in conjunction with the techniques of this invention.

The wide field nature of this invention dictates that artificial beacons should cover the field of view desired, as opposed to 'some close location to an object of interest within the isoplanatic region', as is often currently the case. This suggests a 64-fold increase in optical power (not a trivial matter) from the source of the artificial beacon over and above that required for the isoplanatic case, merely deriving from the 8 by 8 isoplanatic regions being covered (and assuming comparable limiting magnitudes of the Hartmann sensors used). We have already seen how the wide field Hartmann sensor integrates its signal from an extended field of view, thus, there is no inherent reason to localize the beacon light into a "star." If particular applications could benefit from such localization, so be it. The point is that for wide field uses of artificial beacons, a very wide artificial beam can be generated and projected out along the field of view of the detector; there is no need to get any fancier. Suffice it to say that the techniques and methods of this invention can certainly make use of this latest methodology of "artificial beacons."

SPECIAL SECTION: NON-IMAGING USES OF THE WIDE FIELD WAVEFRONT SENSING SYSTEM

It is well known in the optical industry that wavefront sensing systems can be employed as central or peripheral elements in non-imaging applications. It is clear that the wide field wavefront sensing system disclosed herein is no exception. Specifically, the disclosed system could certainly be utilized in applications such as single or multi-optical surface metrology (profiling, etc.), distorting media tomography, electromagnetic communications systems including laser-based communications through a distorting media such as the atmosphere, and so on. Overall, it is quite likely that the informational basis of anisoplanatic wavefronts, as measured by and provided by the disclosed systems, will offer significant performance increases, or outright enablement where no enablement was possible before, of many of these non-imaging uses of wavefront sensing systems.

THE WIDE FIELD HARTMANN SHACK WAVEFRONT CAMERA

This section describes an improvement to the full field wavefront sensor described above. It shall simply be referred to as the Wide Field Hartmann Shack (Wavefront) Camera. It has a less complicated hardware and optical layout, it is simpler on a conceptual plane leading to a simpler approach to the processing methodology, and it should be able to function on dimmer objects. As was the case with the above-described full field wavefront sensor, this wide field Hartmann Shack (HS) camera will function on extended objects as well as on arbitrary contrast extended objects (including zero-contrast "blank walls"). The only potential drawback of the wide field H/S camera is that it may have slightly less immunity to non-singular solutions in very high turbulence conditions relative to the beam-splitting full field design; that is, there may be less tools available to "disentangle" overlapped and inverted signals on the wavefront distortion. This latter potential drawback may be quite minor and may only be of consequence in extremely high turbulence applications not typically encountered in astronomical situations.

The wide field Hartmann-Shack camera is an extension to the general philosophy of the traditional Hartmann-Shack wavefront sensor. Whereas the traditional H/S sensor attempts to measure the local tip and tilt of either a point source or the barycentric shift of a compact diffuse source, the wide field Hartmann-Shack camera described herein attempts to measure the geometrical distortion of an arbitrary extended source of arbitrary dimensions. A point source and a compact diffuse source are special cases of the latter; therefore this wide field Hartmann Shack camera is fully "downward compatible" to single point sources. Another difference between the traditional H/S and this wide field H/S is that the former searches for a mono-axial measurement of tip-tilt centered upon the barycenter of the beacon object, whereas the wide field H/S searches for the field variant tip-tilt across an 2 dimensional array of field angles. Given an undistorted image of an arbitrary beacon object, and a distorted image of the same, a methodology is outlined whereby the distortion is mensurated and related to the tip-tilt of the local sub-aperture wavefront as a function of field angle. Yet another important advantage of the wide field wavefront camera, both the one outlined in this section and the ones outlined in the previous sections of this disclosure, is that they can function on zero-contrast objects provided that true anisoplanatism exists. Those practiced in the art have loosely referred to this as the "blank wall" problem, or the "zero contrast extended object" problem. Both the full field wavefront camera of FIG. 7 and FIGS. 26A-B, and the wide field H/S camera of the present section, illustrate that this problem is solved due to the anisoplanatic signal and can be measured by moving beyond the barycentric, monoaxial approach to the Hartmann-Shack design.

Definite optical considerations not necessary in the traditional H/S sensor come into play when performing detailed design of the wide field H/S camera. This disclosure points out and describes these extra considerations. After discussing these new considerations, the wholly different methodology of determining geometrical distortion will be outlined and described in detail, then followed by a description of how the measured geometrical distortion is transformed into a 2D array of pupil function estimates.

NEW OPTICAL DESIGN REQUIREMENTS

The general optical design of a wide field H/S camera is very similar to the design of a traditional H/S sensor. In fact, it is exactly like that depicted in FIG. 4 except that the field angle sampling aperture, 46, is replaced by a simple square field stop that limits the field of view of the wide field H/S camera to some extent, such as 36 arc-seconds by 36 arc-seconds. Furthermore, the determination of precise values of focal lengths on the field lens, 50, the design variables on the lenslet array, 52, the bandpass characteristics on the spectral filter 38 and dichroic 28, the focal length on the magnifications optics 60, and the CCD pixel spacing specifications on the detector array, 10, may or will all be modified by the extension to a wide field of view. Be this as it may, the elements, except for their detailed specifications as stated, remain the same as in FIG. 4 and its corresponding written description. In effect, there will then be no true "field angle modulation" of the exiting light beam, 48, as there was in the previously disclosed wavefront camera designs. The measurement of geometric distortion itself will be the mechanism for distinguishing field angles and measuring their local tip-tilt.

MEASURING THE FIELD VARIANT TIP-TILT ON AN EXTENDED BEACON

Reading from FIG. 4, each sub-aperture in the lenslet array, 52, will be projecting a low resolution image of the light distribution existing at the field stop at the nominal focal plane, 66, onto a local region of the detector array, 10. This light distribution at the nominal focal plane, 66, is merely a broadband and generally chromatic and speckle distorted image of the beacon scene. The principle of the Hartmann-Shack sensor therefore still applies and thus a superposition of pupil images, weighted by the true brightness distribution of the celestial source, is projected onto the lenslet array, 52, the superposition being one of light from all the various field angles across the field stop. The image projected onto the detector array, 10, is therefore isolating the local tip-tilt of the incoming wavefront just as with a point source image, only now it is manifesting itself as a simple geometrical distortion of an extended object due to the anisoplanatic changes in the local tip-tilt. This is to say, the wavefront tip-tilt at a given sub-aperture changes as a function of field angle, and this change manifests itself as a rather simple geometrical distortion on the detector array, rather than merely a barycentric shift of a point source.

It remains to determine as accurately as possible what the "undistorted beacon image" looks like, akin to the need to find a nominal center or reference center in traditional H/S sensors, and once determining this, to then find the instantaneous distortion of a given exposure from this "reference image". Complicating the situation is the anisoplanatic behavior of the amplitude of an incoming wavefront, i.e. the scintillation. We must also be explicit in how this additional effect is measured and dealt with. Once the geometric distortion between a reference image and an instantaneous image is found, the local difference value directly translates into local tip-tilt, and therefore all previous methods of traditional H/S sensors can be applied to obtain a full aperture pupil function for any given field angle which has sufficient beacon photons to produce a reasonable signal to noise ratio.

DETERMINING THE REFERENCE IMAGE FOR EACH SUB-APERTURE

The first step in the process is to determine a precise reference image of the beacon object contained within the field stop at the nominal focal plane 66 for each and every sub-aperture of lenslet 52. This reference object needs to be determined on the same pixel spacing scale as the underlying detector array behind the lenslet array. A less pure but probably acceptable way is to determine a global reference image which is then applied to each and every sub-aperture of the lenslet array 52. The former method of determining each separately merely can account for local inhomogeneities in not only the lenslet sub-aperture but also the local detector array and other spatial non-uniformities in the optics.

The reference image must have roughly equal, or slightly more, high spatial frequency signal level as any given distorted exposure. This will help ensure higher signal to noise ratio measurements of the geometric distortion. At the same time, this requirement complicates the derivation of the reference image. Essentially, the reference image is the same image which would result if no distorting mechanism is present, i.e. if no atmosphere were present. There appear to be several approaches which can achieve the goal of optimally determining the reference image.

The preferred method of this disclosure is to design the wavefront sensing optics in such a way that the individual MTF properties of a given lenslet will be worse than the natural seeing conditions of the primary telescope imaging system. In this way, a primary long exposure image of the beacon object can be gathered on the primary detector and low pass filtered to the same MTF of each sub-aperture and resampled onto the unique pixel grid behind each sub-aperture. It remains to take a long term exposure on the wavefront detector 10, and to align the centers of gravity of the primary detector "reference image" with the local centers of gravity of the sub-aperture images. If there is a known degree of innate geometrical distortion existing in the lenslets themselves, this systematic distortion should be added to the reference image as well.

Other methods of determining the reference image certainly may exist or be developed in the future. Even using the long term sub-images themselves is an alternative, but doing so will need some compensation when it comes time to measure the instantaneous geometrical distortion about the reference image.

MEASURING THE INSTANTANEOUS DISTORTION BETWEEN THE REFERENCE IMAGE OF A GIVEN SUB-APERTURE AND AN ACQUIRED SHORT EXPOSURE SUB-APERTURE IMAGE ON DETECTOR 10

There are two distinct approaches presented for measuring the instantaneous distortion between the reference image and a given "distorted" image of a sub-aperture. No doubt there will be other approaches developed in the future, each with their own merits. It is impossible to say which of those presented here is the preferred embodiment since each has its own merits relative to a cost/performance comparison. The line integral method does argue to be the more analytical and possibly the more trustworthy, whereas the search method has conceptual simplicity and corresponding simplicity of implementation.

DESCRIPTION OF THE PROBLEM

FIG. 29 has a oversimplified illustration of an image and a purely distorted, non-inverting version of that same image. The term "purely distorted" refers to the idea that only a geometrical distortion, or warping, has been applied to the undistorted image to produce the distorted image. Non-inverting refers to the idea that if the undistorted image were made up of a large number of randomly directed small arrows, no single arrow would outright reverse direction in the distorted image. FIG. 29 is oversimplified in that the box would generally have a curved type distortion rather than a simple boxlike distortion, that is, the figure on the upper right would have curving lines.

The problem is to determine, as precisely as possible, the geometrical distortion function which maps the undistorted image to the distorted one. This is depicted in FIG. 29 as well, where the desired distortion function is depicted in the lower right figure. Mathematically speaking, this is a two dimensional array of two dimensional distortion vectors. The problem to be solved is really twofold: how to do this in simpler and ideal "noiseless" cases, and how to do this once noise, blurring, scintillation effects, and general error sources are added into the picture.

GENERIC PRE-PROCESSING

Figure 30:
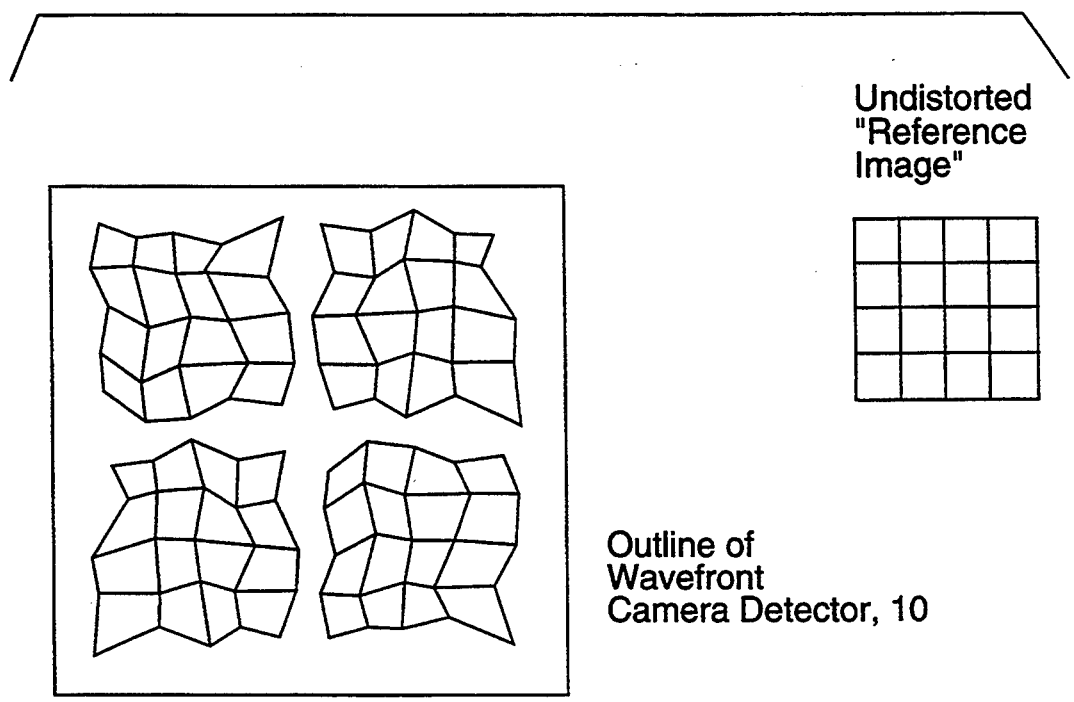
FIG. 30 is a simple example of how a 2 by 2 lenslet array might image a grid in typical atmospheric distortion.
Figure 32A:
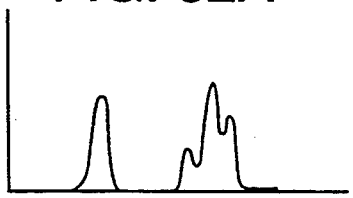
FIG. 32 is an example of how one dimensional distortion can be measured.
Figure 32B:
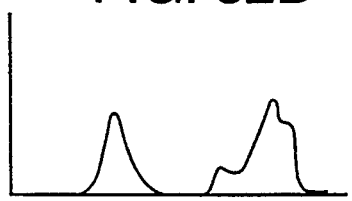
Figure 32C:
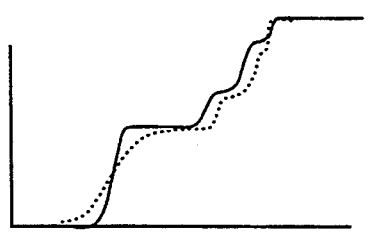
Figure 32D:
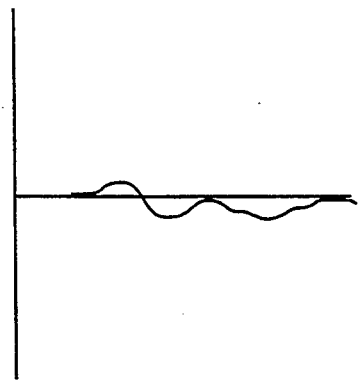

FIG. 30 contains an illustration of how the image of FIG. 29 might look as seen by the detector 10 of FIG. 4. The scale is somewhat reduced and we are assuming that there is only a 2 by 2 array of sub-aperture lenslets on the lenslet array 52. Note that the apparent geometrical distortion of one image to the next changes. This is due to the anisoplanatic behavior of the local tip-tilt at each and every sub-aperture of the lenslet array 52 of FIG. 4, and due to the difference of the tip-tilt between sub-apertures. Those practiced in the art will note that there are actually two primary effects taking place in the distorted images of FIG. 30: 1) the geometric distortion of the image, and 2) a spatially varying amplification and attenuation of the image due to anisoplanatic scintillation. The latter scintillation effect could not be easily depicted in the graphics but should be understood to be present.

It turns out that measuring both of these distorting mechanisms independently would be of use to the full distortion compensating system. On the other hand, if all we wanted to recover was the pure geometric distortion, it would still be advantageous to separate the two effects.

It is clear that geometric distortion alone does not effect the total brightness of an object. Another way to state this is that the DC value of the fourier transform is unaffected by geometric distortion. On the other hand, it will be found empirically that the scintillation function finds its maximum value, statistically, at the DC value of the fourier transform and fills off rapidly as a function of spatial frequency. The fact that these two effects occupy opposing regions of fourier space will therefore be exploited in the interests of separating the two effects.

Generally speaking, simple methods of separating the two can merely assume that the two can be completely separated through a spatial filtering process and that the resulting error can be simply tolerated. Moderately complicated methods can at least estimate and attempt to compensate for the spatial-frequency cross-talk of the two effects, while ultimately, a full three dimensional model of the atmospheric phase distortion can be built which could form the basis for a Van Cittert type iteration between ray-traced scintillation and phase distortion (the derived function) and measured scintillation and phase distortion (based directly on the data). Again and as always, we have a variety of sophistication we can apply to a given problem, each trading off cost with accuracy.

For present purposes we shall utilize a simple methodology, that of merely low-pass filtering both the reference image and each distorted image, then adding the difference image between the two onto the distorted image, producing a brightness-normalized distorted image with much of the scintillation effects removed (though some of the geometric distortion effects will be removed in the process). As such, we find that we have performed a gross separation of the two effects. The difference image, as a ratio to the reference image, is roughly a measure of the field-variant scintillation function for each given sub-aperture, though both cross-talked geometric distortion and imprecise low-pass filtering will introduce errors. The scintillation-normalized distorted image will be left largely with pure geometric distortion and will be input to the methodologies of the next sections, though cross-talked scintillation and imprecise low-pass filtering will also introduce some errors.

Details on the exact steps involved in attempting to remove the scintillation function are contained in FIG. 31. Given a data image such as that in FIG. 30, step 800 begins a loop through all sub-images of the reference object. Step 802 asks for a global registration between the current distorted image and the reference image, and it suggests using the peak of the cross-correlation function between the two images. Indeed, inspection will show that for an image such as that depicted in FIG. 30, a cross-correlation might produce some strange results and not give a clear peak in cross-correlation. It may then be prudent to perform a low pass filter on each image and repeat the cross-correlation. Step 804 then provides the options of removing known geometric distortion of the lenslet itself, if this refinement is practical and worthwhile. Step 806 then performs a low pass filtering on both reference image (it only needs to be performed for the first sub-image then saved in a buffer, to be picky), and the distorted image. The suggested form of the filter is a gaussian, and the suggested FWHM is in the range of 5 to 10 arc-seconds, but these values ultimately should be derived from empirical data which supports maximum separation of the two distortion signals. Step 808 then subtracts the filtered distorted image from the filtered reference image, giving an estimate of the actual scintillation once it is normalized to the reference image. This estimate can then be used within the main processing routine of FIG. 10 in the disclosure. Care must be taken, however, lest areas with no brightness whatsoever are encountered, wherein a weighting scheme should be used based on the number of photons which are providing signal to the measurement of the scintillation. Step 810 acknowledges that the normalized negative is a good estimate of the scintillation function. Step 812 then adds the difference image to the original (not filtered) distorted image to produce the "normalized" or "scintillation-removed" distorted image for the given sub-aperture of the main loop. Step 814 closes the for-next loop begun in step 800.

OBTAINING A GEOMETRIC DISTORTION ESTIMATE BETWEEN A REFERENCE UNDISTORTED IMAGE AND A DISTORTED IMAGE: 2 APPROACHES

The following two methods each produces an estimate of the geometrical distortion obtaining between two generally identical, other than geometric distortion, images. Having used the pre-processing method above of normalizing out the scintillation effects, we can now assume that the error sources are simple noise and blurring and not scintillation. The problem here addressed has generally been described in FIG. 29, where we will be searching for the bottom fight diagram, given the upper left and the upper right as inputs.

THE ITERATIVE FAT-TO-THIN LINE SCAN METHOD

FIG. 32 makes a basic point before diving into the main outline of this general approach. In the upper left is a simple one dimensional brightness distribution and in the upper right is the same distribution which has been geometrically distorted. In the bottom left are the integrals of each, running left to right, overlaid on top of each other. The primary point of this exercise is to note that the displacements of the ordinates between the two integral curves is a direct measure of the geometrical distortion between the two images—that is, in the case of pure non-inverting distortion.

For one dimensional brightness distributions, therefore, it is a rather simple operation to measure the distortion: merely plot out the graph as in the figure on the bottom left and then directly generate the distortion plot based on the abscissa differences of each and every ordinate, plotted on the scale of the abscissas, as in the figure on the bottom right.

Moving on to the two dimensional case, the situation becomes more complicated. It is only mildly more complicated if the typical distortions are on the scale of one pixel or less, and rather complicated if the distortions are larger than one pixel and the image has high contrast, such as the case in FIGS. 29 and 30 (assuming the pixel spacings are much finer than the box spacings). Fortunately, in atmospheric distortion conditions the distortion is generally not so pronounced as depicted in FIGS. 29 and 30, and indeed is typically on the order of one pixel in extent (depending on the specific optical design, however). Thus, this first described method of the fat-to-thin process is worthy of consideration.

In a sense, the design of a high signal to noise ratio system prefers larger distortions because this will enable better precision measurements of that distortion. This is to say that the desire for minimal distortion in the service of simplifying the method of finding the correct distortion is in conflict with the desire for obtaining a higher signal to noise ratio on finding that distortion.

When we apply a straightforward straight line integral to both images, the integral of the distribution along any given line on the distorted image has brightness values from both sides of the line adding spurious signal to the overall integration, thereby rendering the one-dimensional method of FIG. 32 useless when applied uncritically. The supposed geometric distortion being found can either be actual distortion or actual signal merely warped in from one side of the line or the other.

The line integral method, however, can be salvaged if we approach the estimation of the two dimensional distortion in an iterated fashion, first finding gross and very low spatial frequency distortion, then refining the spatial frequency estimation as we integrate along "curved lines" which take into account the distortion profile on the orthogonal axes and which have been roughly estimated from previous iterations. Ultimately this approach is one which must be justified on an empirical basis for any given turbulence situation.

Figure 33A:
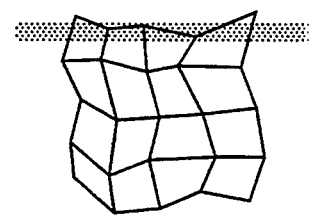
FIG. 33 is a graphic description of how two dimensional distortion can be measured using the "fat-to-thin" iterative line integral method.
Figure 33B:
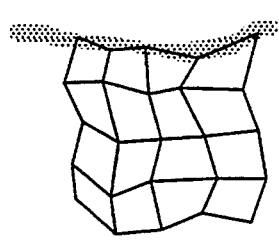
Figure 33C:
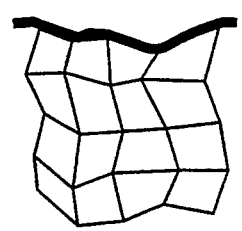

FIG. 33 helps us take a pass through the required steps. The method begins by taking broad line integrals along the orthogonal axes, where broad refers to weighted spatial averaging along the perpendicular axis to the direction of the line integral path. The resulting integral is further low-pass filtered and is compared to the same process performed on the reference image.

This process is applied to a series of integrals first sweeping horizontal line integrals along the vertical axis, then sweeping vertical line integrals along the horizontal axis. The line integral shown in the top drawing of FIG. 33 is of the former variety. The total distortion found after a first full sweep is made is then assumed to be a rough first guess at the distortion.

The spatial averaging weight function is then thinned up, and the new integration path is taken along the estimated distortion lines from the previous pass. In this way, a new distortion estimate is formed with slightly higher spatial frequency accuracy, while at the same time following a better estimate of the proper integration path. After a few or several iterations, the method should converge upon the true geometric distortion. As with all iteration routines, convergence can be regulated by appropriate damping variables, such as updating estimates by only one half their measured difference values, thus ensuring proper convergence.

THE GLOBAL SEARCH METHOD

The second method of estimating geometric distortion, the global search method, is rather straightforward, but has the potential disadvantage of large computational loads and the difficulties associated with search algorithms including slow convergence times and the pitfalls of local minima. Nevertheless, search methods are also known to function properly if these difficulties are well considered, and hence the following technique is a viable one for determining the distortion function.

Generally, the unknown variables can be any set of functions which adequately describe the two-axis shifting of an arbitrarily dense two dimensional array of control points. (i.e. reseau points). More simply, the unknowns can simply be the x-y offsets of some small grid of control points, with inter-spacing points appropriately interpolated, such as the bottom right drawing of FIG. 29.

The search can have as the primary metric the mean squared difference between the "redistorted" image, i.e. the distorted image geometrically warped by the current search estimate vector, and the reference image. Pixels between the control points are, as mentioned, stretched via interpolated amounts, and inter-pixel interpolation values are generally useful for more accurate results.

For the sake of speed, one pass of the "fat line integral" approach of the previous section can be used to get a grossly correct starting point for the search algorithm, and in the early stages only a certain percentage of pixel values, say one in every four, need to be used to calculate the mean squared error.

Though this search method is a bit more complicated than given credit for in this summary, it is generally considered to be a mature prior art and the detailed implementation is a matter of typical refinement within that prior art.

NOTES ON AN ANTICIPATED BETTER MODE

There is a third method of determining the geometrical distortion between two images that is presently being worked on but has not yet been reduced to practice and verified. It is anticipated that this method will eventually be the preferred embodiment. It goes as follows.

THE LINE INTEGRAL SPACE AVERAGING METHOD

The method described here is a fully analytic method, to use this term a bit loosely, in that it is a straightforward single iteration method of finding the precise geometric distortion function. Despite this advantage, it is strongly suggested that benchmark testing be performed on all three methods, or any newly devised ones, finding out which method has the least computational overhead and ensuring that they all generate substantially similar estimates of the geometric distortion. In order to fully describe the line integral space method, some background must first be discussed.

FIG. 35a has an arbitrary line in two dimensional space. Provided that this line does not pass through the origin, it is uniquely identified by the point which is closest to the origin. Lines passing through the origin can be uniquely identified by the angle the make with the x axis. FIG. 35b formalizes this notion and creates an extended polar coordinate space which uniquely defines all possible straight lines in a two dimensional euclidean space. At the origin, there is precisely 180 degrees worth of unique lines, and therefore the $r=0$ point is expanded into a circle, and the redundancy of line description in theta space is represented by a thick line on the upper half of the circle and a dashed line on the lower half.

FIG. 35c now defines a "linear integral transform" on this new extended space. For each point in the domain of the new extended space, the value of a function is defined as the indefinite line integral of any given two dimensional function defined in normal 2D euclidean space, where the line integral is taken over the straight line specified by the point in the domain. This is a unique mapping of a two dimensional function onto the extended Line Integral Transform (LIT) space. In some sense, this is no different than any other functional transformation such as Fourier, LaPlace, or whatever.

Where is this taking us? Well, the first thing we need to realize is that it is possible to transform back from the new space onto the conventional euclidean space. This can be done, to be overly pedantic, using a Hilbert-like transform where each point in the new space is explicitly the addition of the function values along the line in the euclidean space, thereby defining an infinite set of equations with an equally infinite set of unknowns, the classic uniquely mapped Hilbert formulation. Getting back to the simpler discrete world of digital images, it reduces to a large but nicely intuitive set of linear equations. For distortion problems in particular, where the distortions are generally of low spatial frequency relative to the pixel spacing, this set of equations can become quite small and tractable.

We next define a new line integral called a radial line integral over the transform space. The "radial" refers to the fact that this line integral has a constant them in transform space, and only these types of integrals will be utilized in the following steps. The integration is performed on F, not f, and is performed in the Line Integral Transform Space. Note that any given delta function in our original function first becomes a quasi-circle in LIT space (quasi because of the fat zero), and that any given radial line integral will be a step function with the step occurring at the appropriate point.

We then take a set of radial integrals equally spaced in theta space. Each integral is performed both on the reference image and on the distorted image. The differences of the abscissas on any given ordinate is then interpreted as the integrated warp caused by the geometrical distortion, just as it was in FIG. 32. For any given radial integral, these differences are found and plotted out along the radial line itself. In this way, a new distribution is found plotted out in the line integral transform space. This is the line integral transform of the true geometrical distortion. It remains to set up this new distribution as a discrete set of equations and to solve this set of equations.

The resultant radial integration differences are then fed into a set of linear equations in order to transform them back onto our normal euclidean space. Solving for this matrix solves for the distortion function.

SOME FINAL NOTES ON INVERTING AND NON-INVERTING DISTORTION

It should now be clear that the preceding methods make use of the assumption of non-inverting distortion. This is not to say that they will not function on inverting distortion, they will merely begin to exhibit different and generally rapidly increasing errors in the results that they produce. It will be important for engineering considerations to balance the needs of signal to noise ratios with the statistical onset of these error sources deriving from inverting distortion, and to do so as a function of the prevailing strength of turbulence; which, as already mentioned, is not much of a consideration for normal nighttime atmospheric turbulence conditions.

FUNCTIONING ON A SPARSE STAR FIELD OR AN IMAGE WITH GROSSLY NON-UNIFORM CONTRAST

A very important general case is now described, which also leads to further details on the implementation of the preceding methods. The salient features are drawn in FIG. 34. Essentially, the determination of geometric distortion is quite contingent upon either or both of A) local contrast, or B) anisoplanatism. The two actually reinforce each other. That is, if both are present, the signal to noise ratio of the measurement of the geometric distortion becomes that much better. As importantly, there must be sufficient detected photons in order to reach some nominal signal to noise ratio performance.

Both methods described above must have modifications made when considering objects which are either sparse or which have grossly non-uniform contrast characteristics. Indeed, the modifications described herein should be at the core of the preferred embodiment when using any of these methods.

Figure 34A:
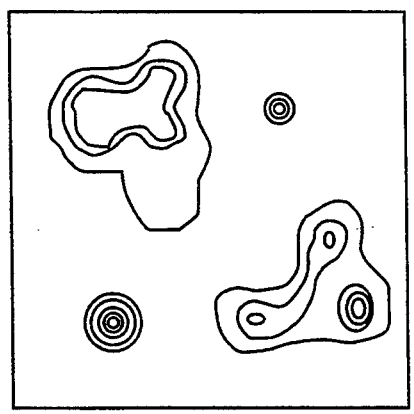
FIG. 34 is an example of how a sparse field of brightness distributions might appear, and how both photon flux and object contrast contribute to the measurement of distortion.
Figure 34B:
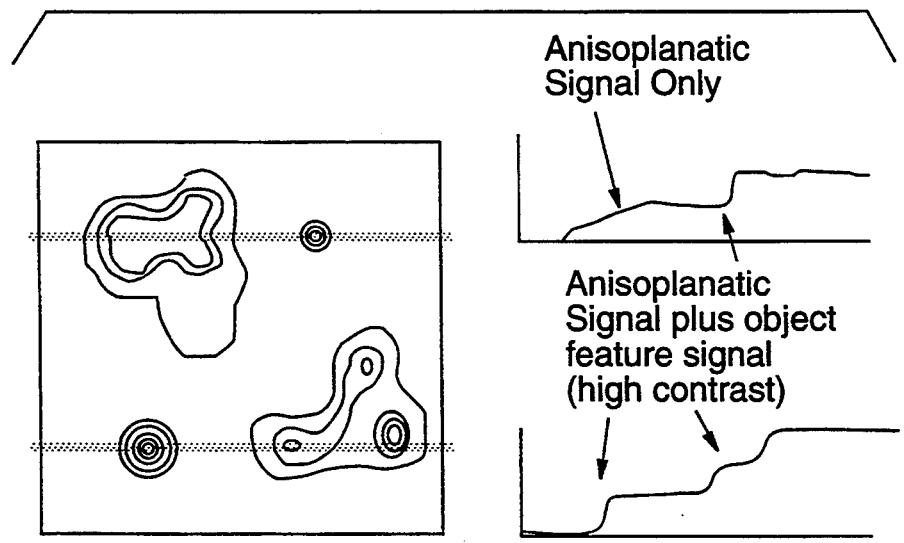

FIG. 34 contains a figure which has two randomly distributed point sources and two extended sources as an example. Inspection of the image in FIG. 34 shows that only at the places where there is an optical signal can the measurement of geometric distortion take place. The implications of this are that only reseau points in the vicinity of the optical signal will get decent signal to noise ratios on their shift measurements.

There are two basic ways of dealing with this: either use all the reseau points as if an entire S/N-ratio-homogenous image is present, or respace the reseau points to "bunch around" the areas of maximum signal, so that all reseau points have generally equal signal to noise ratios. Ultimately, both approaches will get to the same end point.

The point about the signal to noise ratio being contingent on either or both of A) local contrast, and B) anisoplanatism is somewhat arcane but relatively important. Conventional wisdom has it that zero-contrast extended objects do not give rise to a shift signal in wavefront sensors, whereas FIG. 34, as well as the detailed discussion surrounding FIGS. 26A and 26B of the earlier disclosure, has shown that anisoplanatism itself creates a shift signal even on zero-contrast objects with at least some brightness. This fact alone is a performance differentiator between prior art mono-axial wavefront sensors and the wide field wavefront sensor of this section and the full field version of a previous section.

Turning to a detailed look at FIG. 34, the top line integral has a waveform of relatively constant positive slope, where it is labelled as 'Anisoplanatic signal only'. This means that only the squeezing and stretching of the signal due to anisoplanatism will create a shift signal in this region. On the other hand, the lower line integral has a 'bumpy' signal in the extended object, so that both the squeezing and stretching of the signal due to anisoplanatism and the movement of the object features will create a shift signal in this region. Thus, the signal to noise ratio on the measurement of the geometrical distortion will be higher on the high contrast extended object than on the low contrast extended object.

Finally, the scintillation function measurement is almost exclusively related to just the primary local photon count and has little to do with the local contrast. Thus, at the end of the day, the spatial non-uniformities of the signal to noise ratios on the scintillation function and on the geometric distortion functions are only slightly correlated. This fact, however, is of little theoretical concern to ultimate system performance.

OPTIMIZING THE OPTICAL DESIGN FOR THE WIDE FIELD HARTMANN-SHACK WAVEFRONT CAMERA

Generally speaking, it is important to vary the parameters of the optical elements in order to maximize signal to noise ratios and minimize spatial filtering on pupil function estimates, all while minimizing the number of photons required. FIG. 8 had a complete example specification for the full field wavefront sensor. Here we explore a typical example of specifications for the wide field Hartmann-Shack camera.

The good news is that for most astronomical observations from nominal sites, inverting geometric distortion is quite rare. Empirical proof can be readily obtained by merely imaging a binary star system and observing that the anisoplanatism of the tilt—along the radial arm connecting the two images—is quite small and that the two stellar images effectively vibrate in unison. On very rare occasions, for our hypothetical site, the two images will merge or cross. The problem of inversion will become a significant issue only when the ambient seeing conditions become quite poor, such as $r_0 = 1$ cm for example.

On to the more practical matters, a fundamental consideration in the design of the optical elements of the wide field Hartmann-Shack camera is trading off the signal to noise ratio on determining local geometric distortion sensitivity. In general, the precise measurement of the geometric distortion would like to see finer pixel spacings, while the desire to collect photons into a single photosite for the purpose of reaching dimmer beacons would dictate more coarse pixels. "fine" and "coarse" refer to higher and lower magnifications respectively.

The "signal amplitude" of typical geometric distortion in $r_0=10$ cm seeing is, in an rms sense, roughly in the one half arc-second region or less. Accurate data for any given target site, as a function of the seeing parameter, is easy to obtain by merely logging centroid positions of stars and removing any tracking errors. Geometric distortion on the other hand can generally be measured to a decent inter-pixel level, where 1/10th of a pixel to 1/50th of a pixel is not untypical for reasonable light levels. Again this is in an rms sense.

Taking these very crude postulations, and positing once again the basic telescope arrangement of FIGS. 4 and 8, we can determine that a pixel spacing of 1 arc-second per pixel is reasonable for at least imaging brighter objects such as planets. Here we find roughly a five to twenty-five signal to noise ratio on geometric distortion signal to noise. On planets in particular, we must remember that we will have thousands of pixels giving us signal values, and the aggregate will thus give us even better signal to noise performance due to a kind of averaging process. We can also target a 36 by 36 arc second square field of view for both the primary detector and the wide field Hartmann-Shack camera, only because this will work out nicely for a 1024 by 1024 array on our 2.5 meter aperture telescope (Both Jupiter and Saturn can get a bit bigger than this, and for those cases, the field of view would need to be enlarged using the basic principles herefollowing.

The basic optical elements are as they were in FIG. 4, except that the primary array 8 should be increased to a 2048 by 2048 detector array in order to image the larger field of view of 36" by 36", and the Field Angle Sampling Sub-aperture Array, 46, is replaced by a Prime Focal Plane Field Stop, 47, which is merely a square aperture with dimensions outlined below. The incoming F/10 optical beam 32, FIG. 4, will not encounter and optional magnification stage, 60, as in FIG. 4, and the beam will pass through the field lens 51, with a nominal focal length of 134.3 mm, and will be occluded by a 4.5 mm by 4.5 mm square field stop 47 (not shown, replaces Field Angle Sampling Sub-aperture Array, 46). The beam then fans out, passes through an open shutter, 42, during an exposure, and encounters the lenslet array 52 at the focal conjugate of the telescope pupil plane as imaged by field lens 51. The detector array, 10, is chosen as 1024 by 1024 in dimensions with a 15 micron square pixel spacing. The aperture size on each individual lenslet on the lenslet array, 52, is chosen as 540 microns, with a individual focal length of 16.2 min. The spacing from the first focal plane 66 to the lenslet array is a nominal (optical) 135 mm while the spacing from the lenslet array 52 to the detector 10 is a nominal 16.2 cm. Simple calculations will show that this arrangement provides for an effective sub-aperture coverage of the pupil function of 10 cm, or 25 lenslets linearly covering the 2.5 meter primary aperture. Moreover, it will be found that the plate scale at a given pixel on the detector array is at 1 arc-second per pixel, or equivalently, one arc-second per 15 microns. These numbers are used as much for explanatory convenience as an attempt to optimize an actual design. Those practiced in the art will understand that each design will determine its own unique specifications deriving from the constraints and trade-offs at hand. The sub-images of the field stop, 47, will be packed together with approximately four or five pixels of border space between them.

A final note is in order concerning chromatic aberration of the lenslet system. In the previous parts of this disclosure it was seen that a relatively wide spectral band light beam is split into the wavefront camera. This is still the case with the currently described wide field Hartmann-Shack (WFHS) camera. Now, however, the WFHS camera is explicitly setting up geometrically distorted images of arbitrarily extended objects rather than centroid shifts on point or highly localized sources. The chromatic aberrations will not change between the two systems, but the underlying processing methodologies may at some point begin to experience a loss of signal amplitude due to this chromatic aberration. This effect should be noted in determining the maximum allowed spectral bandpass of the dichroic splitting arrangement 28 and the optional filter 38, FIG. 4.

CONVERTING THE DISTORTION MEASUREMENTS INTO FIELD ANGLE DEPENDENT PUPIL FUNCTION ESTIMATES

The preceding processing methods and their associated optical design layout find both the scintillation function and the geometrical distortion function of the sub-aperture images, functions themselves of field angle. It remains to convert these measurements into the form required by the processing methodology depicted in FIG. 10. What we actually require is to turn these measurements into the point spread function estimates at the nominal field angle sample points depicted in FIG. 12A.

In general, this is exceedingly simple. The distortion function thus found is a direct measure of the local tip-tilt, just as if a star was located precisely at each field angle sample point 306 of FIG. 12. Indeed, each field angle sample point has its local tip-tilt interpolated for each and every sub-aperture of the lenslet 52, FIG. 4. Just as with the full field wavefront camera, each set of tip-tilts across the aperture is processed into an estimate of the pupil phase distortion using the mature methodologies of the public domain. The possible and probable non-uniformity of the signal to noise level on the field angle sample points is once again a fact of life and can merely show up as a spatial non-uniformity of the strehl ratios of final clear images, 224, FIG. 10.

Now that we have a method for generating the field angle dependent pupil functions, we can replace the entire wide field Hartmann-Shack wavefront camera for the full field wavefront camera disclosed earlier and pick up where that disclosure left off. The full field camera may not be entirely obsolete, since some turbulence situations may be such that the optics cannot reasonably produce good statistical non-inversion, and the full field beam splitting design may offer some advantages in terms of simplifying and segregating the local potentially inverted distortions. This may also be of assistance in the quest for using dimmer and dimmer object beacons, where "allowing" inversion may increase sensitivity. Be this as it may, the simplicity and minimized optical surfaces of the wide field Hartmann-Shack invention should present a superior choice for most applications.

ANOTHER NOTE ON ANTICIPATED BETTER MODES: PHOTON COUNTING DETECTORS AND CAMERAS

The lower noise a detection system has, the better. The choice of specifying CCDs for both the primary detector 8 and the wavefront detector 10 is as much a matter of cost and simplicity as of ultimate performance, barring cost considerations. Nevertheless, it is important to be clear that the technology of spatial photon detection has been, and continues to be, evolving toward detection systems which some day will be dominated by purely shot noise (photon arrival statistics, purely natural in derivation) and whereby instrumental noise is all but eliminated. The phrase and term 'photon counting array and camera' has variously been used to describe this ideal. It should be clear that the both the detector 8 and the detector 10 will experience increased performance by using such a device as a photon counting detector. An arrangement approaching this ideal is described in allowed application Ser. No. 08/171,562 by Blouke and Rhoads entitled "Wafer-Scale Photon Counting Array and Camera; AKA The Avalanche CCD," and incorporated herein by reference. (It should be noted that the present application does not claim the technology disclosed in the Blouke et al application; it is disclosed herein simply in accordance with the inventor's duty to disclose the contemplated best mode.) Other related arrangements are shown in Komobuchi, et al, "A Novel High-Gain Image Sensor Cell Based on Si p-n APD in Charge Storage Mode Operation," IEEE Trans. on Electron Devices, 37:8, August, 1990, pp. 1861–1868, and Hynecek, "CCM—A New Low-Noise Charge Carrier Multiplier Suitable for Detection of Charge in Small Pixel CCD Image Sensors," IEEE Trans. on Electron Devices, 39:8, August, 1992, pp. 1972–1975.

It should be recognized that the particulars of the detector(s) employed in the present invention are entirely matters of design choice for the system implementer; the present invention can be implemented with a number of known detector technologies other than those described in the foregoing paragraph.

DERIVATIVE VERSIONS OF RESOLUTION ENHANCEMENT OF TURBULENCE DEGRADED IMAGES, FOR USE ON SINGLE DETECTOR TELESCOPIC SYSTEMS

So far, this disclosure has described an imaging system having two detectors, one taking primary exposures and one taking wavefront distortion exposures. It so happens that a portion of the disclosed methodologies can "trickle down" to systems which only employ a single primary detector array. In practical terms, the vast majority of imaging systems have only a single detector (obviously), and thus a reasonable improvement in resolving power on such systems, in the presence of turbulence, might be of some use. In essence, the following method uses the same exposure data both as primary data and as wavefront data. By separating out the two functions of the data, a methodology is presented which should provide for reasonable resolution enhancement. Among many mitigating factors, it will be seen that the methods are best employed where an object scene does not change appreciably over, for example, a set of ten exposures. The reasons for this are that the methods presented here work best when a multiple set of image data sets are present.

FIG. 36 gets us fight to the heart of the methodology. It depicts on the left side a non-distorted image of an object and on the right, three examples of the same object with both geometrical distortion and spatially random blurring. The images on the right are typical of, for example, short exposures (e.g. 10–100 milliseconds) on a 30 cm to 1 m aperture telescope at a typical mountain site. It also might be typical of a terrestrial imaging system, of a somewhat smaller diameter aperture and in somewhat higher turbulence conditions. The present section of the disclosure describes a method whereby a set of such images as on the right are taken and synthesized into a single clear image of the object. The physical setup is therefore like that of FIGS. 2 and 4, only now there is no dichroic splitter 28 and wavefront camera 11.

One novel aspect of the single detector arrangement disclosed herein is perhaps most clearly highlighted by comparison to certain prior art systems. In particular, there are a wide variety of prior art imaging systems which remove the global tip-tilt in a stream of video images. Specifically, there are cameras referred to as "steady-cams" which are well known to remove "motion jitters." Likewise, cameras with either mechanical and/or image processing technologies have been made which can produce a steady image scene even when the camera is mounted on moving vehicles or aircraft. Finally, there are well known applications where a series of "shifted images" are gathered and registered with each other to effectively remove the "shift" between them, and then averaged together to form a single clear still image. The latter is typical of planetary imaging. In all of these prior arts, it is fair to say that "first order" global tip-tilt correction is being applied. A distinction with the arrangement described in this section is that the present arrangement corrects beyond this first order.

In summary, the process described in this section performs a global registration of the distorted images, determines the local variations of tip-tilt in order to be removed (the geometric distortion), and then preferentially adds the areas of highest contrast via weighting criteria. The weighting function is meant to keep track of local contrast variations from one image to the next at a given location of the image, not from one part of the image to another. This acknowledges that often a given image can be crisp in one region and blurred in another all in a single exposure, and that the crisp regions and blurred regions randomly wander around the image plane from one distorted image to the next over a large series of E exposures. The point is that any given region will have its fair share of crisp data given enough exposures.

In speckle imaging processing, "shift-and-add" techniques have been used in certain applications, such as examining dose double stars; a simple centroid is determined, or a highest pixel value, the resulting x-y offsets applied and the images added. In hindsight, the arrangement of the present section may be viewed as a rather involved extension on this core idea, applied to arbitrary extended objects. Likewise, it may seem from the literature that shifting and adding slightly offset images may be used to reduce basic tracking errors and global tip-tilt in multiple exposure telescopic imaging. However, no specific description of such an approach is presently known to the inventor, and this single detector arrangement basically uses the global registration merely as a kind of pre-processing of the images, or, to use analytic vernacular, the simple removing of the lowest order of geometric warp—global tip-tilt. It is generally acknowledged by those practiced in the art that these simple shift-and-add techniques have their limitations and will only produce a limited resolution enhancement; thus the dual detector set-up of the earlier disclosure is believed necessary to achieve near diffraction limited performance on larger aperture telescopes and in more turbulent conditions.

FIG. 37 steps through the single detector enhancement methodology. We begin once again by gathering a series of short exposure digital image data sets of the object, step 900. The next step, 902, is to calibrate these digital images using the very common techniques of offset and gain normalization to obtain linear measurement values. This is also known as dark framing and flat fielding. The next step 904 is to register all images onto one global x-y offset, effectively removing tracking error and global tip-tilt of the images. This process is well known in the art of image processing and consequently has several approaches. One such approach is to cross-correlate images and find where there cross-correlation peaks. Certain provisions for rotation of images may need addressing in systems which do not have good mechanical tracking and rotating properties.

Once two given images are "registered," it remains to resample one image onto the grid spacing of the other. This too is a familiar image processing technique and reference is made to standard texts dealing with these basics. The images can then be effectively averaged together. The registered images now become the working exposures for the next steps.

Step 906 averages all E exposures together pixel by pixel to create the "standard image" which we explicitly acknowledge is a slightly lower resolution image than what we are ultimately after; we then apply a low pass filter to the average image via step 908. The filter is typically of gaussian shape with a full width half maximum of 5 arc-seconds or so, but in any event is subject to experimentation. This resulting image is called the standard scintillation image. Step 910 then steps through each and every exposure, filters it (step 912) with the same filter applied to get the standard scintillation image, and adds the difference between the standard and the newly filtered version to the original exposure version, giving each exposure a "scintillation-correct version" (via steps 914 and 916), i.e. some large statistical amount of the anisoplanatic scintillation has now been removed from each exposure.

Step 918 now calls the earlier-detailed procedure which finds the geometric distortion between the "scintillation-corrected image" and the "standard image" of step 906. Of note is that the standard image should be generally of a lower frequency content than the scintillation corrected images, i.e. it is a bit more blurred on average, and that during the geometric distortion mensuration process step 918, the resulting geometric distortion should contain a very high frequency spurious signal that should be filtered out as in step 920. Finally, step 922 creates a new "undistorted image" by applying the reverse geometric distortion to the scintillation corrected image of step 916.

Step 924 next creates a "weighting image" which essentially is a measure of the local contrast, or "detail," of the geometrically corrected image from step 922. The specifics of generating this image are quite flexible. The preferred embodiment creates this image by, at each and every pixel, assigning the new value of the local absolute value of the averaged second derivative at that pixel location. This is generally computed on a floating point basis, later to be scaled to, for example, an 8-bit scale where the value of zero is mapped to the digital value of 1 and the highest anticipated second derivative value is scaled to the digital number 200. If the highest value exceeds 200 or even 255, the scaling must be changed; likewise if the highest value is well under the value 200. This image is then low pass filtered with generally the same FWHM of the gaussian used to create the scintillation-corrected images. Once this weight image is finished, step 926 now steps through pixel by pixel then adding its "correct image value" weighted by its "weighting image value" into an accumulating weighted average for each and every pixel of the final clear image. Step 928 completes the loop 910 such that when all E exposures are cycled through, step 930 then begins the loop through all the weighted average numerators and denominators of each and every pixel, performs the required division in step 932, closes the loop 934, and out pops an optimally enhanced image estimate 936. As with any image processing routine such as the one outlined here, certain residual effects may become apparent, and it is always best to specify a post-filtering process step 938 of a generic kind, with the hopes of smoothing out any undue anomalies.

A few more ancillary notes are in order. First, short exposures are generally advised so long as they don't trade off other performance goals such as overall noise. The short exposures tend to "freeze" both atmospheric distortion and minor tracking error. If either of these effects last too long and are integrated into one given exposure, they tend to irreversibly destroy high frequency information in the raw exposures. Second, narrow band filtering can also be effectively employed. The filtering merely minimizes chromatic blurring on monochromatic detectors, again assisting in retaining high frequency information in the raw exposures.

CONCLUSION

This disclosure has aptly focussed upon an "optical telescope" operating in the open atmosphere as the preferred embodiment of the invention, and has numerous references to alternative embodiments. "Optical" has both explicitly and implicitly been used in its most general sense as referring to the entire electromagnetic spectrum. The wavelength of 500 nanometers was repeatedly used as an example central wavelength about which a narrow band of light is imaged. To use this wavelength as an example one final time, it can be seen that whereas prior art systems such as adaptive optics systems and speckle imaging systems could indeed achieve near diffraction limited performance at this wavelength and others like it, they could do so only within a steradian field coverage of 5 arc seconds in atmospheric conditions in the $r_0 = 10$ cm. This disclosure, on the other hand, specified how to attain near diffraction limited imagery to arbitrarily wide fields of view (where again, an 8 by 8 field angle sampling was merely an example). Furthermore, prior art telescopes not utilizing either prior art speckle methods or adaptive optics methods could generally not resolve objects to better than 1.0 arc seconds over any field of view (at 500 nanometers).

It should once again be noted that, while the foregoing disclosure has addressed in considerable detail certain telescope applications, the teachings thereof are more generally applicable to any imaging system degraded by temporally or spatially varying distortion.

The issue of alternative embodiments to those detailed herein has been quite a recurring theme in this disclosure. Those skilled in the art of telescope or imaging system design will be able to clearly recognize the range of design options available for creating other embodiments. Though this principle is almost a cliche in the spirit of patent protection, it is nevertheless quite important to recognize this freshly for inventions which must perforce borrow upon not only decades but centuries of prior art; inventions which in some embodiments are best described as very large systems. It was with this in mind that FIGS. 1, 5, and 11A were drawn and described with certain critical novelties highlighted; And it was with this mind that so many design options were positively "encouraged" rather than merely being obliquely referenced. Therefore, I claim as my invention all such embodiments as may come within the scope and spirit of the following claims and equivalents thereto.

I claim:

1. An optical system comprising:
   an optical array detector;
   a field stop;
   a lenslet array interposed between the field stop and the optical array detector;
   means coupled to the optical array detector for mensurating geometric distortion, said means further including means for determining, from said mensurated geometric distortion, optical wavefront distortions across a breadth of field angles as opposed to a single mono-axial field angle.

2. Apparatus including a focusing optic and a radiation sensor, the optic directing radiation from an object to the sensor, the sensor producing data signals corresponding thereto, the apparatus further including means responsive to data signals from the radiation sensor for characterizing geometrical distortion introduced by a medium between the object and the sensor even when, under isoplanatic conditions, the object is a zero contrast extended object.

3. An imaging method comprising:
   receiving light from an object to be imaged, said light having been subject to optical wavefront distortions;
   exposing an optical detector with said received light, the optical detector producing a plurality (M) of time-spaced sets of detector data therefrom, each corresponding to a two-dimensional image of said object;
   processing said M time-spaced sets of detector data to discern geometric distortion of the received light;
   determining, from said discerned geometric distortion, optical wavefront distortions of the received light across a breadth of field angles, as opposed to from a single mono-axial field angle; and
   using the time-spaced sets of detector data and the determined optical wavefront distortions to produce a corrected set of image data.

4. The method of claim 3 which includes:
   processing the detector data by computing a plurality of line integrals along straight lines through the corresponding two dimensional images to provide an approximation of the geometrical distortion therein; and
   iteratively computing further line integrals along lines through the corresponding two dimensional images, said successive iterations making use of geometrical distortion approximated in preceding integrations to more closely follow distortion of a straight line in said image imposed by the geometrical distortion.

5. The method of claim 3 which includes:
   processing the M time-spaced sets of detector data to produce a set of reference image data corresponding thereto;
   for each of the M time-spaced sets of detector data: globally searching for a geometrical distortion function which, when combined with said set of detector data to produce a set of compensated data, minimizes a difference between the set of compensated data and the reference image data.

6. The method of claim 3 which includes:
   processing the M time-spaced sets of detector data to produce a set of reference image data corresponding thereto;
   computing a radial line integral at uniform spacings through the reference image data;
   computing a radial line integral at uniform spacings through each of said M time-spaced sets of detector data; and
   using said computed radial line integrals in discerning the geometrical distortion.

7. The method of claim 3 which includes:
   passing the received light through a lenslet array comprised of a plurality (N) of subapertures;
   exposing the optical detector with light from the lenslet array, the optical detector producing N spatially-spaced sets of detector data therefrom, one for each of said subapertures, each of said N sets including M time-spaced sets of detector data; and
   processing at least one of said N spatially-spaced sets of detector data to discern the geometric distortion of the received light.

8. The method of claim 7 which include processing each of said N sets of spatially-spaced detector data to discern geometric distortion of the received light.

9. Storage media containing a set of corrected image data produced in accordance with the method of claim 8.

10. Storage media containing a set of corrected image data produced in accordance with the method of claim 3.

11. The method of claim 8 which includes performing the processing and determining steps using a programmed computer workstation.

12. The method of claim 8 which further includes processing said sets of detector data to compensate for scintillation effects therein.

13. The method of claim 8 which includes:
   processing said N sets of detector data by computing a plurality of line integrals along straight lines through the corresponding two dimensional images to provide an approximation of the geometrical distortion therein; and
   iteratively computing further line integrals along lines through the corresponding two dimensional images, said successive iterations making use of geometrical distortion approximated in preceding integrations to more closely follow distortion of a straight line in said image imposed by the geometrical distortion.

14. The method of claim 8 which includes, for at least one of said N sets of spatially-spaced detector data:
   processing the set of detector data to produce a set of reference image data corresponding thereto; and
   globally searching for a geometrical distortion function which, when combined with the detector data to produce a set of compensated data, minimizes a difference between the set of compensated data and the reference image data.

15. The method of claim 14 which includes performing the steps thereof for each of said N spatially-spaced sets of detector data.

16. The method of claim 8 which includes, for at least one of said N sets of spatially-spaced detector data:
processing the detector data to produce a set of reference image data corresponding thereto;
computing a radial line integral at uniform spacings through the reference image data;
computing a radial line integral at uniform spacings through each of the N sets of spatially-spaced sets of detector data; and
computing differences between said computed radial line integrals to discern the geometrical distortion.

17. The method of claim 16 which includes performing the steps thereof for each of said N spatially-spaced sets of detector data.

18. A method of characterizing, in a plurality of dimensions, distortion introduced by a distorting medium interposed between an extended source and a detector, comprising:
receiving radiation from the extended source, said radiation having been subject to distortion by said medium;
exposing a detector with said received radiation, the detector producing a set of detector data therefrom corresponding to a two-dimensional representation of said source;
processing said set of detector data to discern geometric distortion of the received radiation;
determining, from said discerned geometric distortion, a three-dimensional turbulence structure of the distorting medium.

19. The method of claim 18 which includes:
passing the received radiation through a lenslet array of subapertures;
exposing the detector with radiation from the lenslet array, the detector producing a plurality of sets of detector data therefrom, each set corresponding to a two-dimensional representation of the extended source; and
processing said plurality of sets of detector data to discern said three dimensional turbulence structure.

20. In an imaging system including a focusing optic that directs radiation from an object to a sensor and provides a set of raw image data, an improvement including means coupled to the sensor for determining phase and geometric distortion in the raw image data across a breadth of field angles, as opposed to from a single mono-axial field angle.

21. The imaging system of claim 20 in which the imaging system is a telescope.

* * * * *